(12) United States Patent  
Shiraishi et al.

(10) Patent No.: US 6,661,438 B1
(45) Date of Patent: Dec. 9, 2003

(54) DISPLAY APPARATUS AND PORTABLE INFORMATION PROCESSING APPARATUS

(75) Inventors: Atsushi Shiraishi, Tokyo (JP); Keisuke Tsuji, Fuchu (JP); Roy Nakashima, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/484,715

(22) Filed: Jan. 18, 2000

(51) Int. Cl.7 .................................................. G09G 5/00
(52) U.S. Cl. ........................ 345/835; 345/781; 345/810; 345/837
(58) Field of Search ................................. 345/781, 837, 345/844, 839, 978, 835, 810, 727, 751, 752, 700, 702, 771, 772

(56) References Cited

U.S. PATENT DOCUMENTS

| | | | | |
|---|---|---|---|---|
| 5,657,049 A | * | 8/1997 | Ludolph et al. | 345/856 |
| 5,684,970 A | * | 11/1997 | Asuma et al. | 345/775 |
| 5,731,997 A | * | 3/1998 | Manson et al. | 702/150 |
| 5,852,440 A | * | 12/1998 | Grossman et al. | 345/811 |
| 6,020,828 A | * | 2/2000 | Gotou | 340/7.56 |
| 6,100,888 A | * | 8/2000 | Gourdol et al. | 345/837 |
| 6,298,128 B1 | * | 10/2001 | Ramey et al. | 379/142.01 |

* cited by examiner

*Primary Examiner*—John Cabeca
*Assistant Examiner*—Chuong T. Thai

(57) ABSTRACT

A display apparatus has a communication unit which performs at least receiving of a plurality of pieces of display data. The display apparatus also has first storage device for storing received plurality of pieces of display data. The display apparatus further has a second storage unit for storing at least one piece of first icon information corresponding to at least one of the pieces of display data and at least one piece of second icon information of a display form different from that of the first icon information. The display apparatus further has a display unit for displaying, on a menu screen, at least one of the first icon information and the second icon information. The display apparatus further has a control unit for selecting the first icon information or the second icon information based on the number of pieces of display data newly registered in the first storage unit and for controlling the displaying unit so that the selected icon information is displayed on the menu screen.

28 Claims, 70 Drawing Sheets

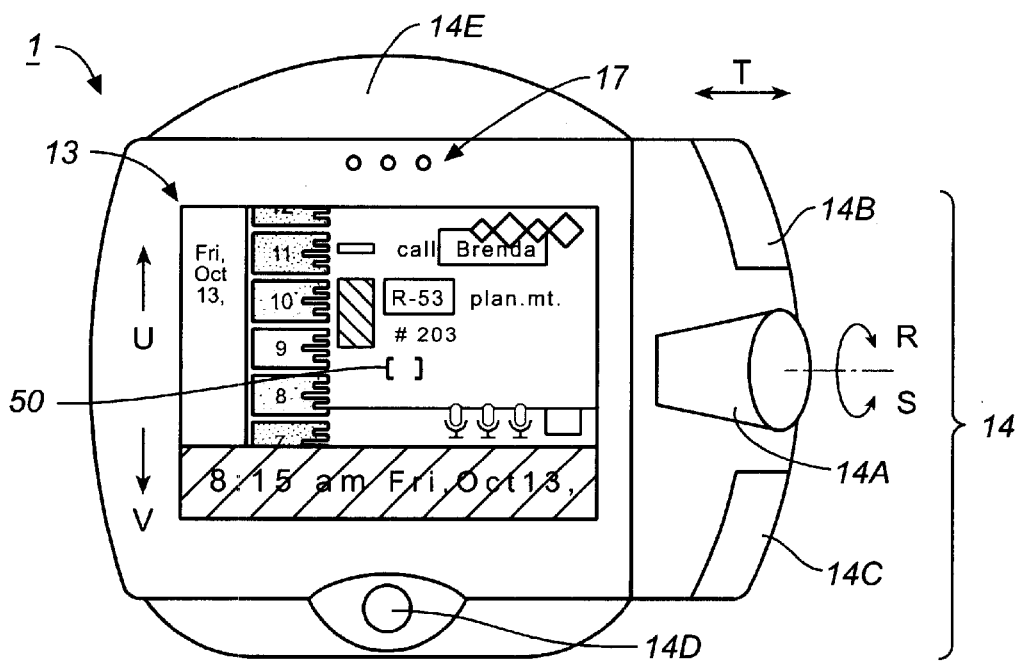
FIG._1A
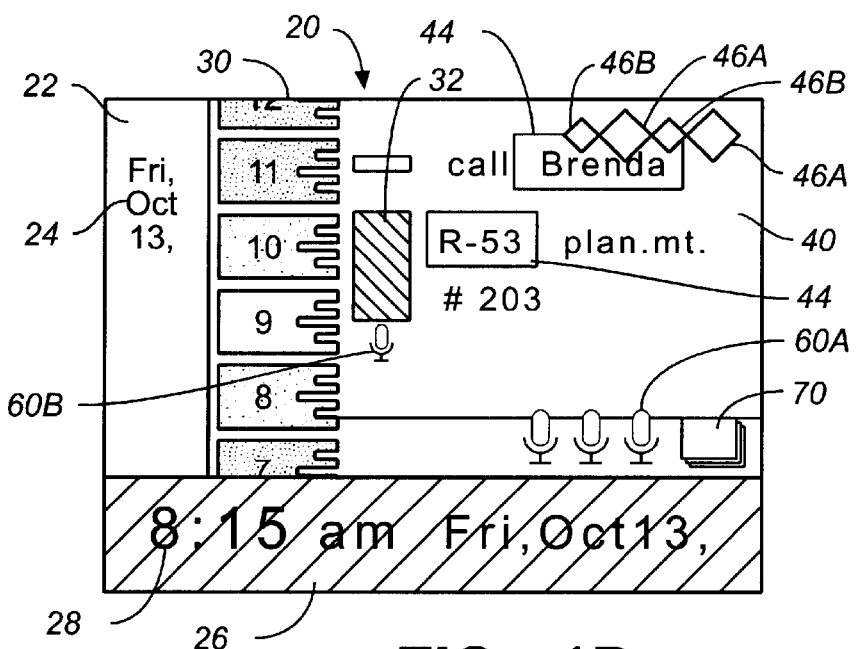
FIG._1B

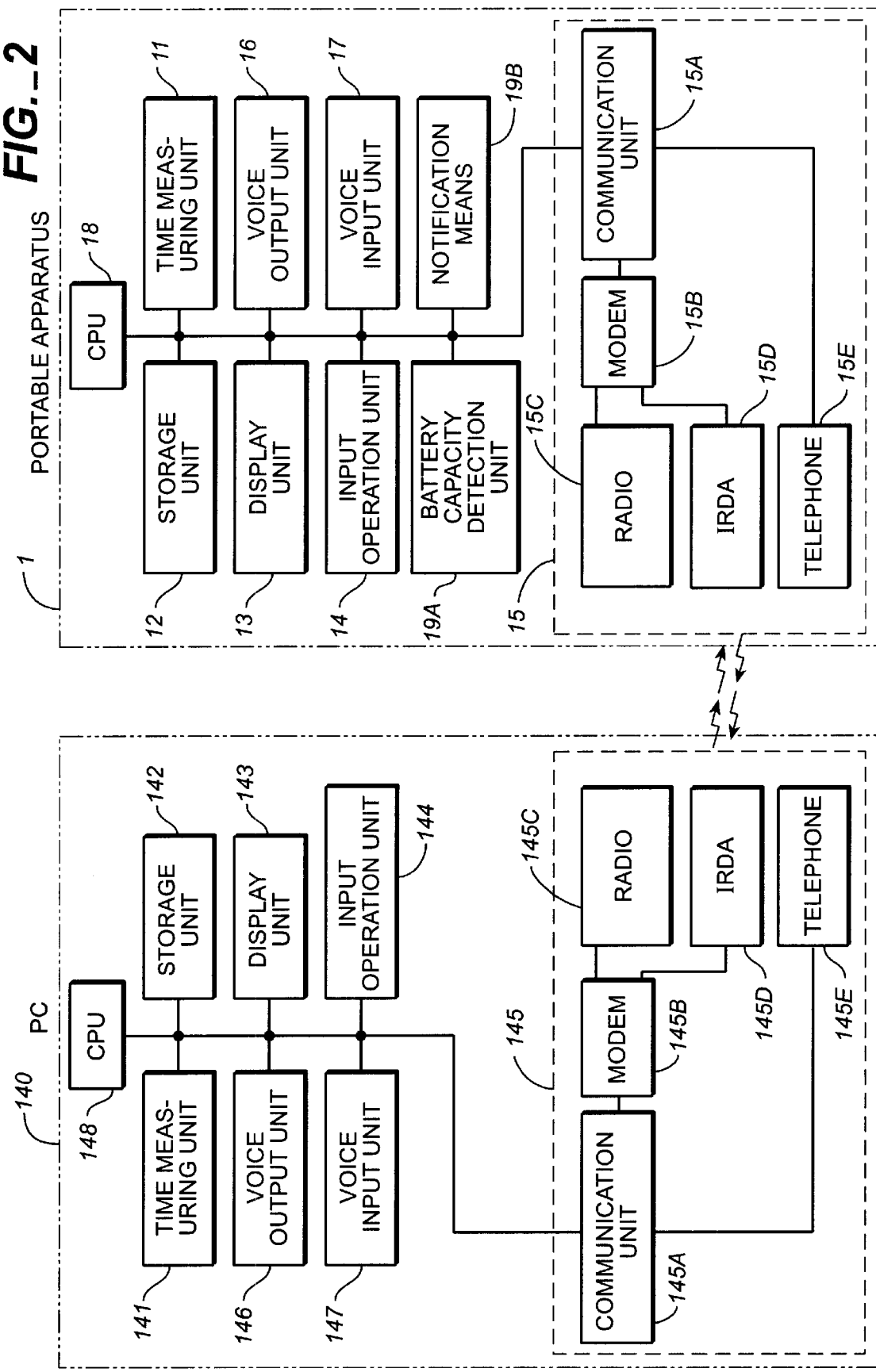

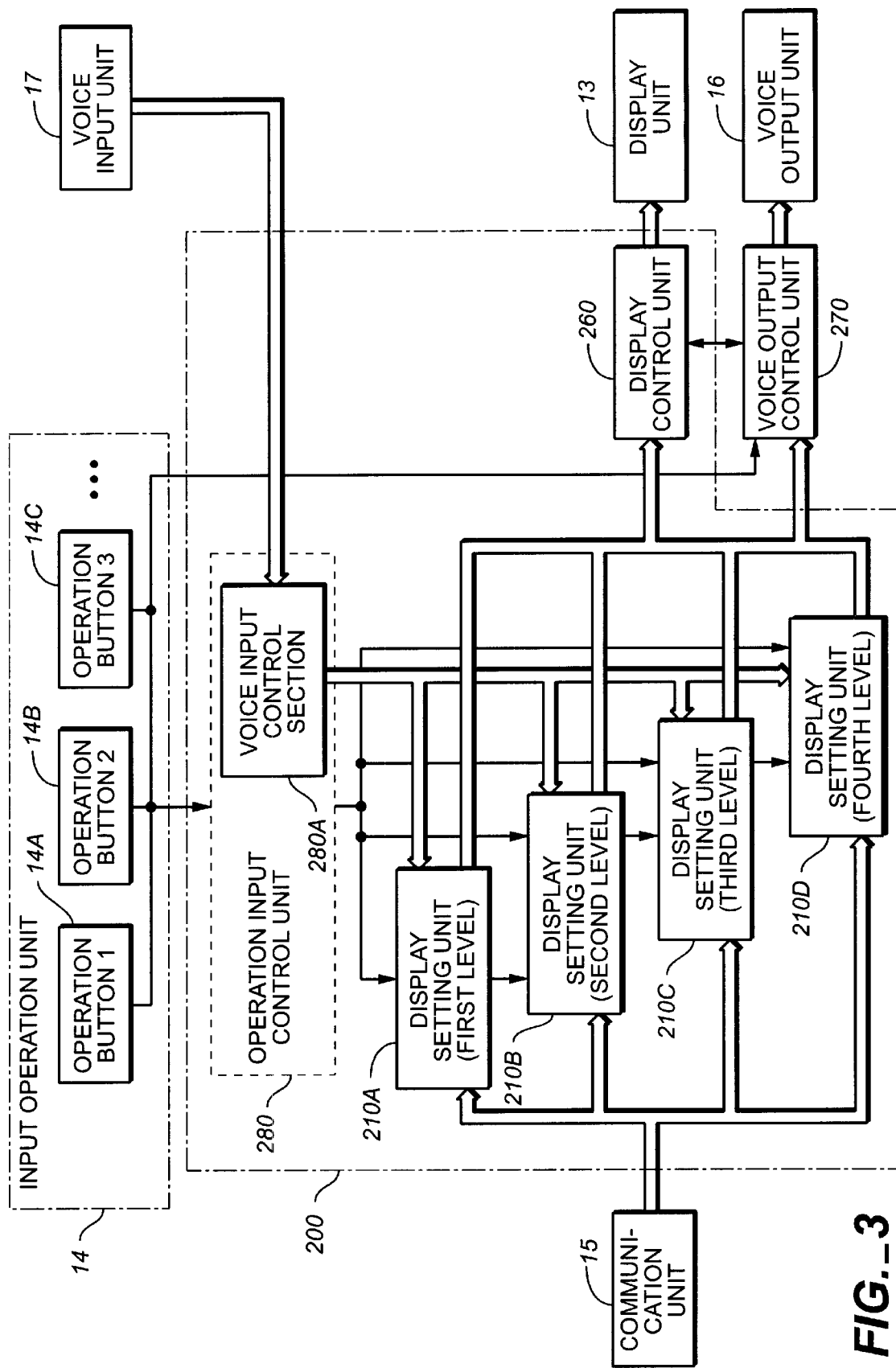

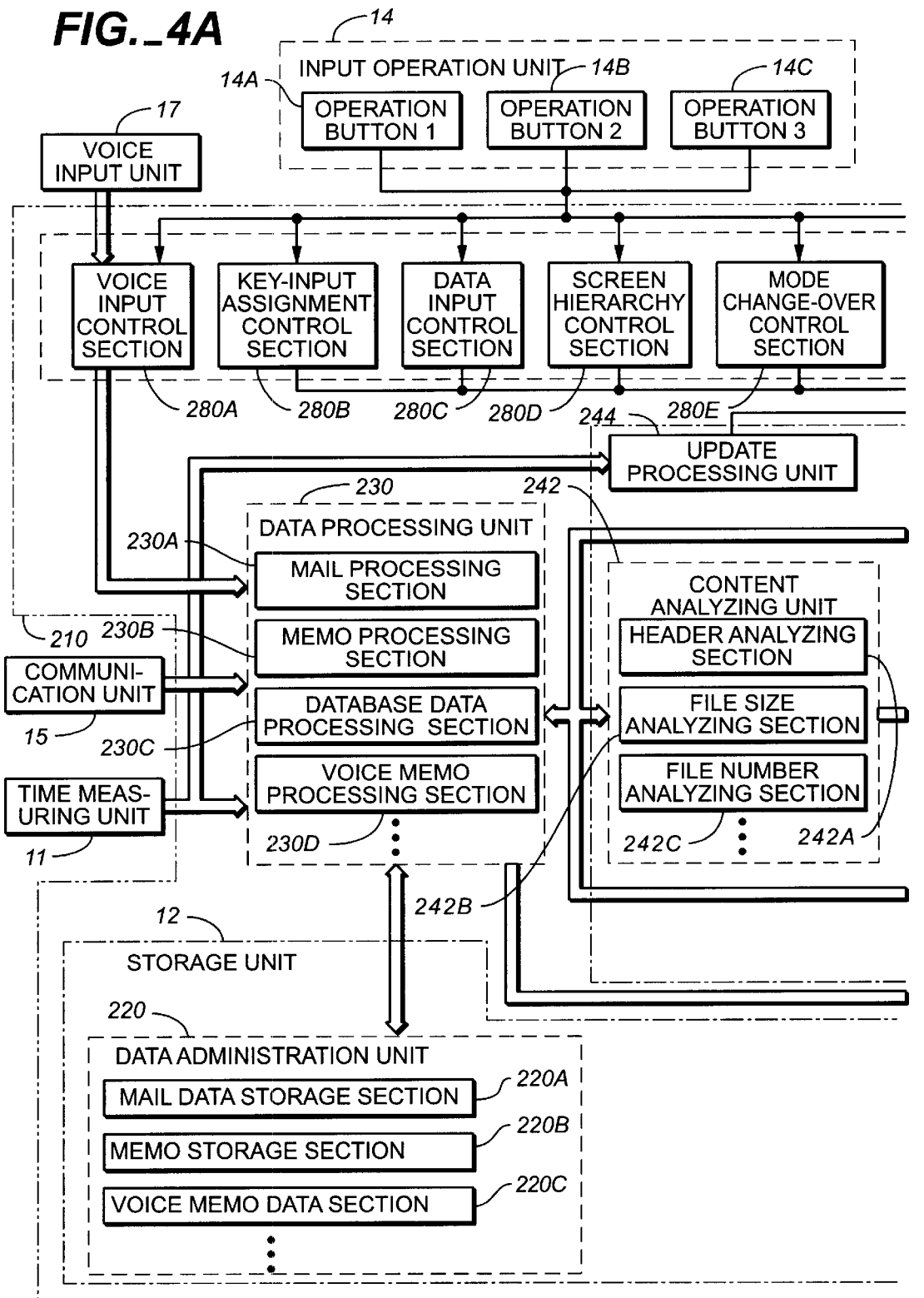
FIG._4A

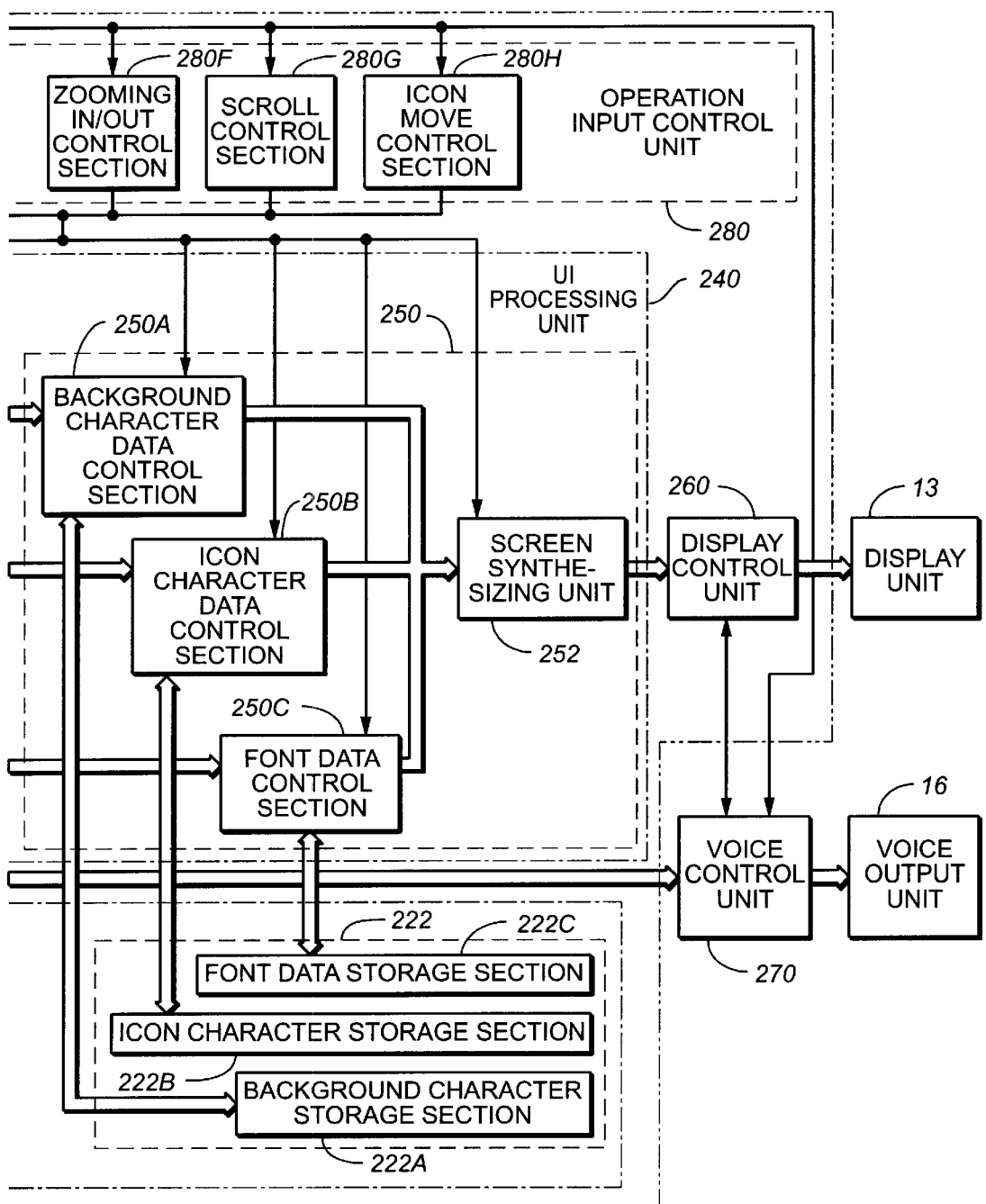

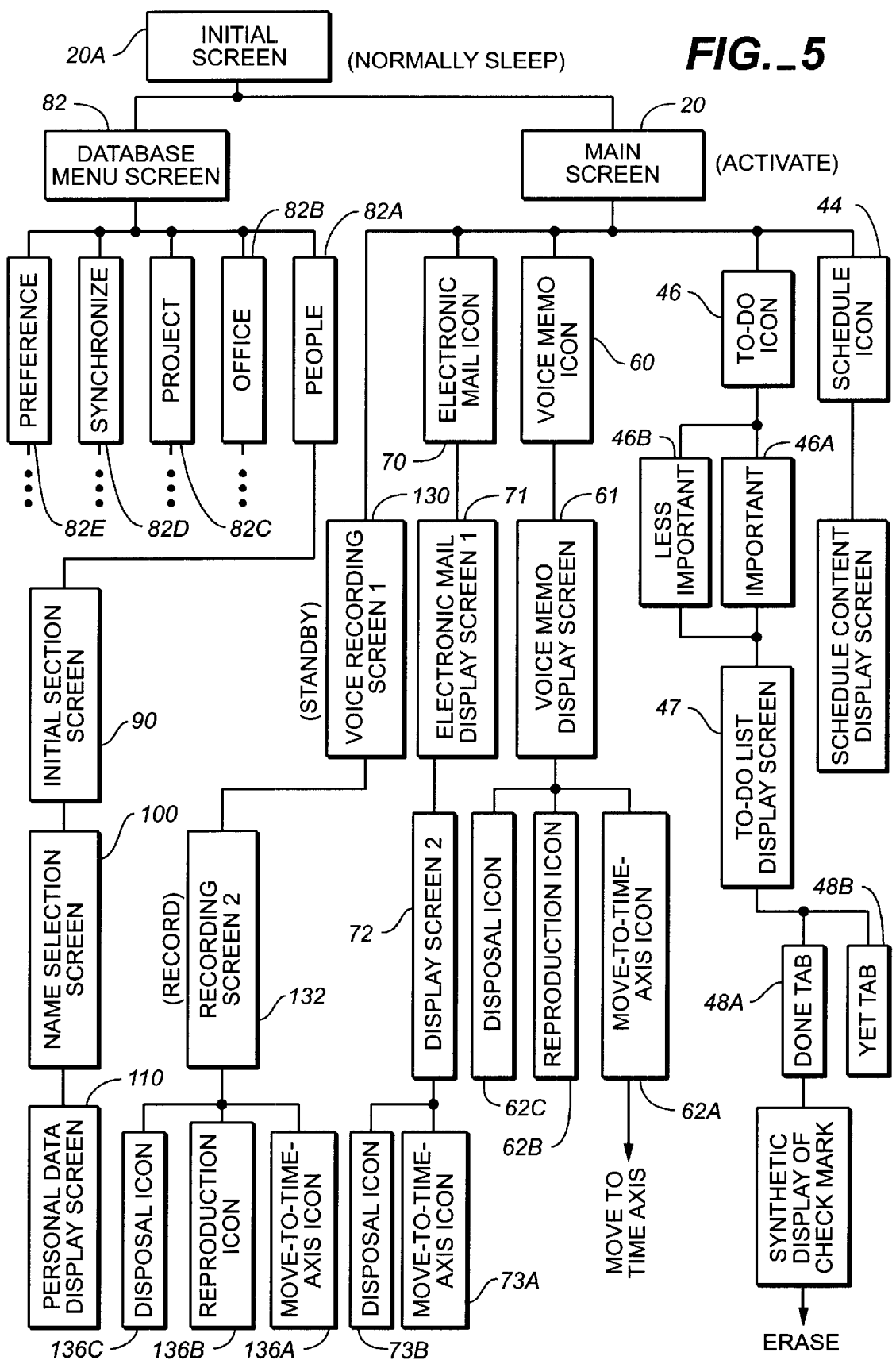
FIG._5

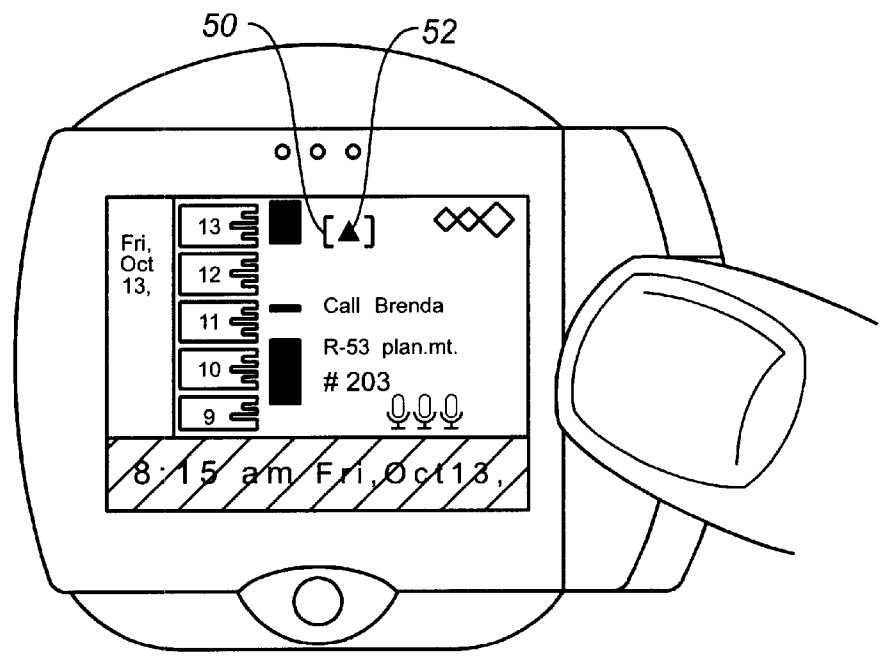
FIG._6
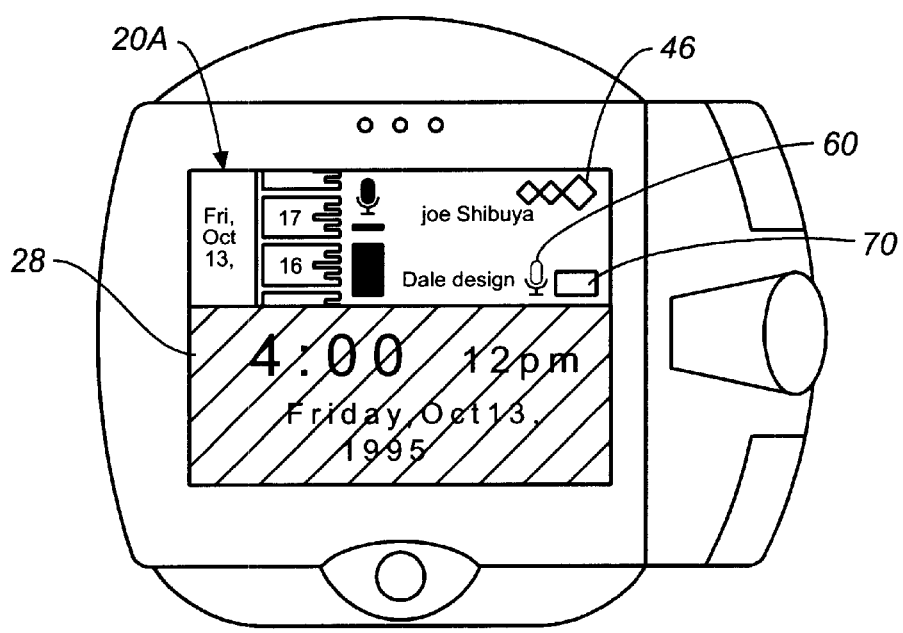
FIG._9

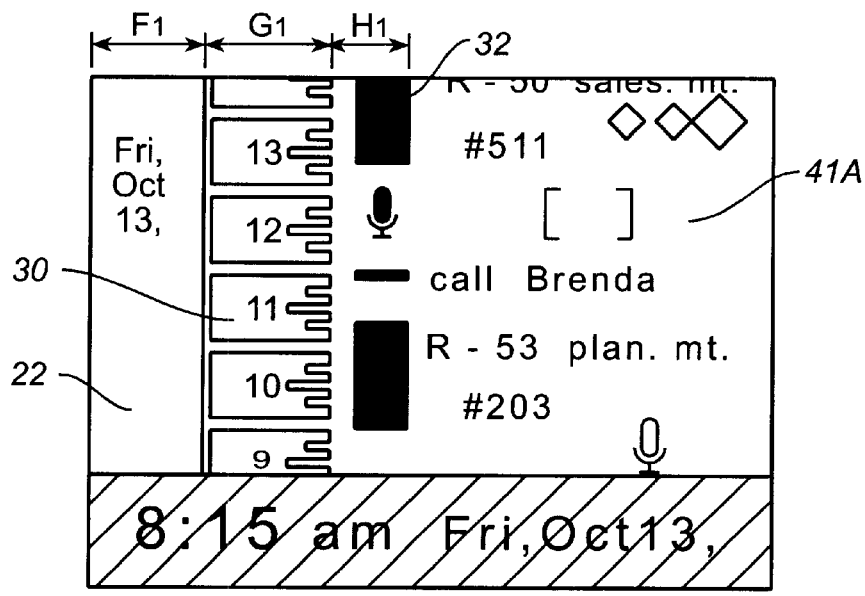
FIG._7A
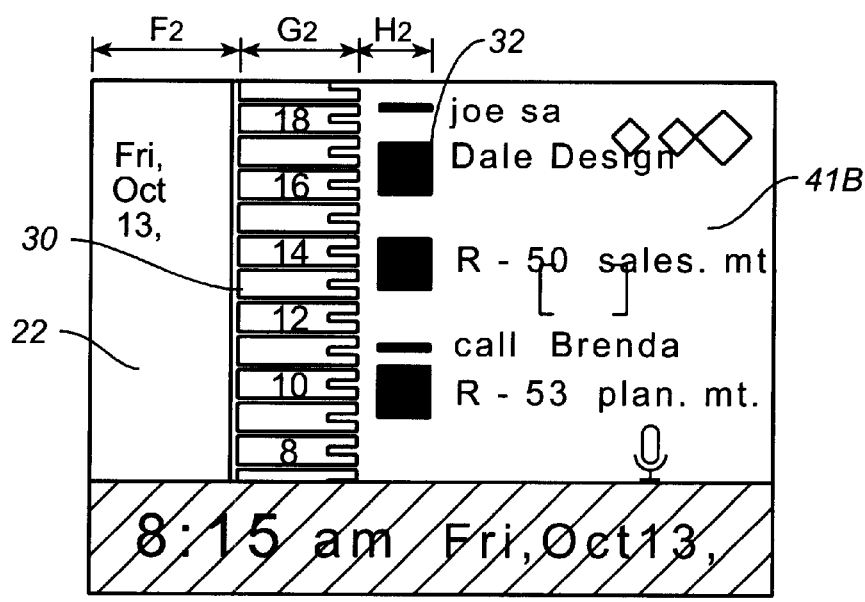
FIG._7B

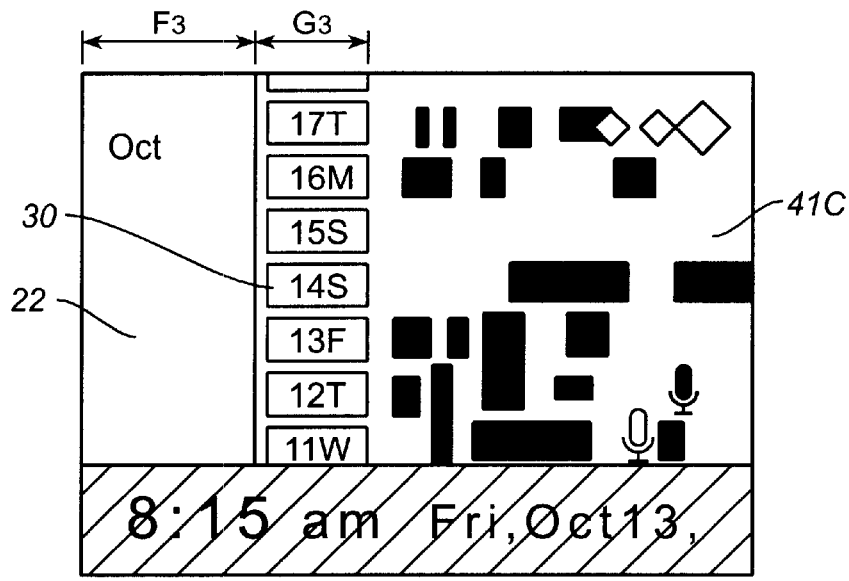
FIG._7C
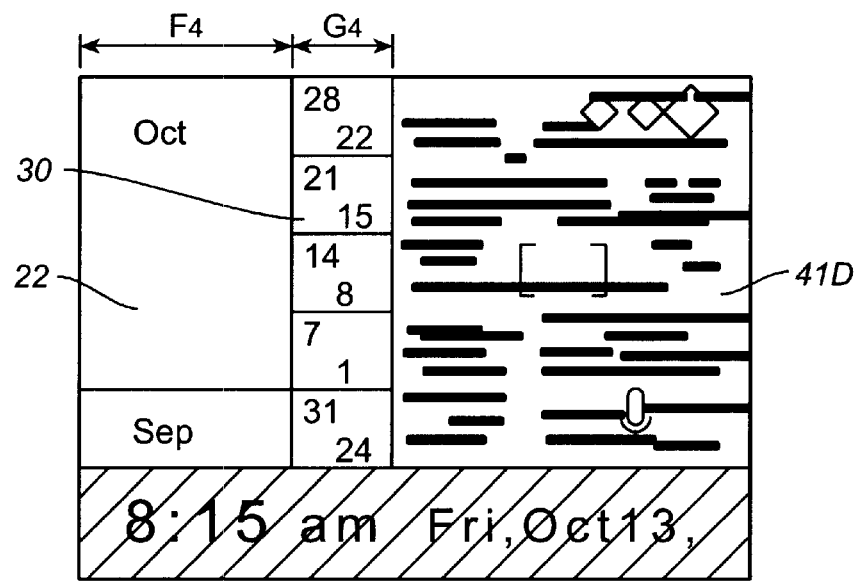
FIG._7D

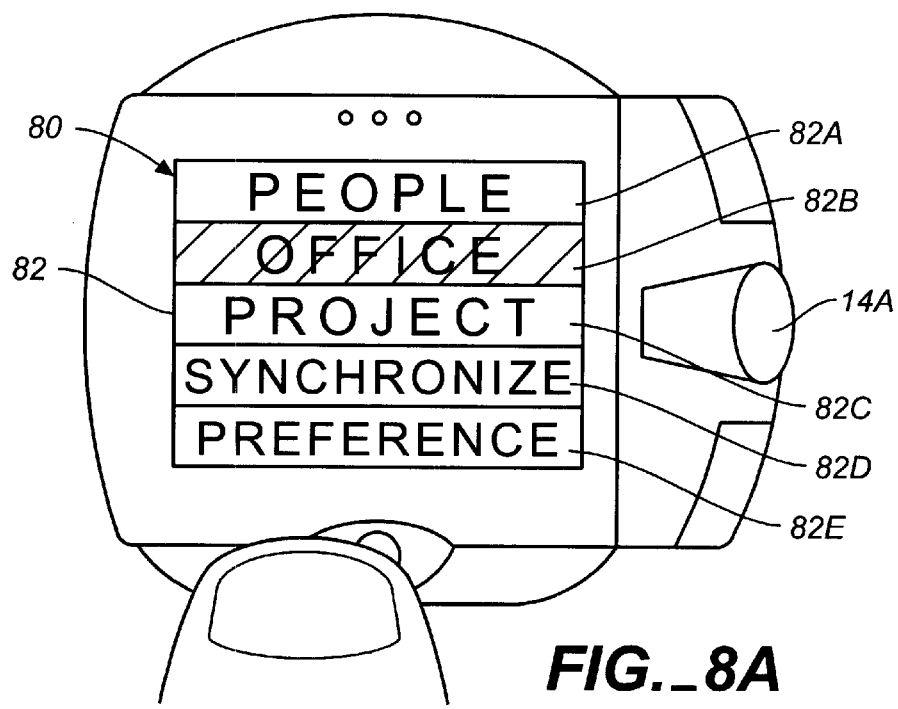
FIG._8A
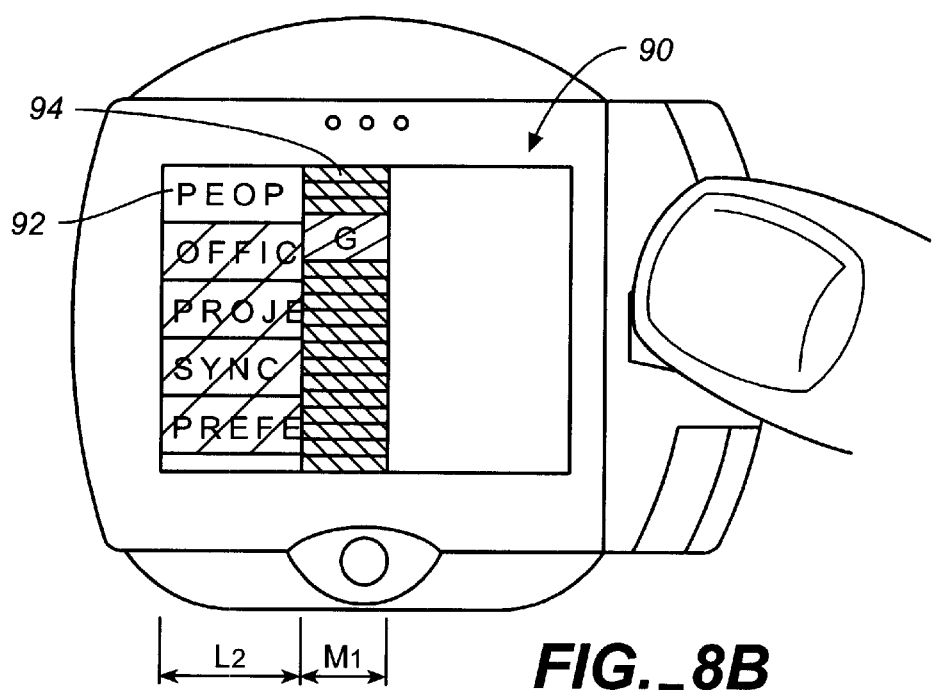
FIG._8B

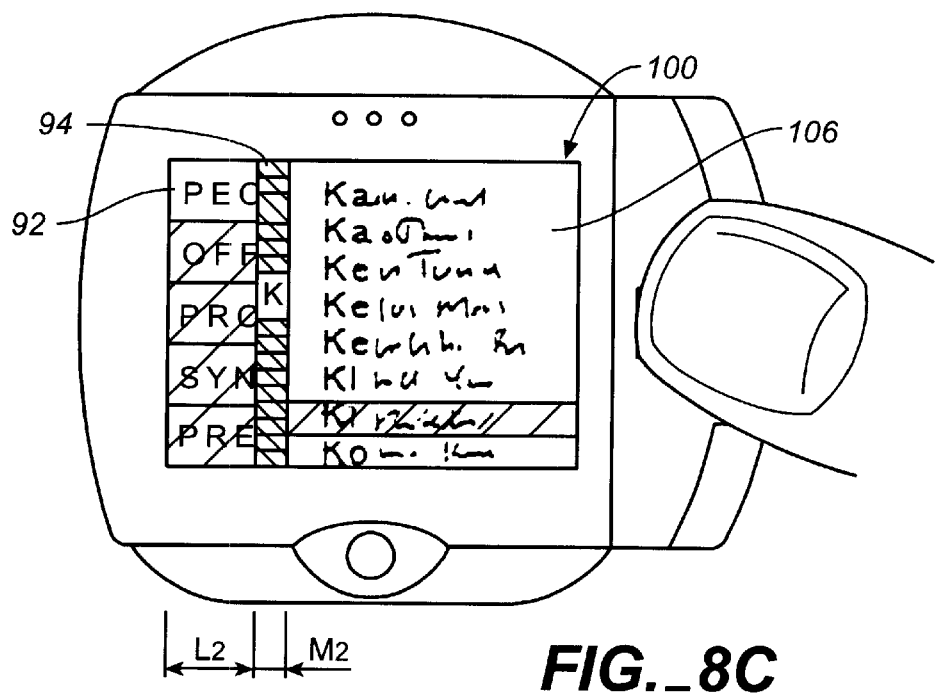
FIG._8C
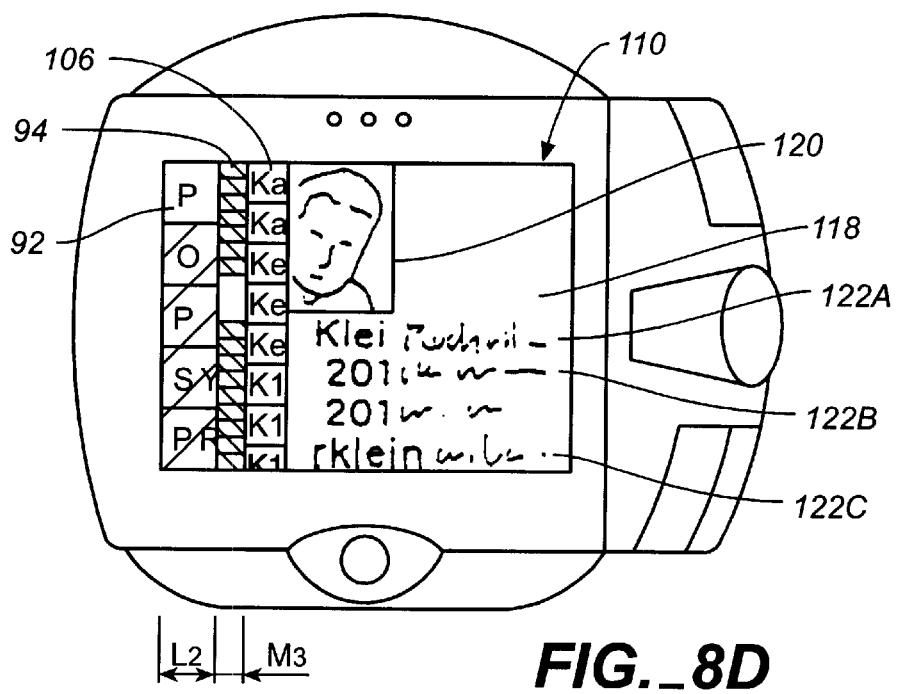
FIG._8D

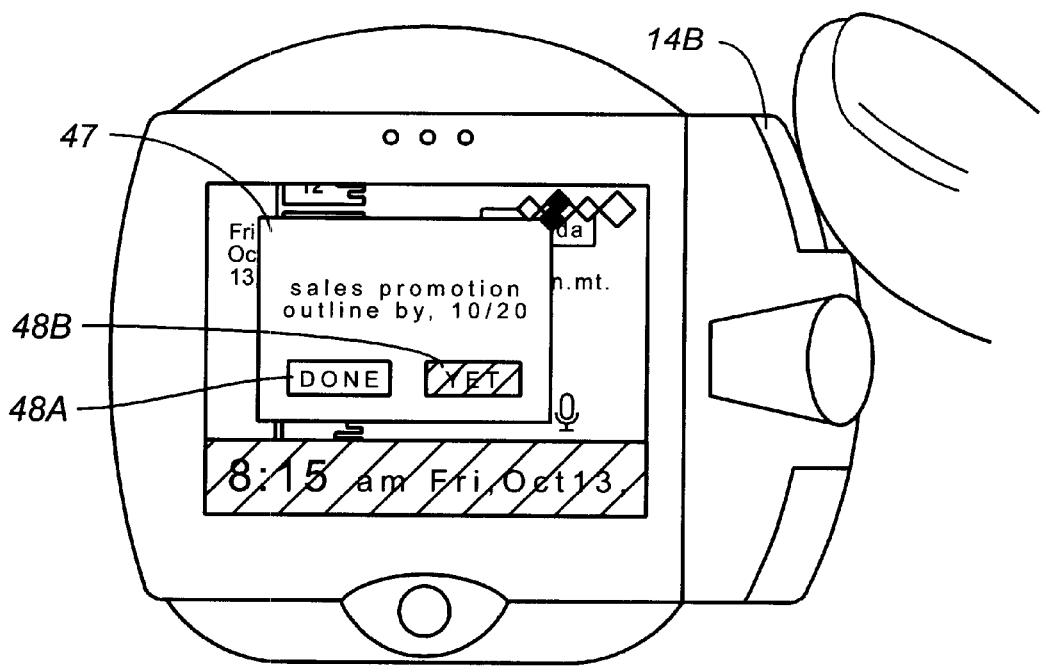
FIG._10A
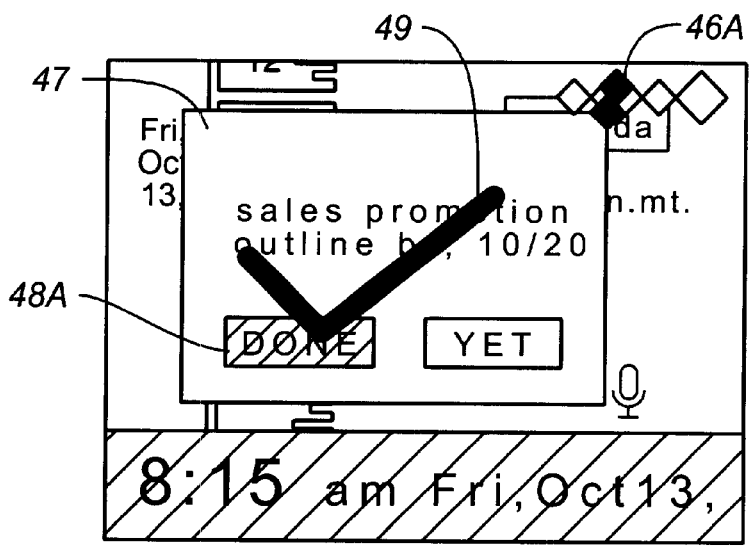
FIG._10B

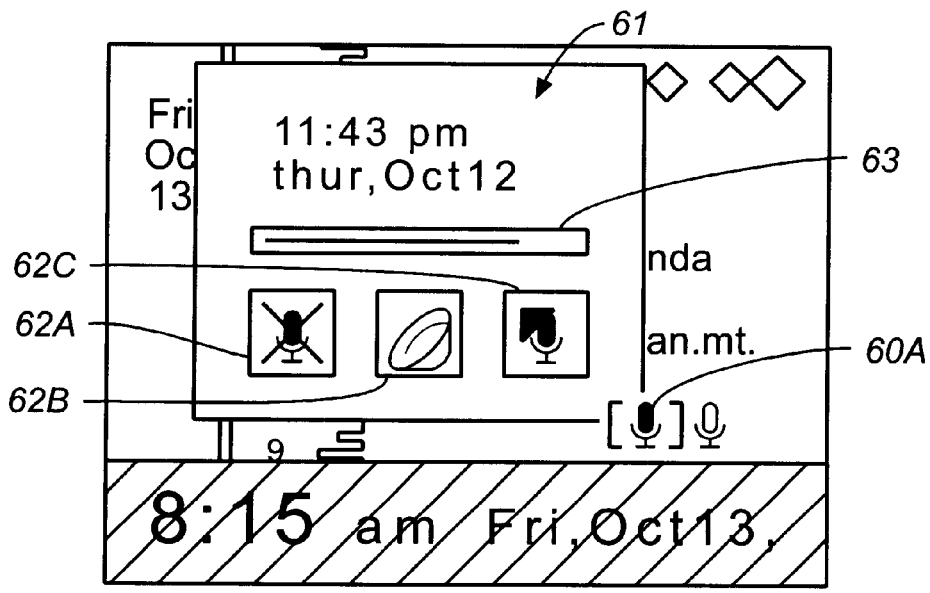
FIG._11A
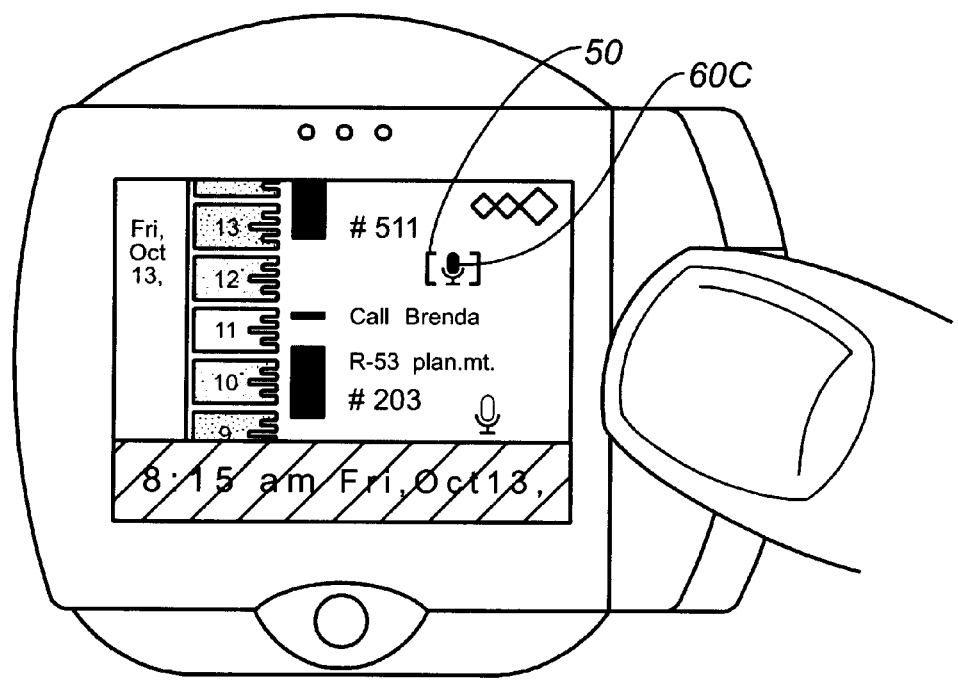
FIG._11B

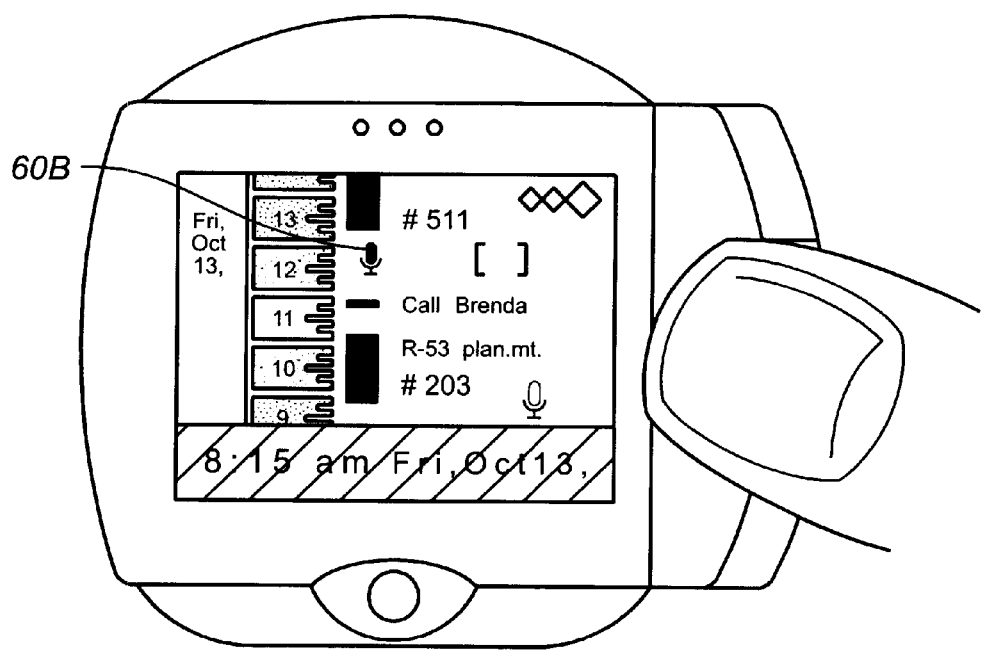
FIG._11C
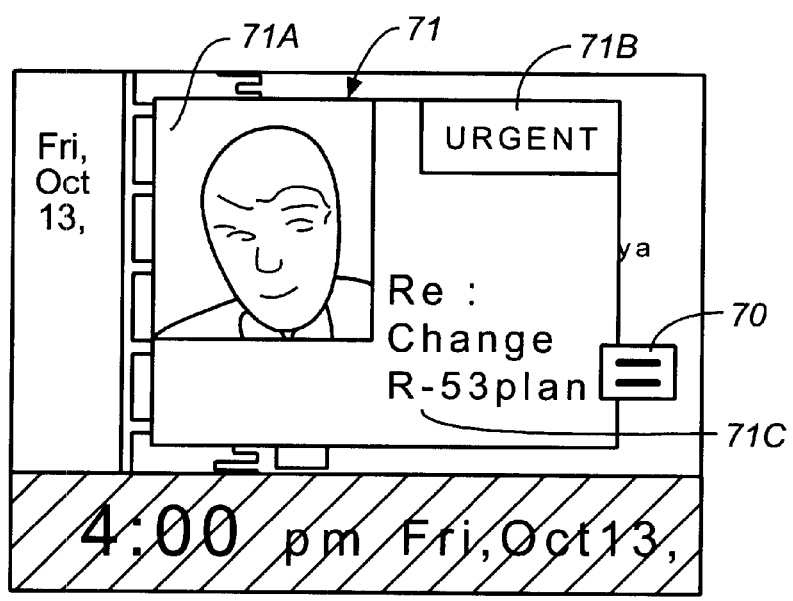
FIG._12A

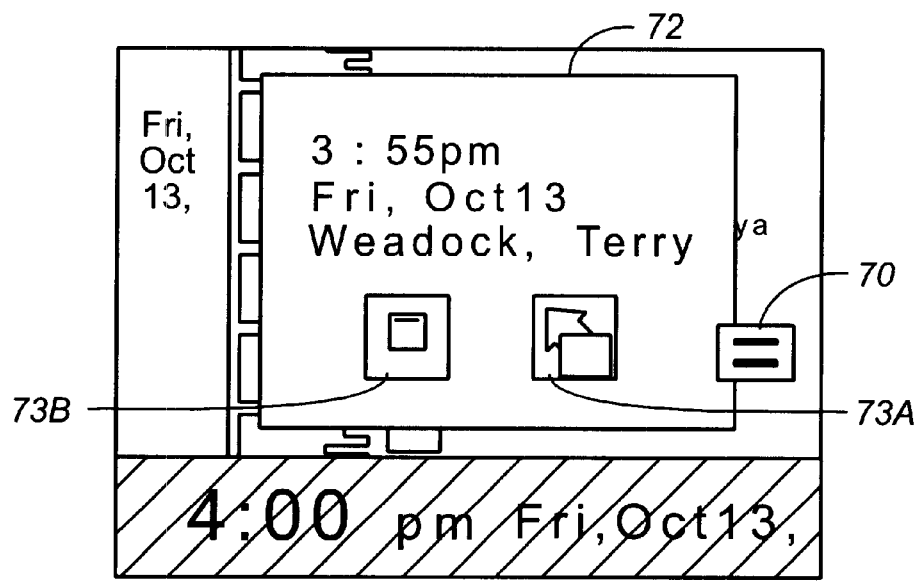
FIG._12B
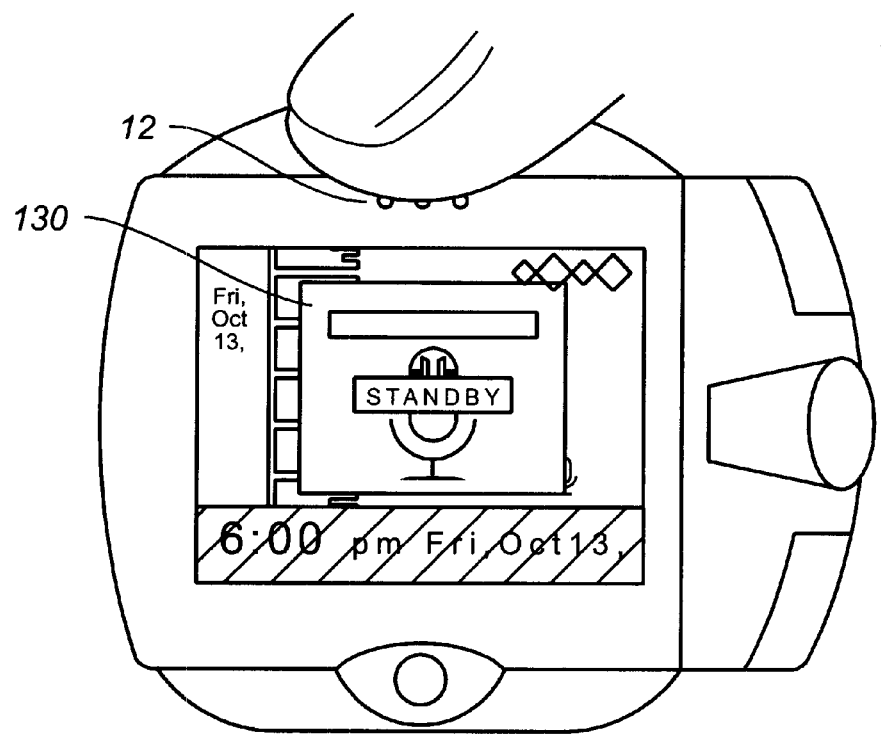
FIG._13A

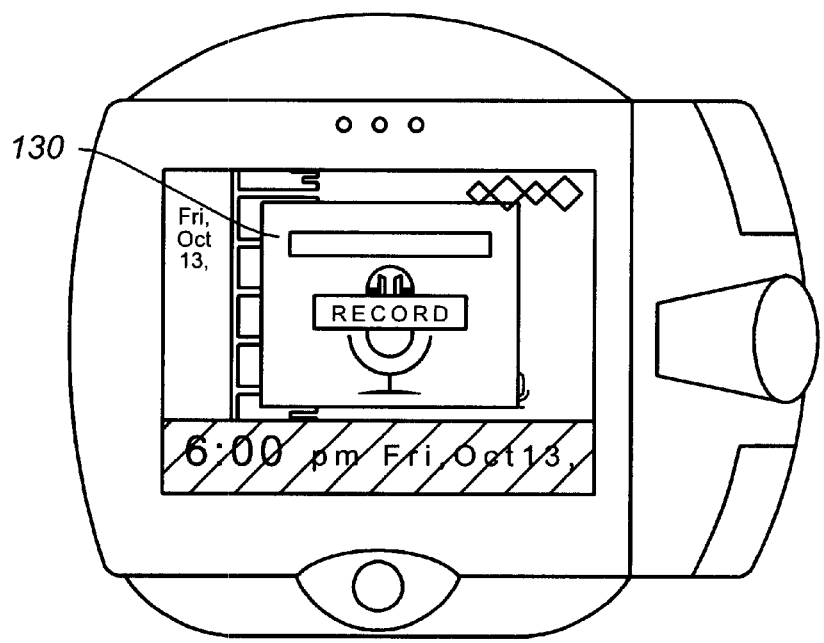
FIG._13B
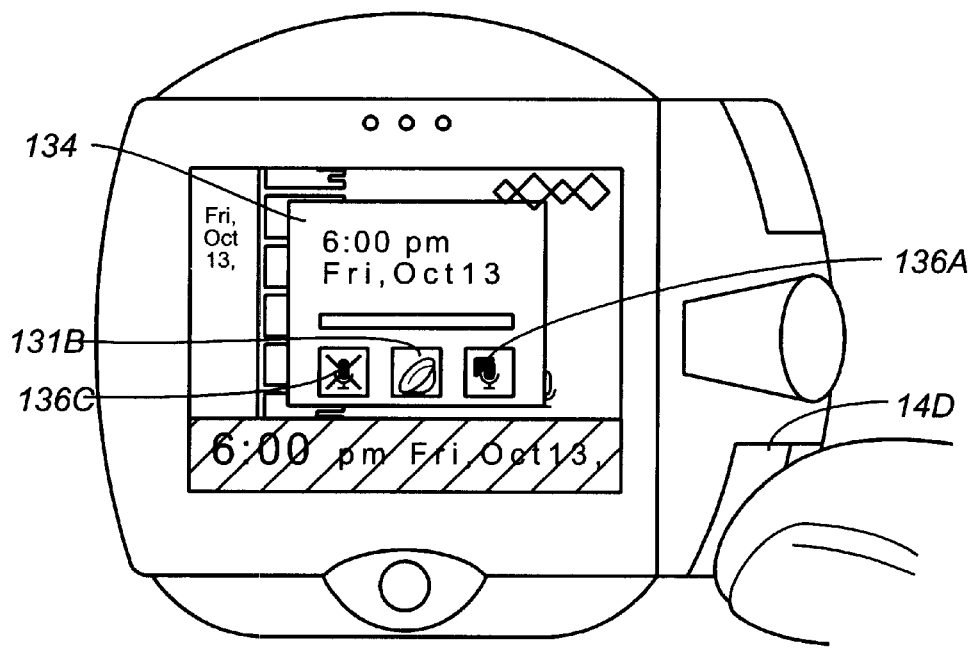
FIG._13C

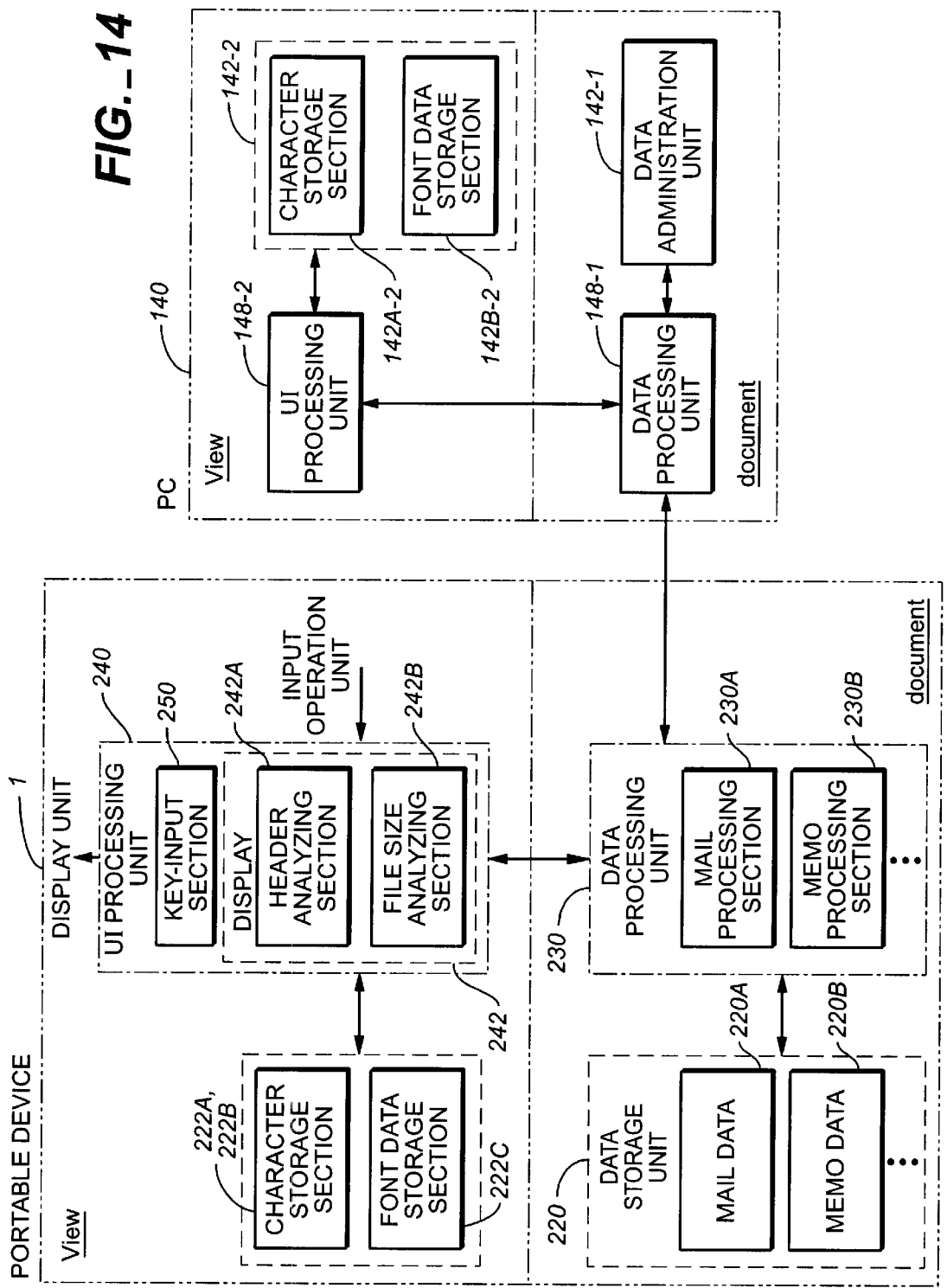

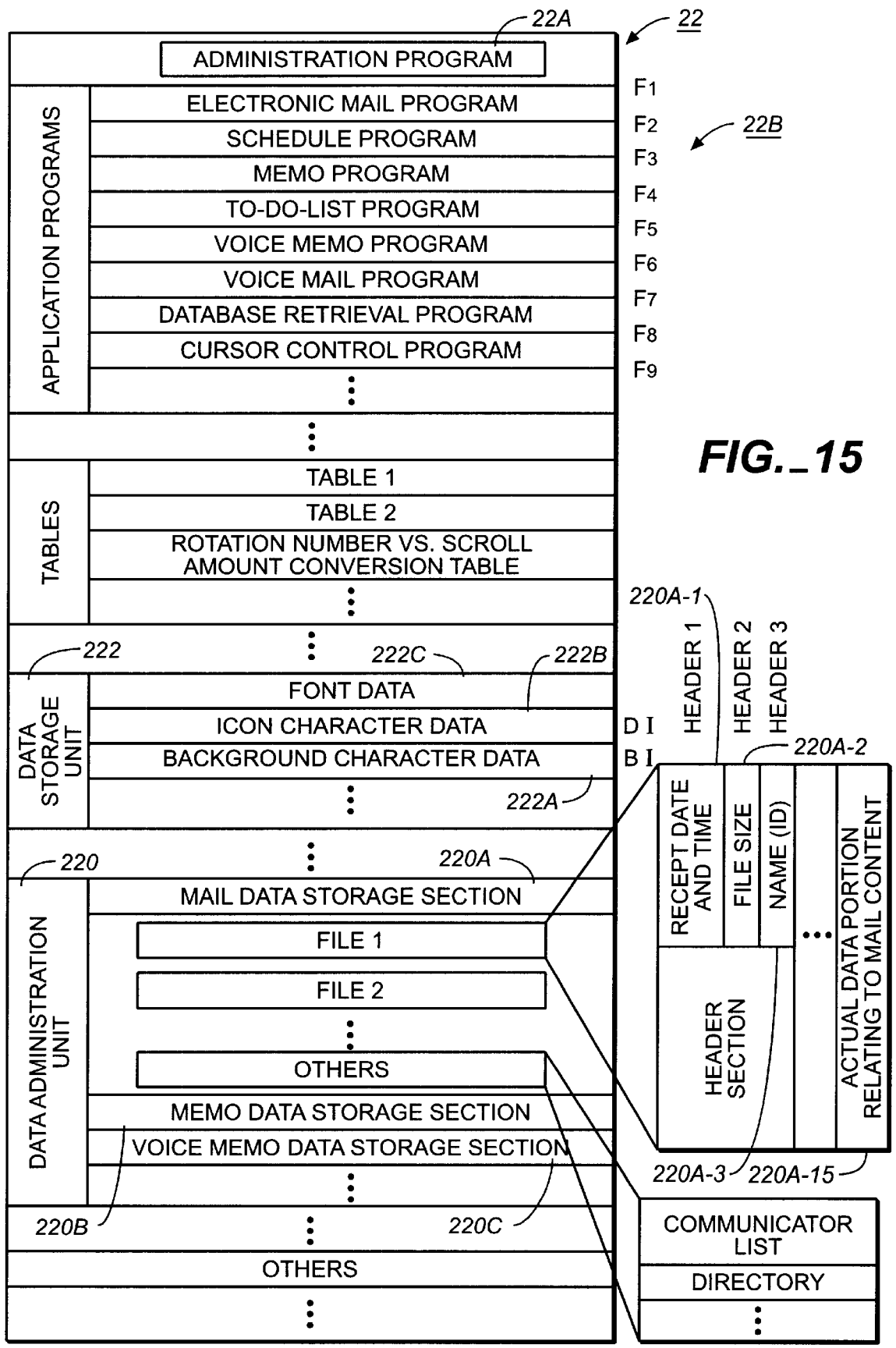
FIG._15

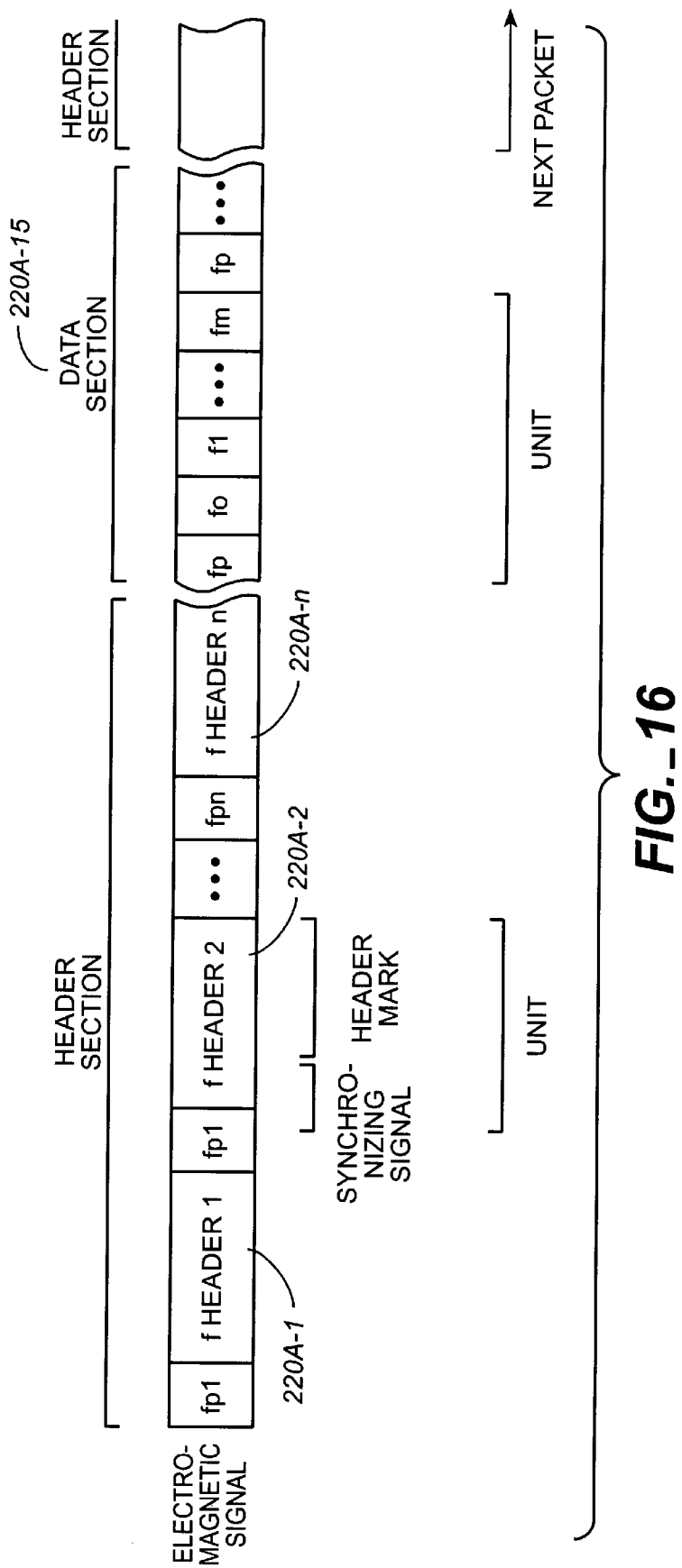
FIG._16

Table 1

| FUNCTION NAME | ICON CHARACTER DATA POINTER | FUNCTION PROGRAM POINTER |
|---|---|---|
| ELECTRONIC MAIL | $DI_1$ | $F_1$ |
| VOICE MEMO | $DI_2$ | $F_5$ |
| TO-DO LIST | $DI_3$ | $F_4$ |
| TO-DO LIST | $DI_4$ | $F_4$ |
| TO-DO LIST | $DI_5$ | $F_4$ |
| VOICE MEMO | $DI_6$ | $F_5$ |
| SCHEDULE | $DI_7$ | $F_2$ |
| ELECTRONIC MAIL | $DI_{10}$ | $F_1$ |
| ELECTRONIC MAIL | $DI_{11}$ | $F_1$ |
| ELECTRONIC MAIL | $DI_{12}$ | $F_1$ |
| ⋮ | ⋮ | ⋮ |

FIG._17A

Table 2

| MENU NAME | MENU FORM | DISPLAY SCREEN CHARACTER POINTER | ICON POSITION |
|---|---|---|---|
| TIME MODE | ENTIRE AREA | $BI_2$ | |
| DATE MODE | ENTIRE AREA | $BI_3$ | |
| TIME AXIS DISPLAY MODE | ENTIRE AREA | $BI_4$ | |
| SCHEDULE MODE | ENTIRE AREA | $BI_5$ | TO DO<br>VOICE MEMO<br>SCHEDULE |
| DATA ZOOM-IN MODE | ENTIRE AREA | $BI_6$ | |
| SCHEDULE ZOOM-IN MODE | ENTIRE AREA | $BI_7$ | TO DO<br>VOICE MEMO<br>SCHEDULE |
| ELECTRONIC MAIL MODE | POP-UP | $BI_8$ | |
| MEMO MODE | POP-UP | $BI_9$ | |
| MEMO MODE | POP-UP | $BI_{10}$ | |
| DATABASE MODE | POP-UP | $BI_n$ | |
| ⋮ | ⋮ | ⋮ | ⋮ |

*FIG._17B*

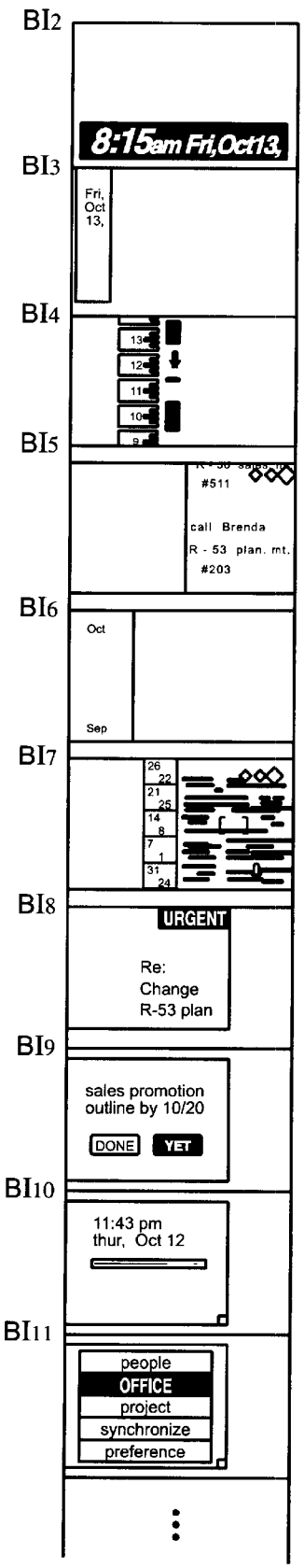
FIG._18A
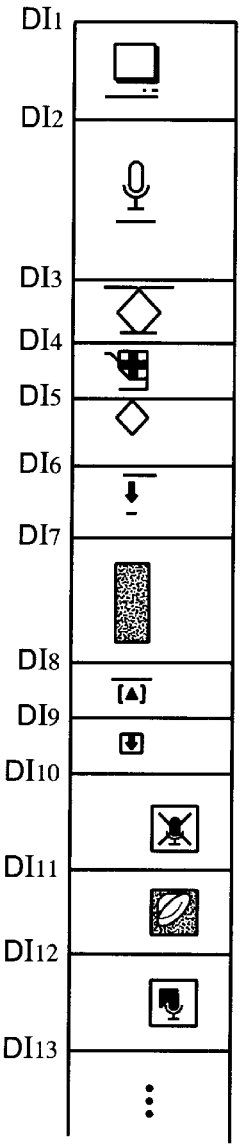
FIG._18B

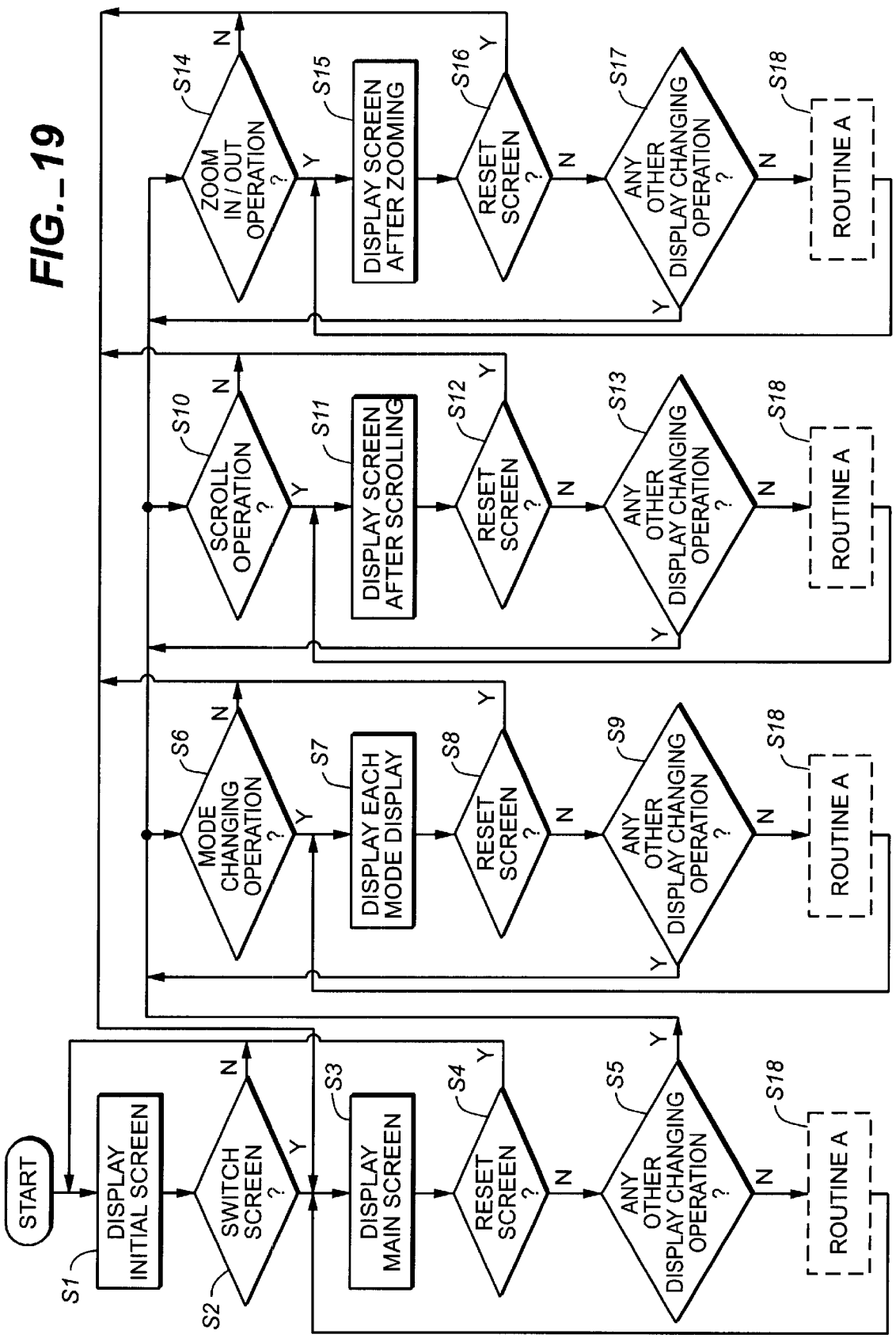
FIG._19

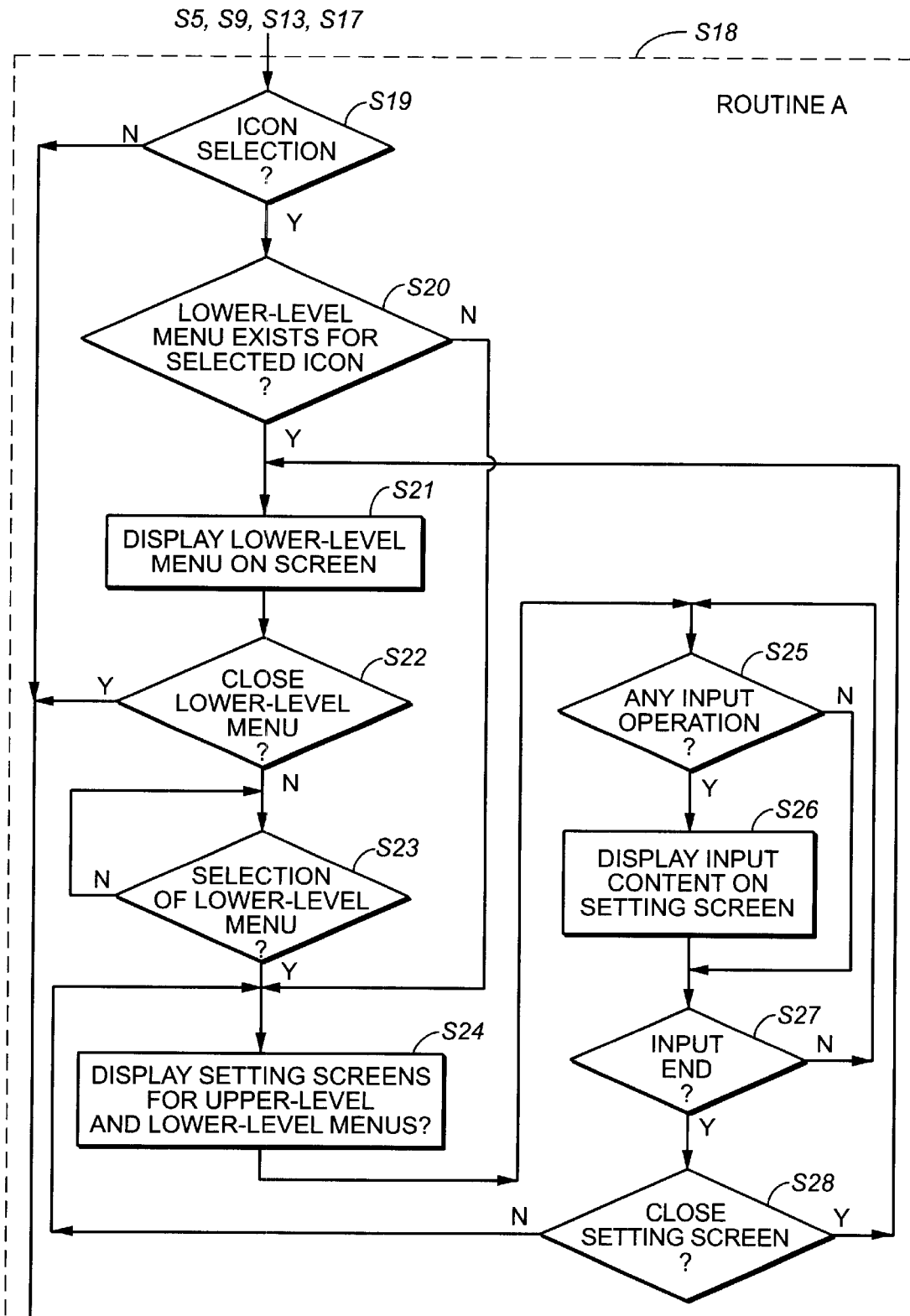
FIG._20

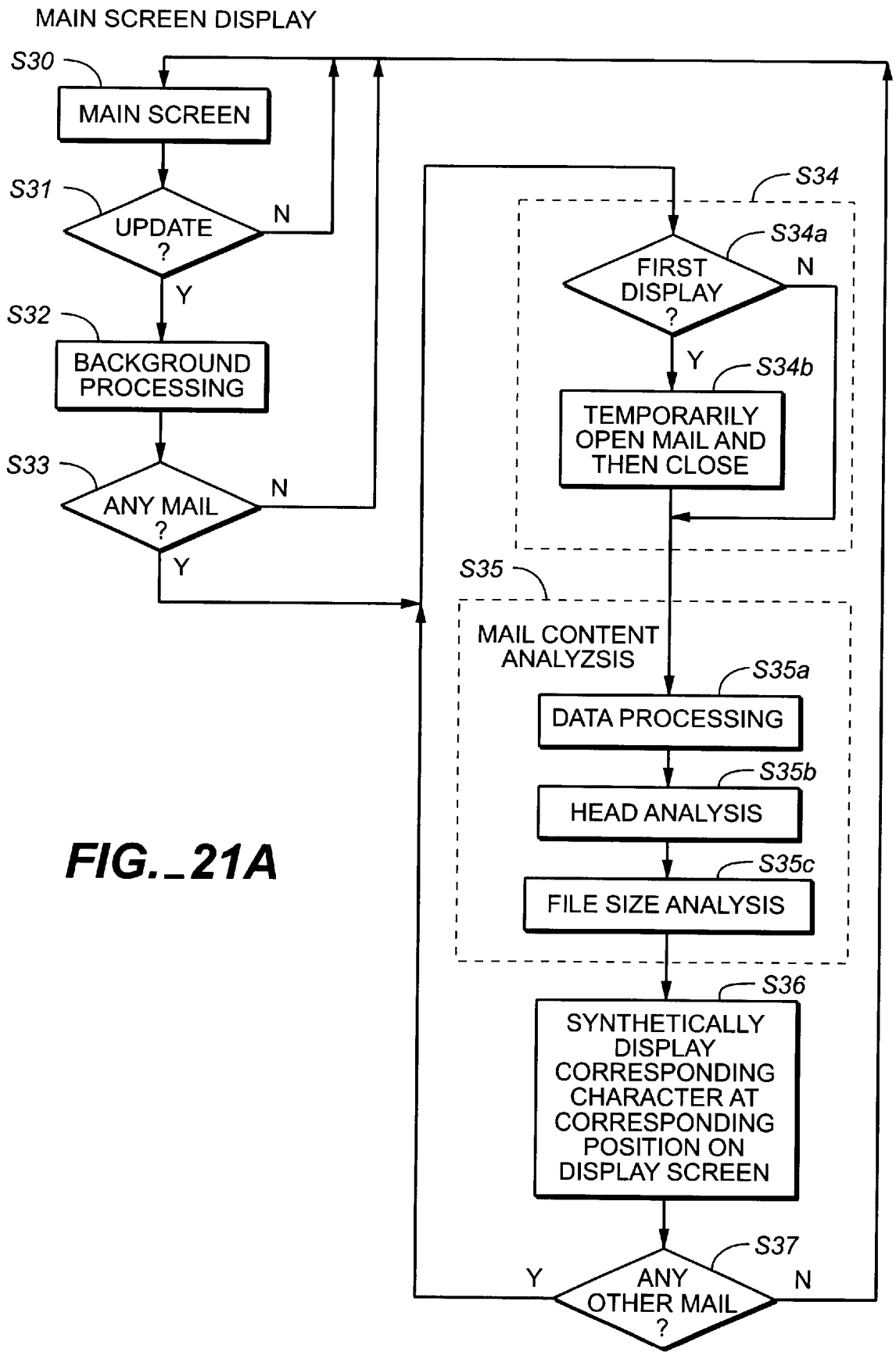
FIG._21A

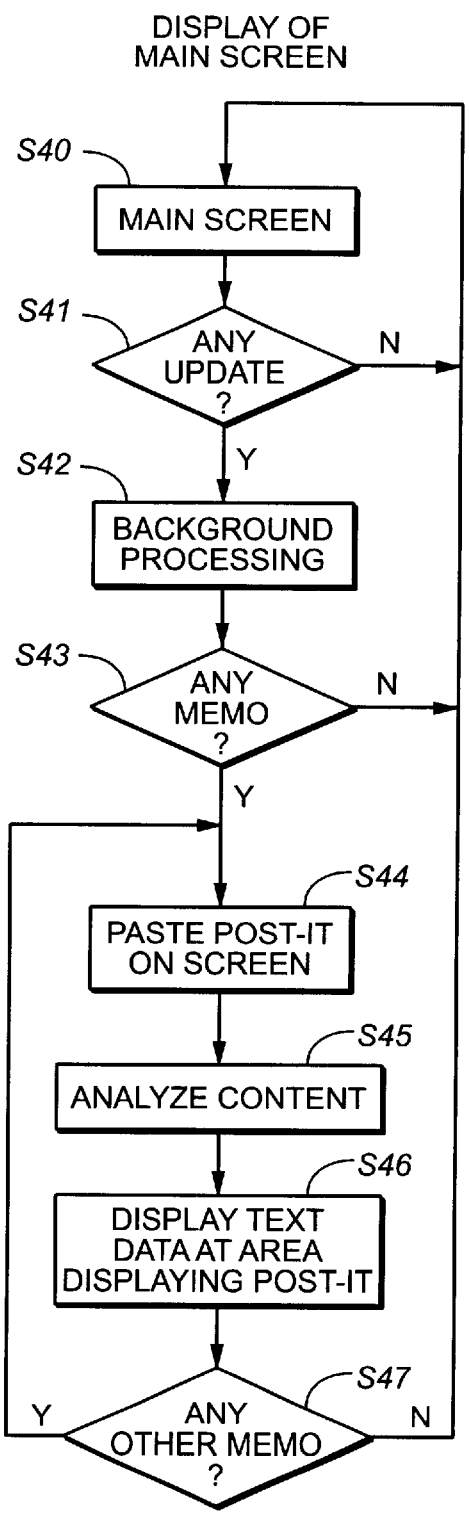
FIG._21B
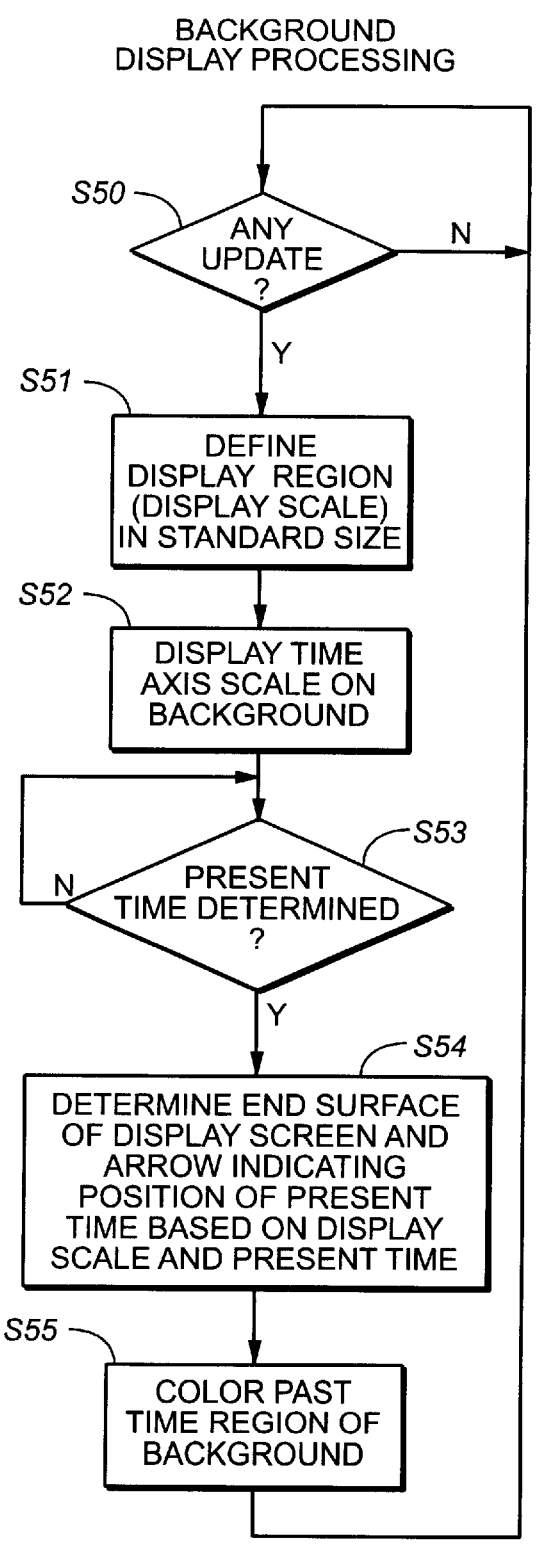
FIG._22A

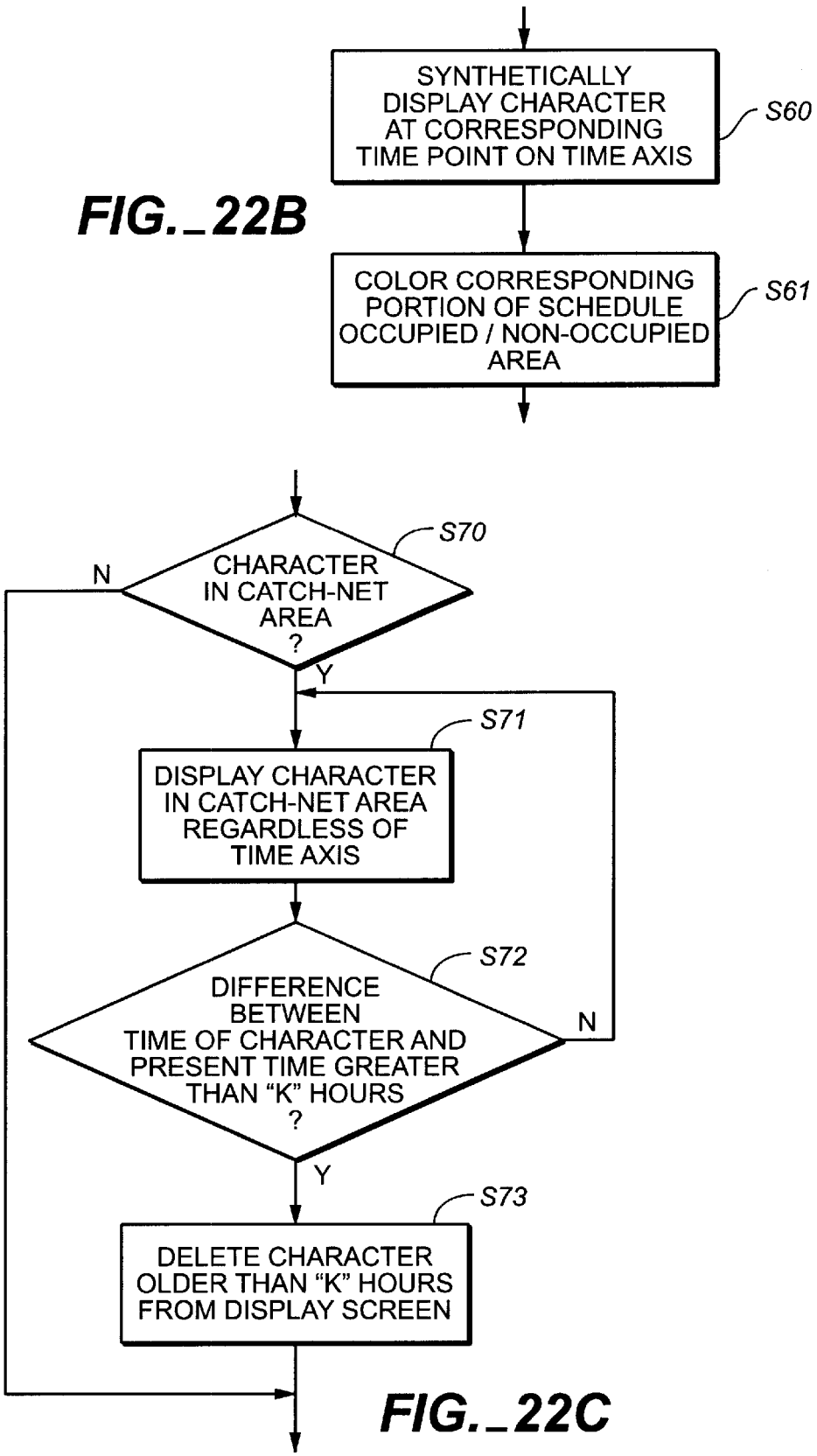

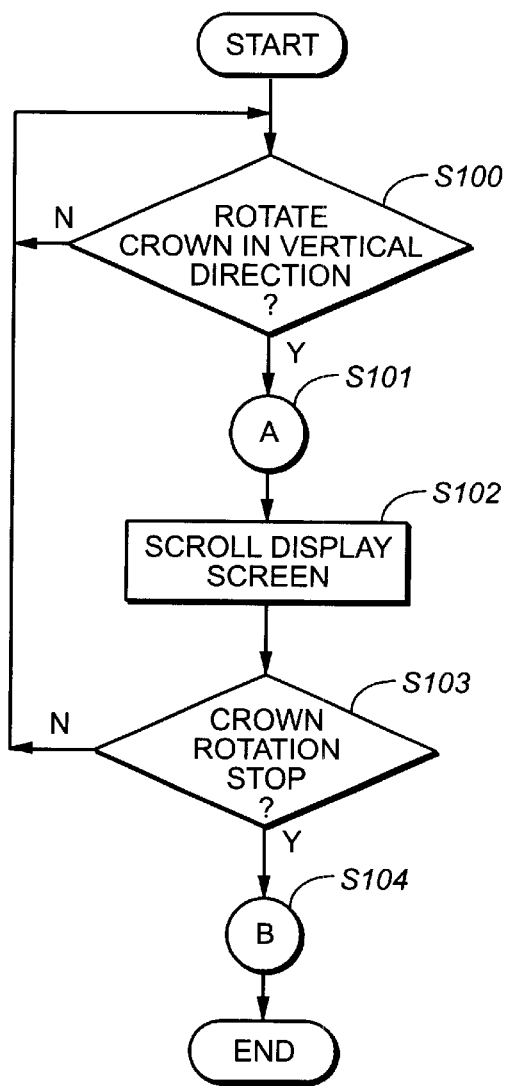
FIG. _23A
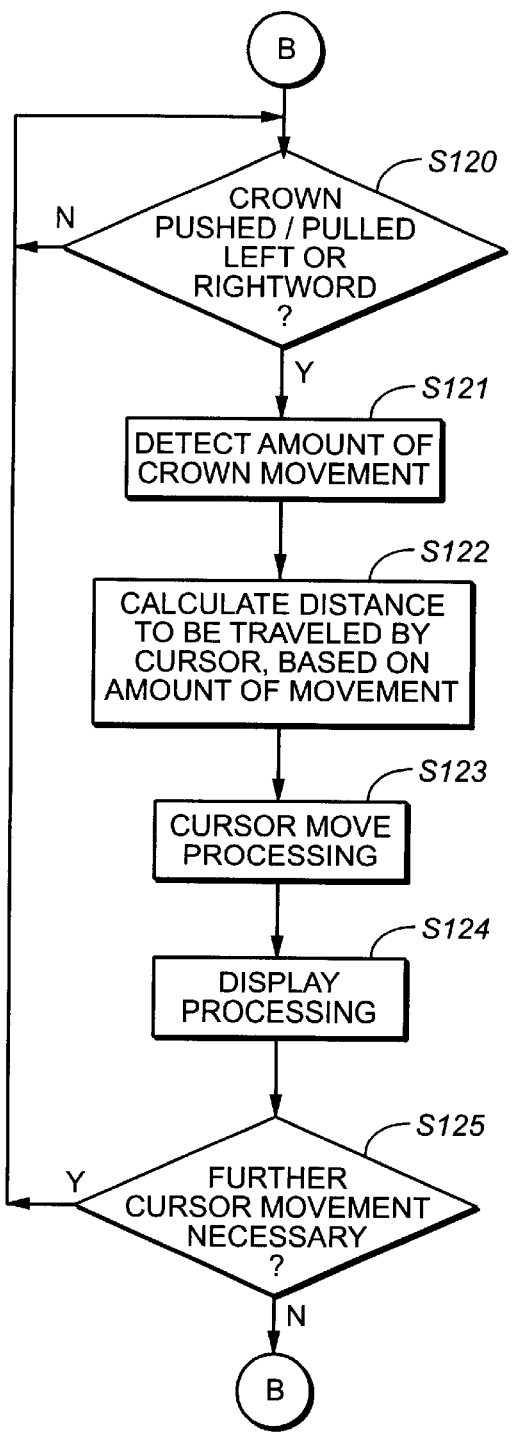
FIG. _23C

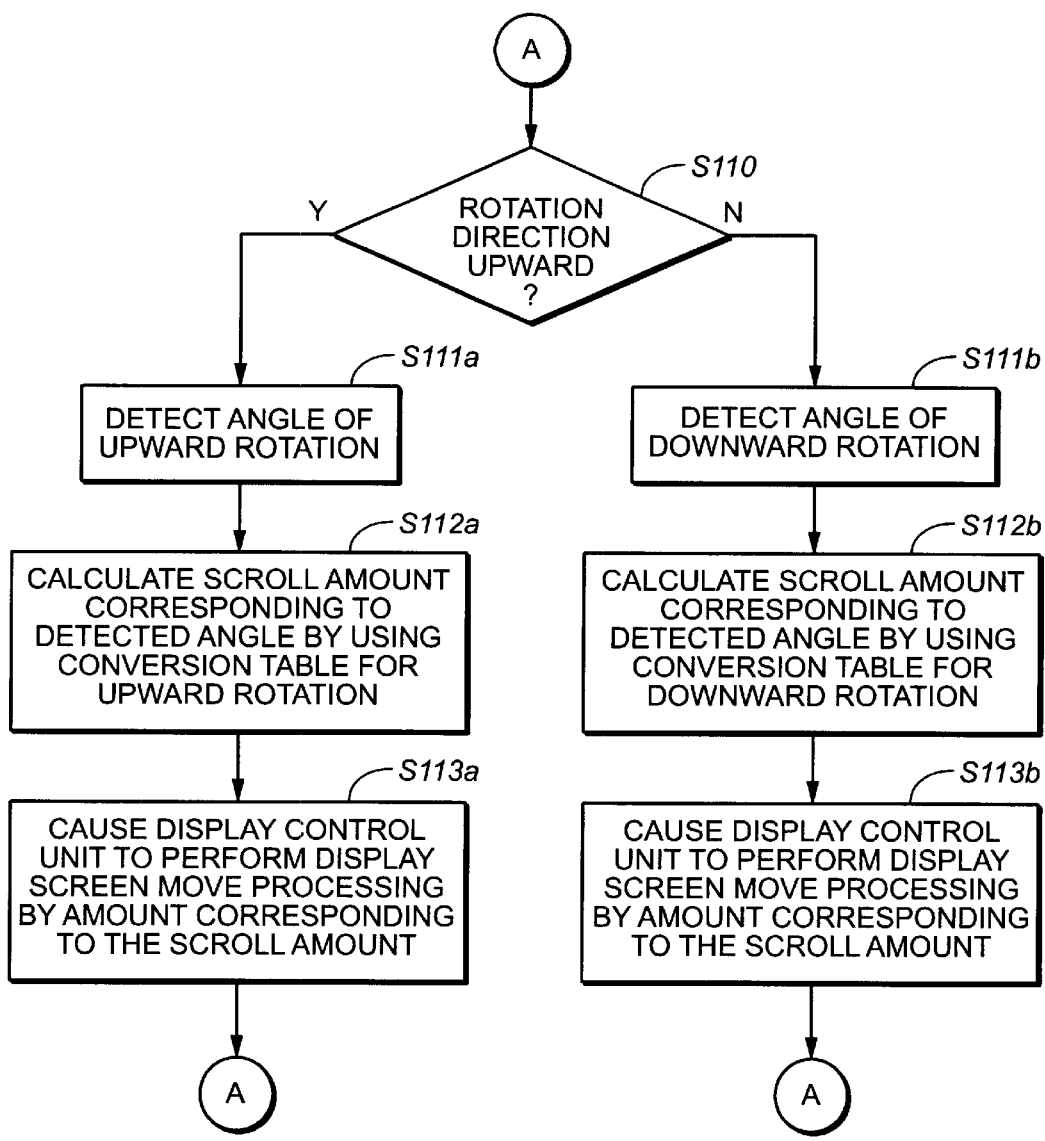
FIG._23B

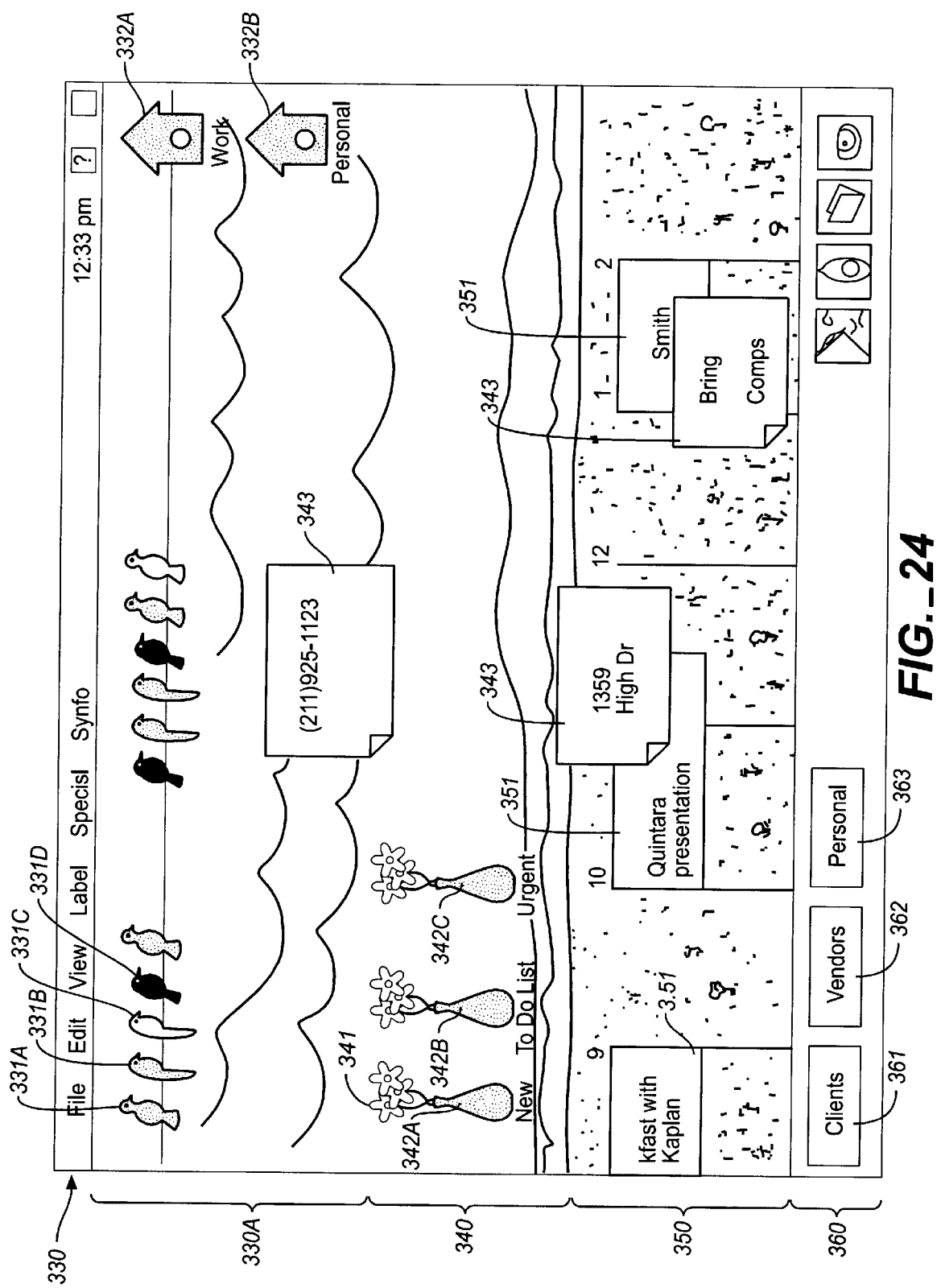
FIG._24

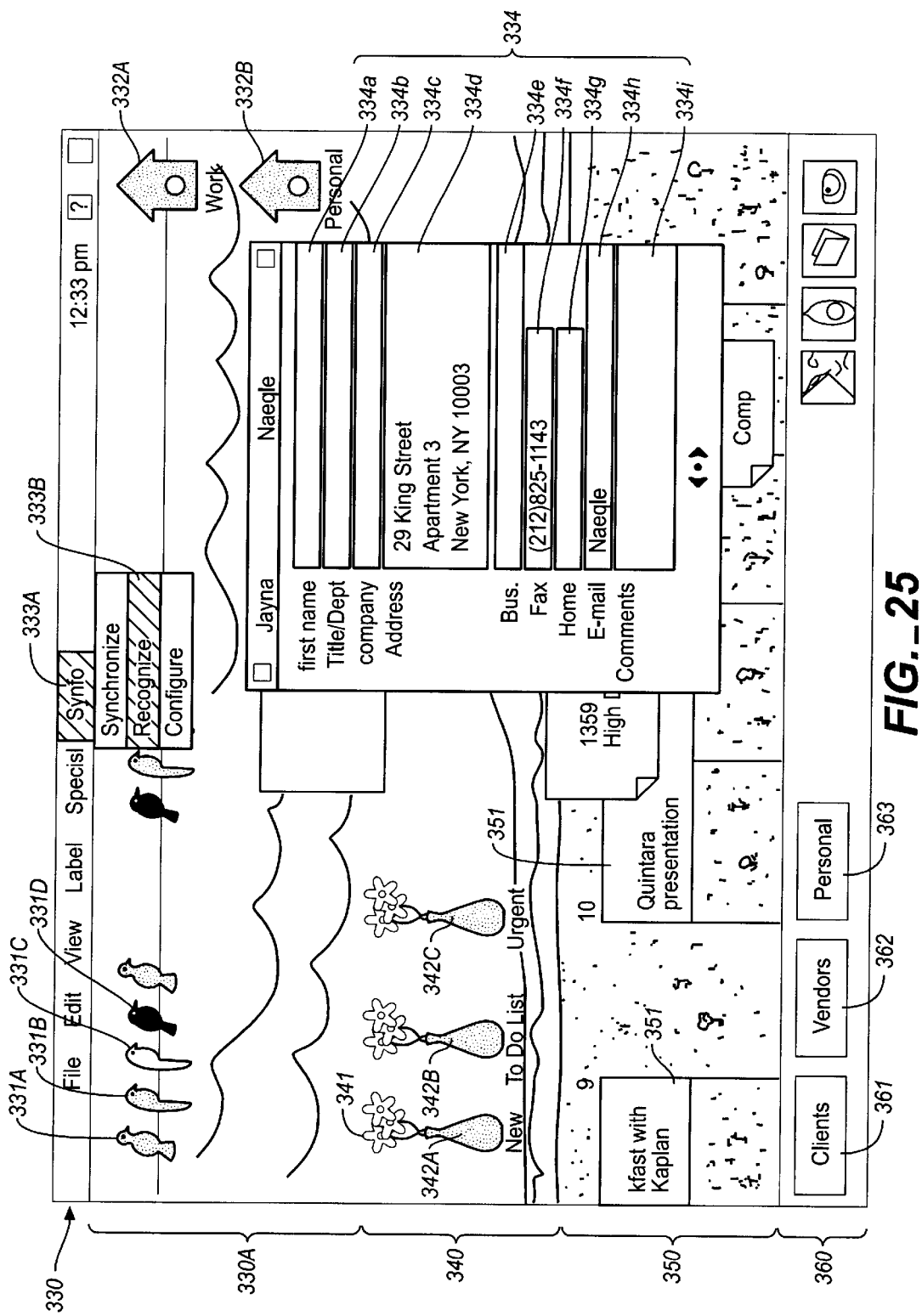
FIG._25

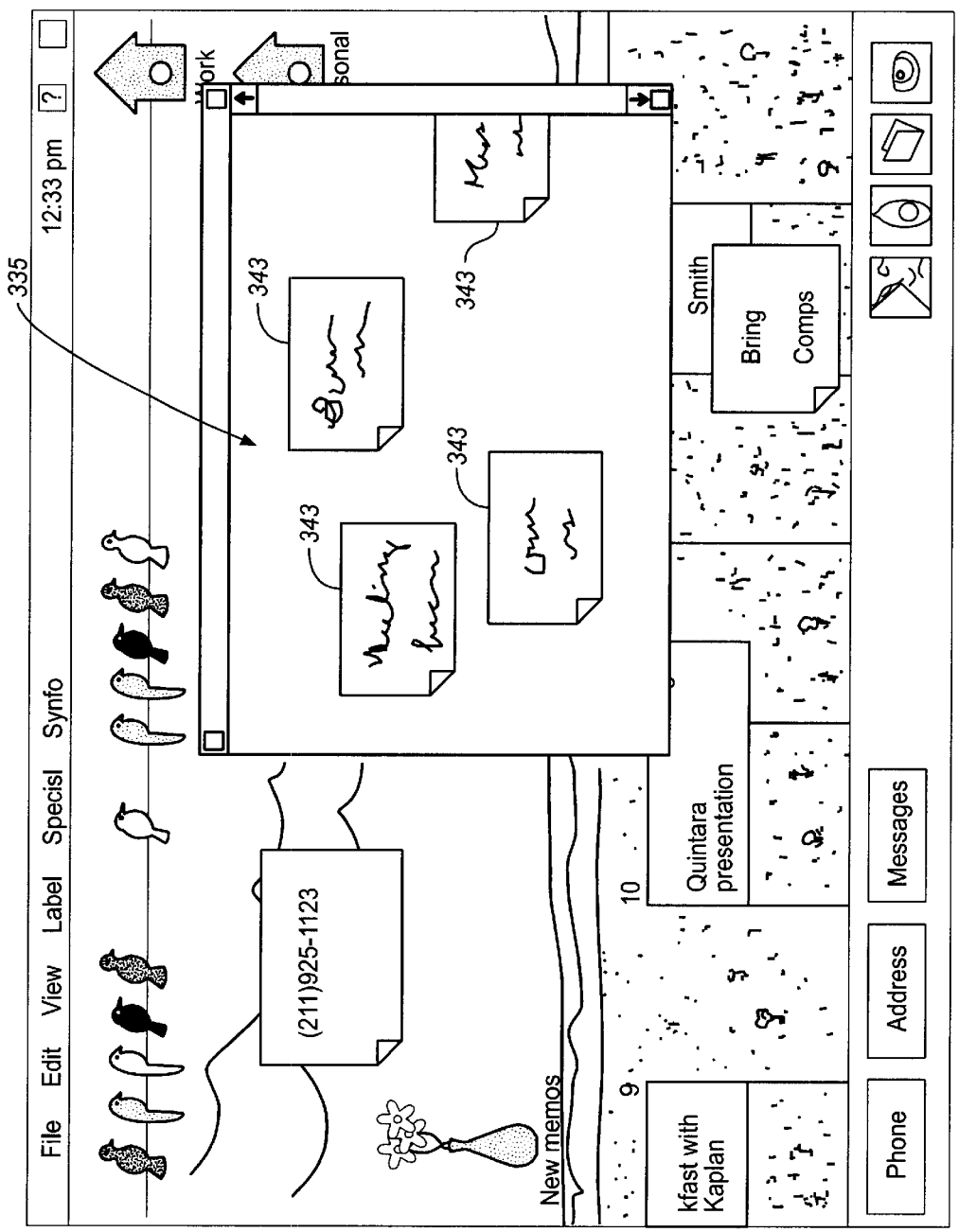
FIG._26

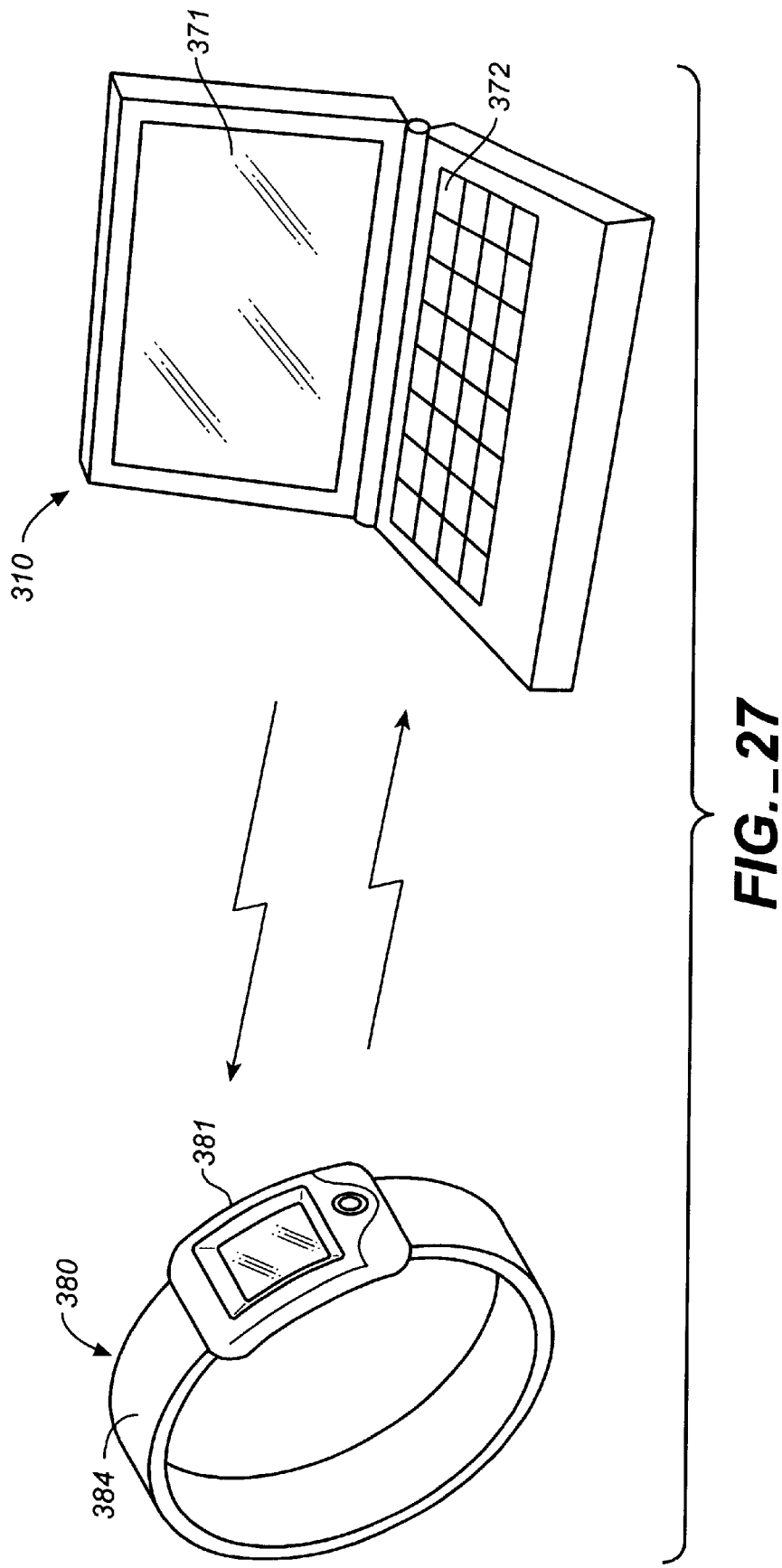
FIG._27

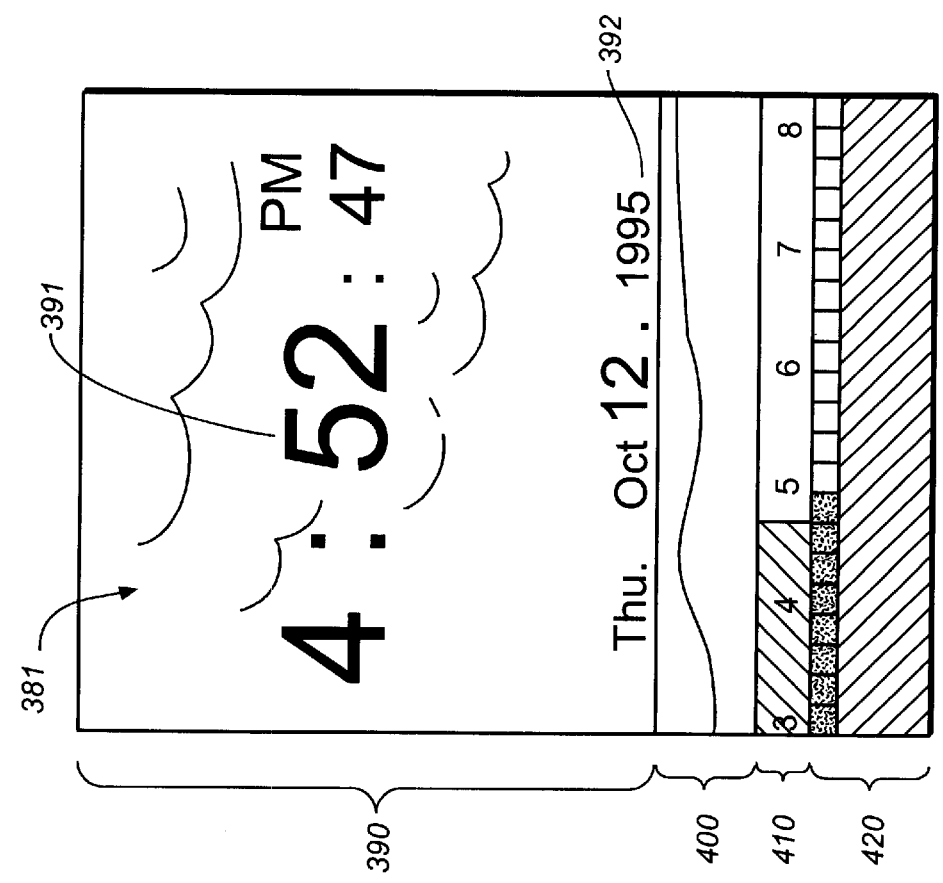
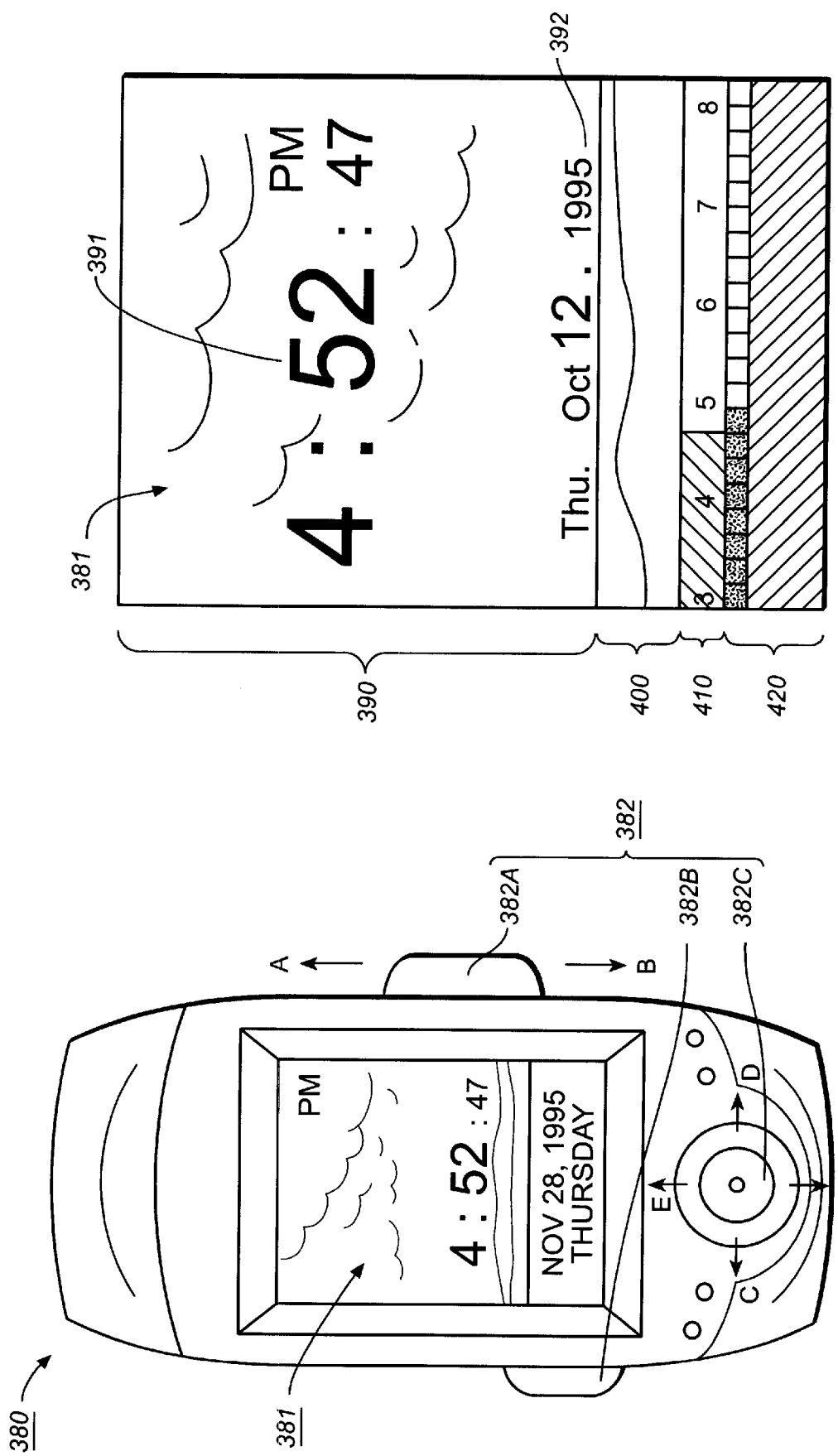
FIG._29
FIG._28

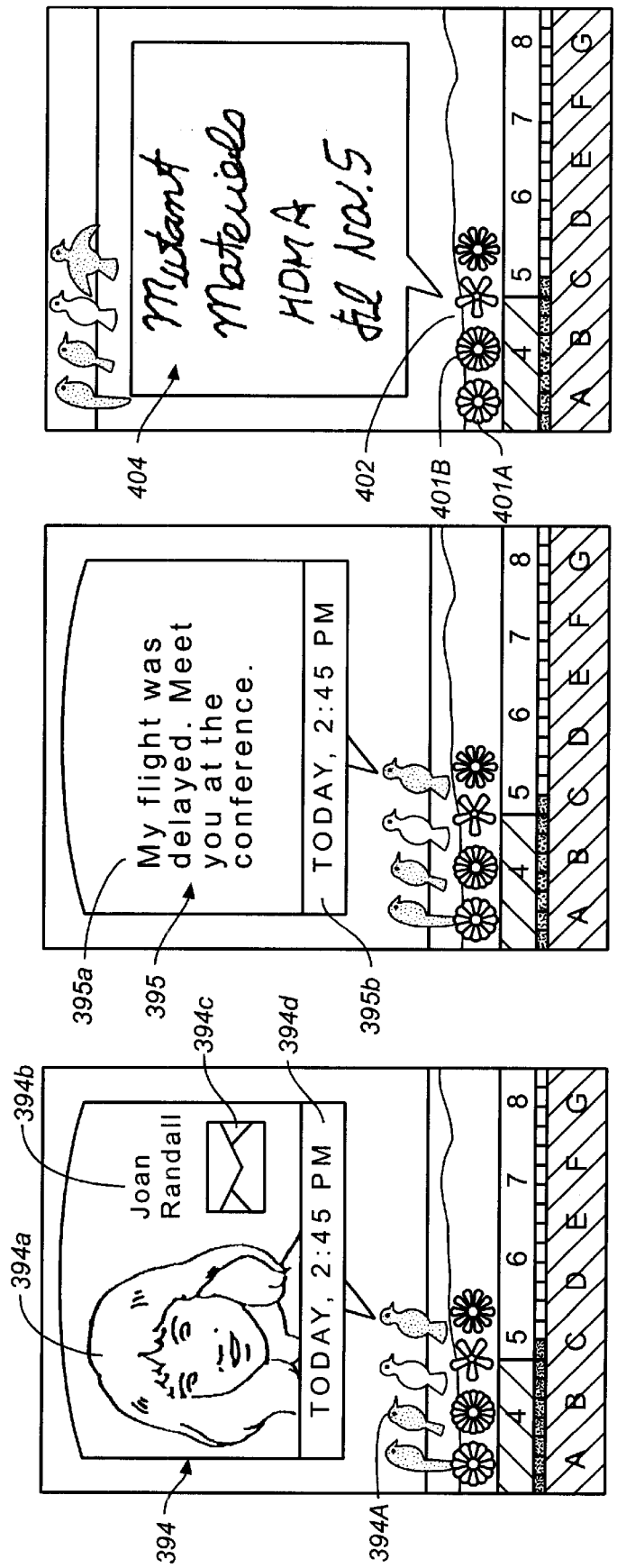

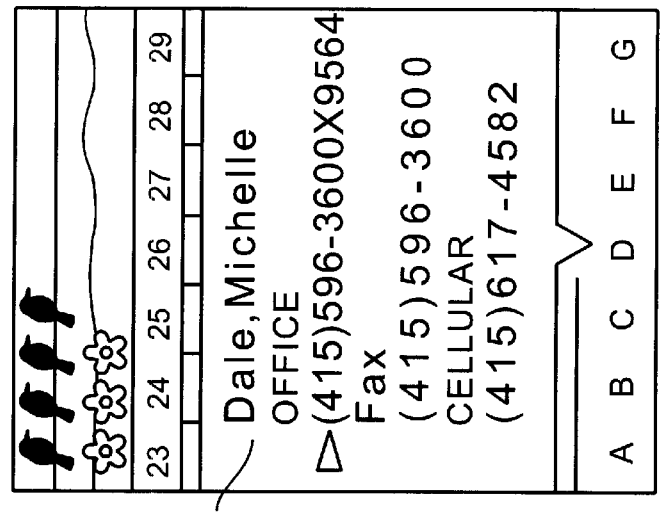
FIG._30F
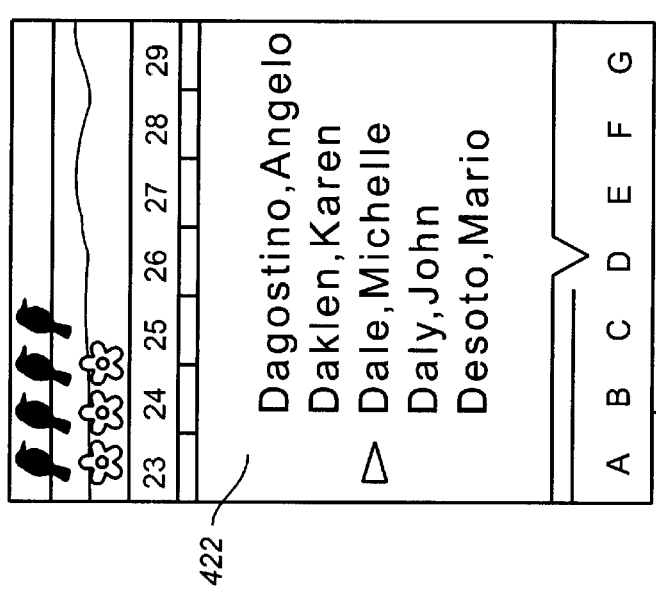
FIG._30E
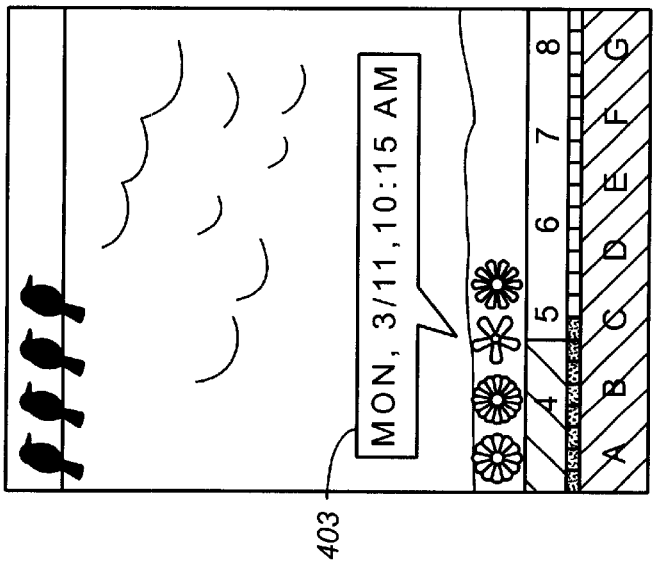
FIG._30D

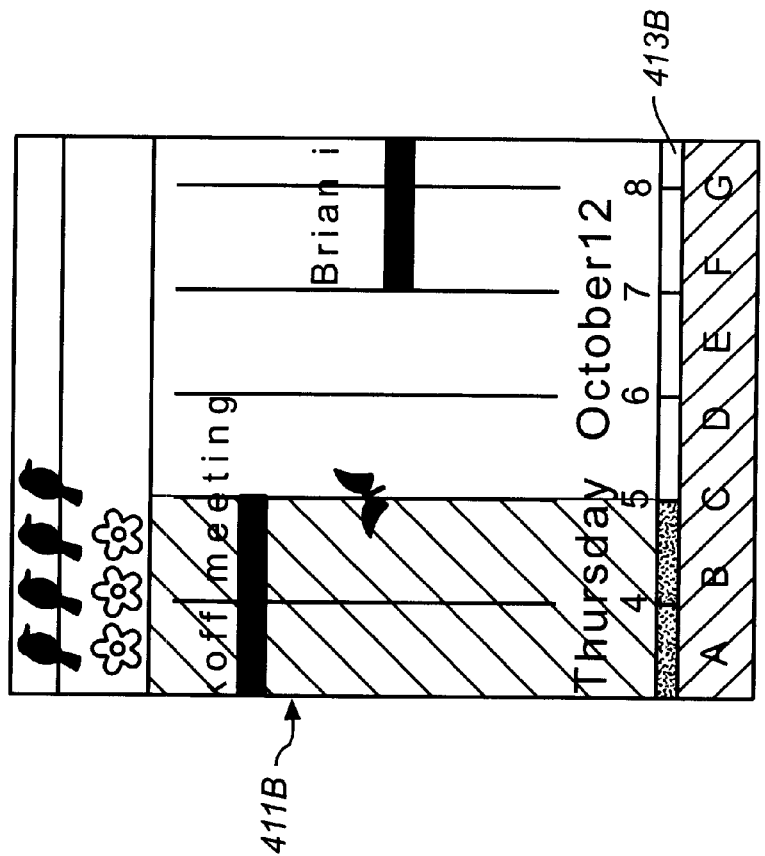
FIG._31B
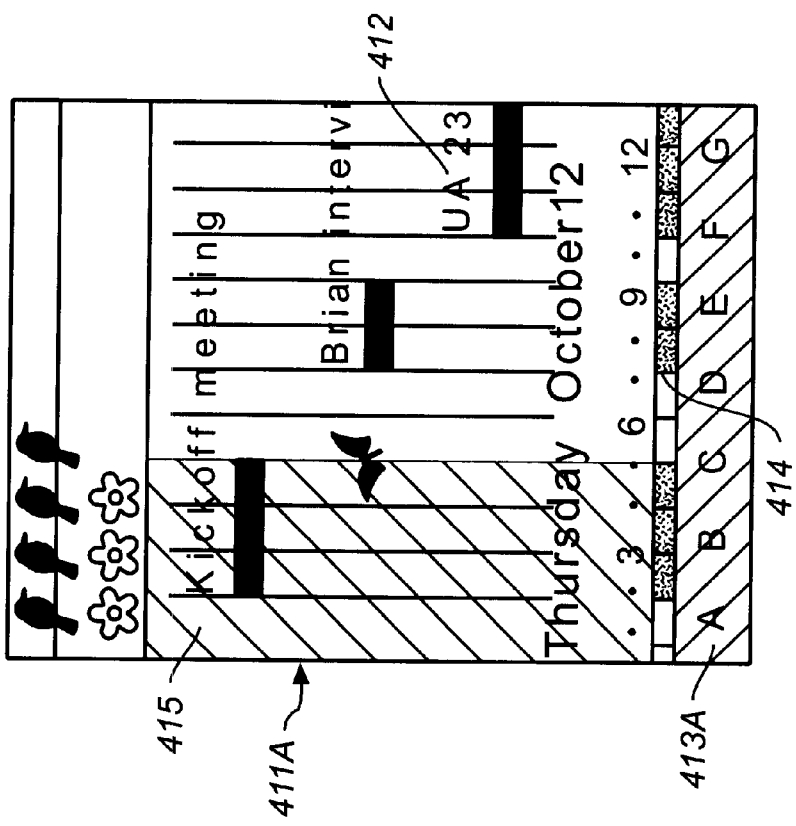
FIG._31A

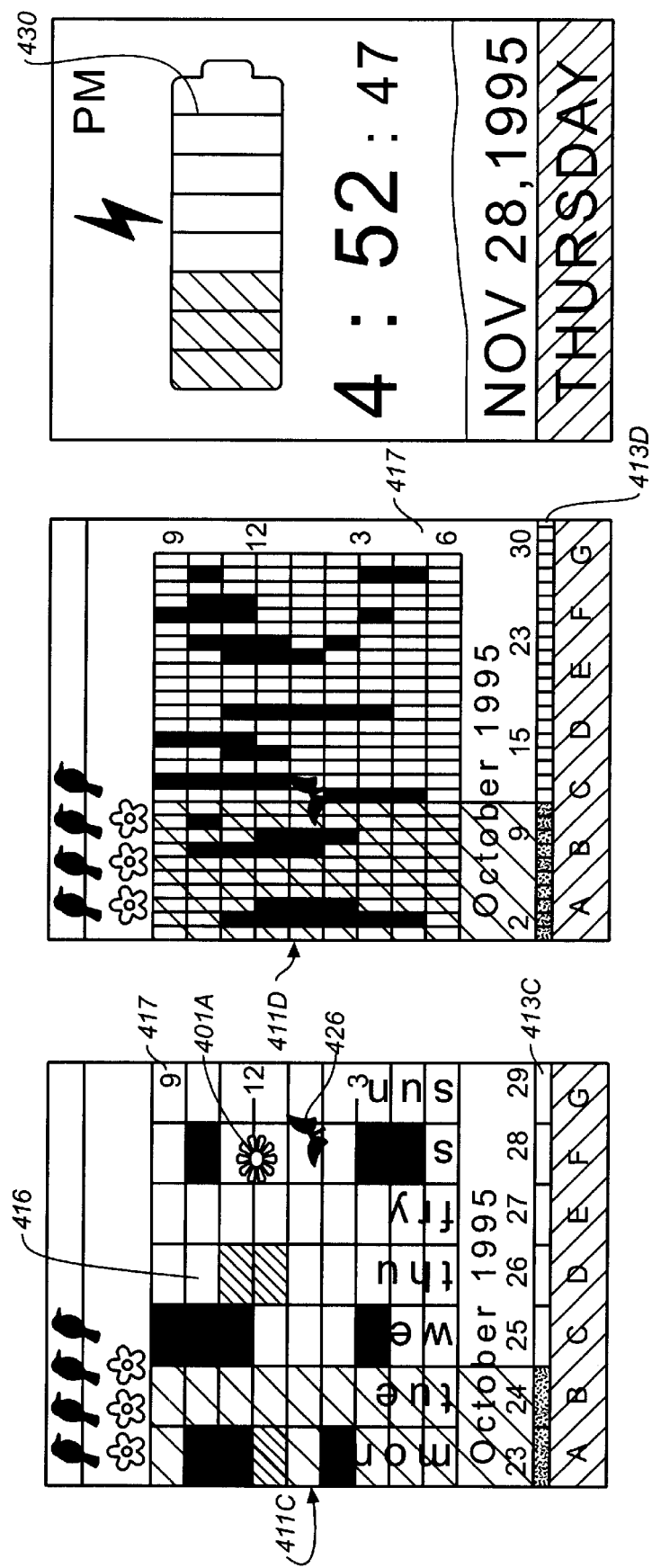

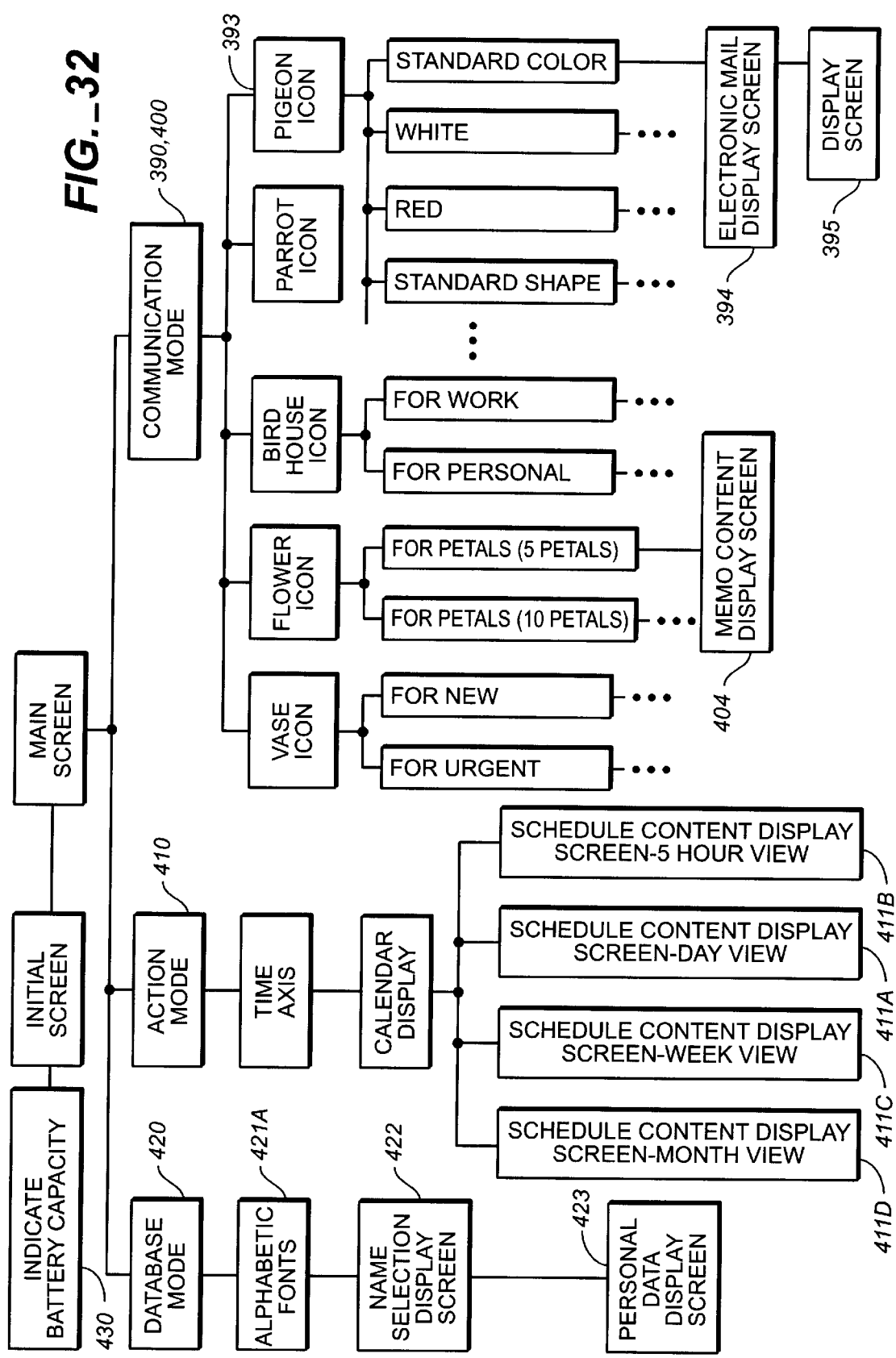
FIG._32

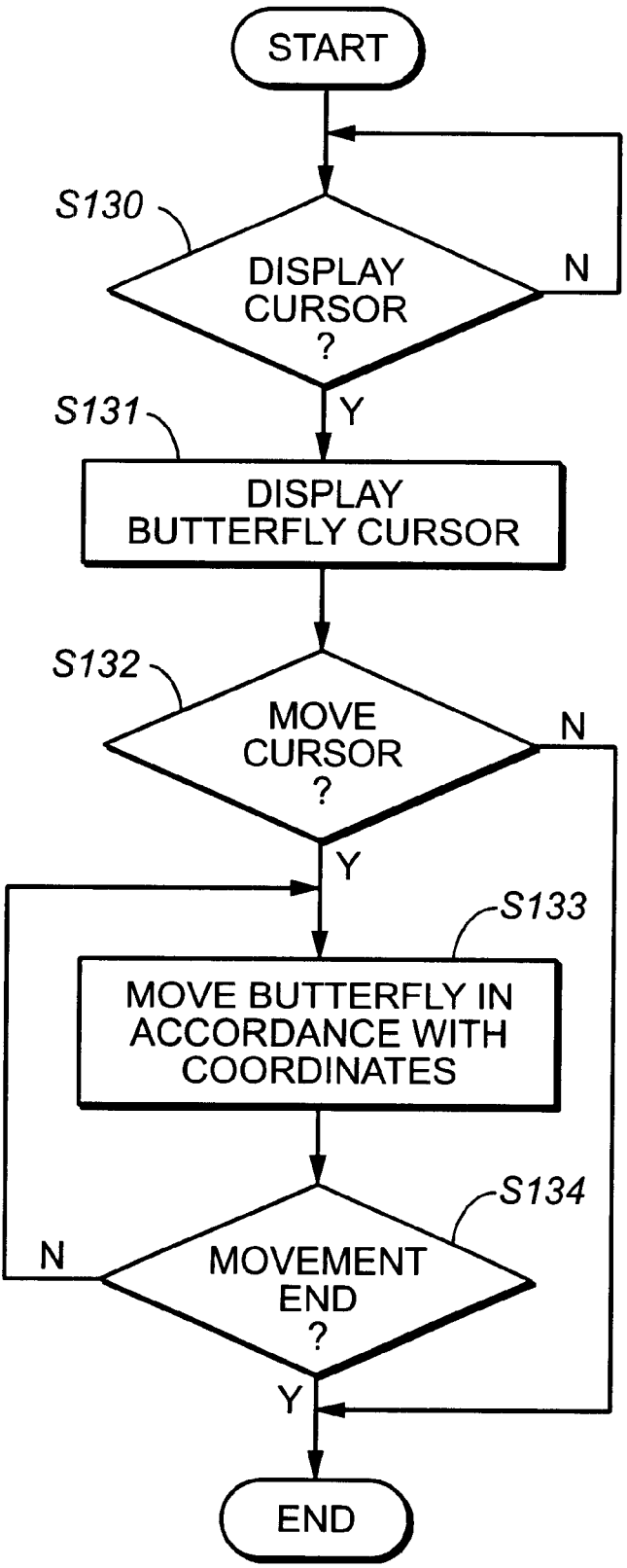
FIG._33

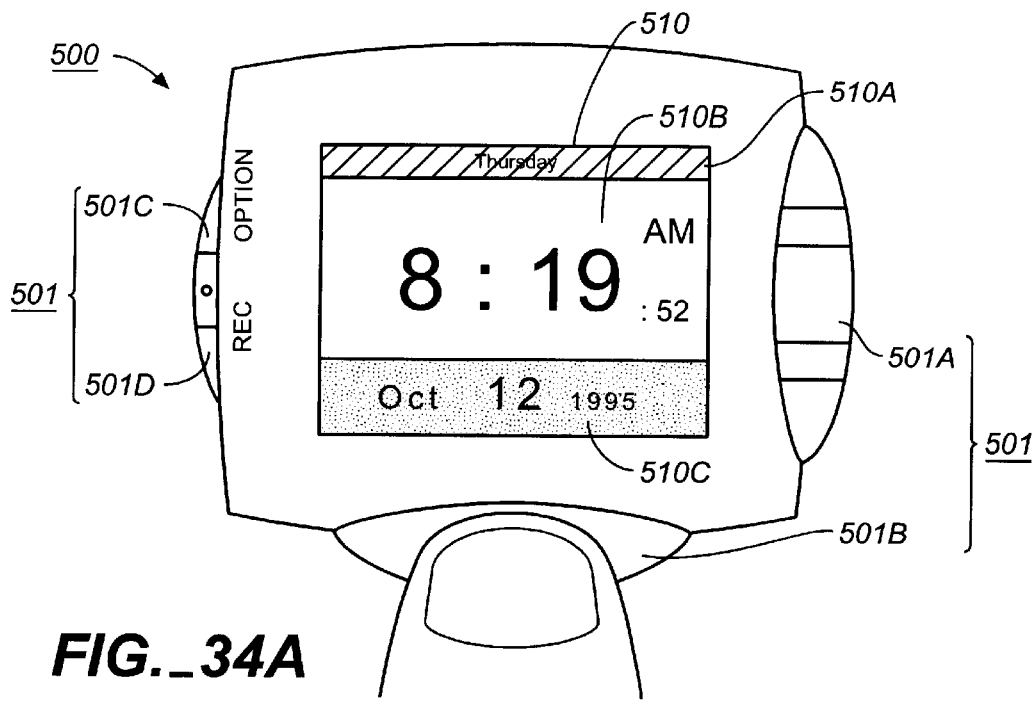
FIG._34A
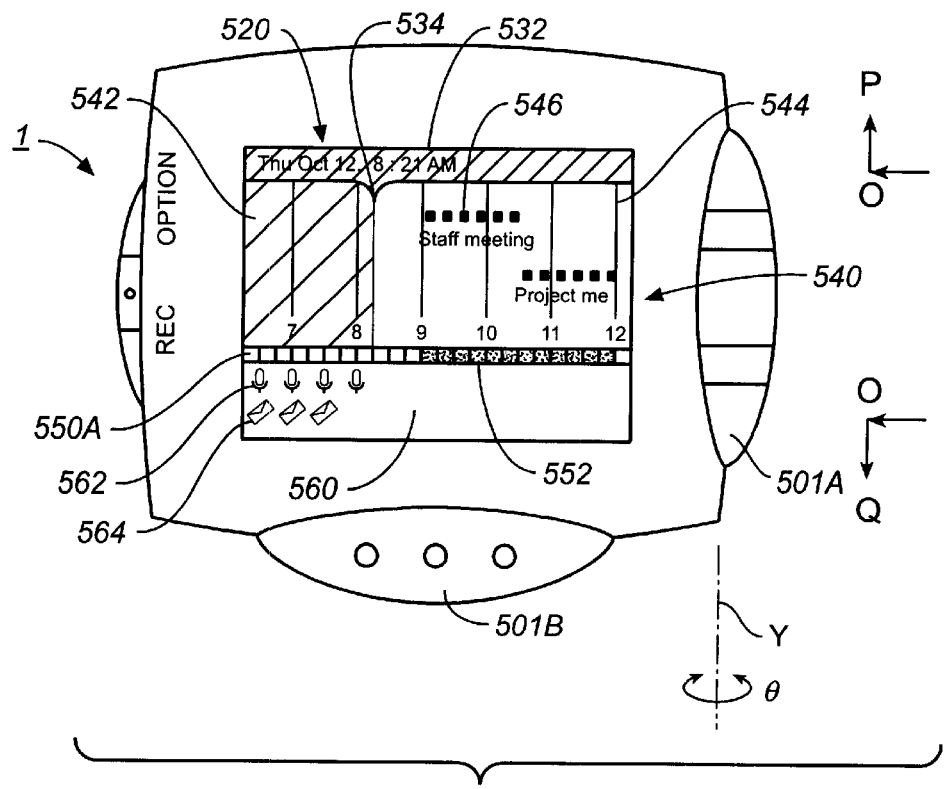
FIG._34B

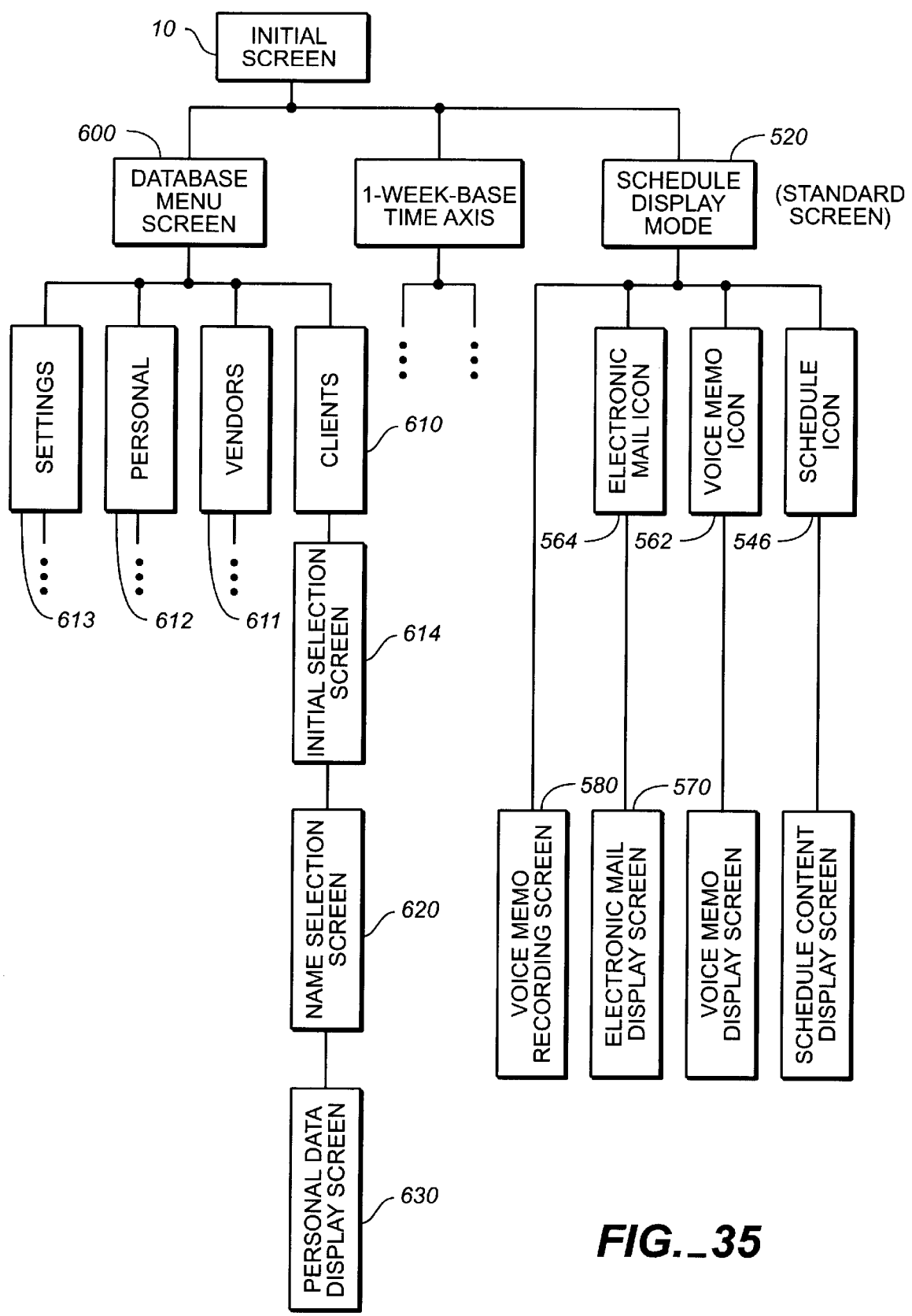
FIG._35

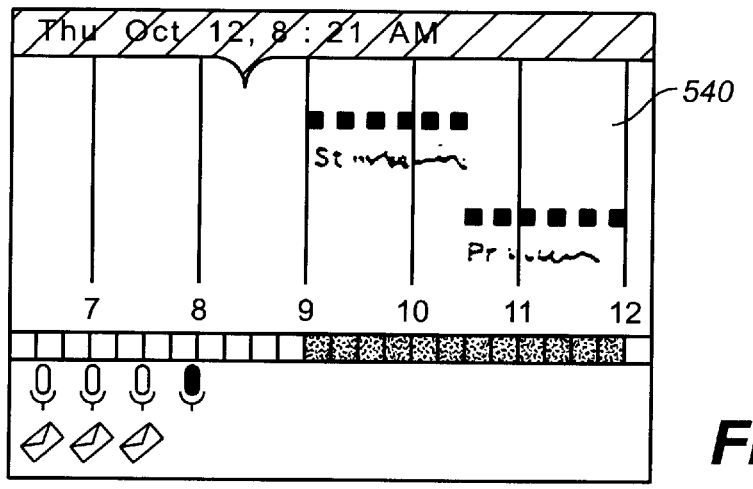
FIG._36A
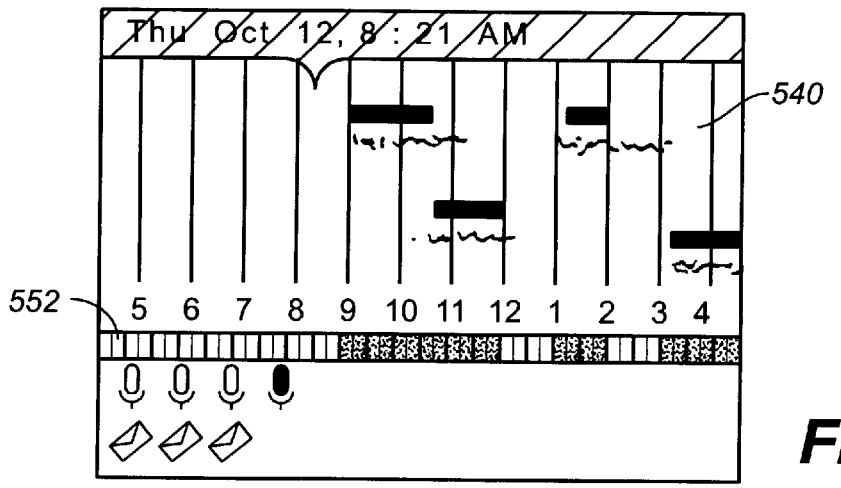
FIG._36B
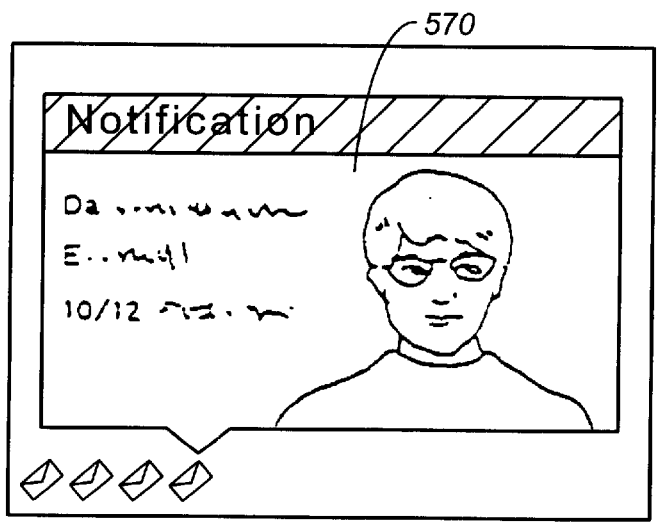
FIG._36C

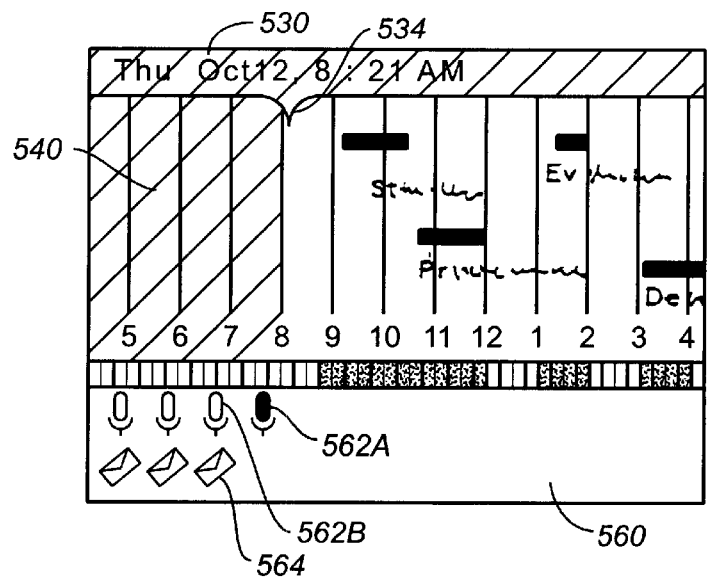
FIG._37A
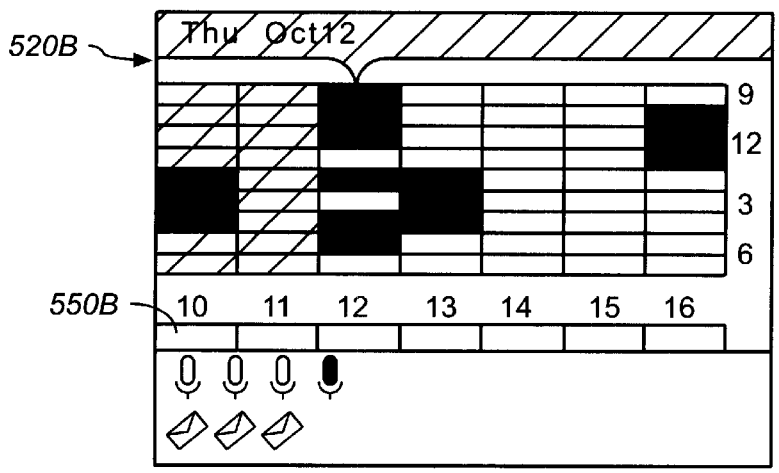
FIG._37B

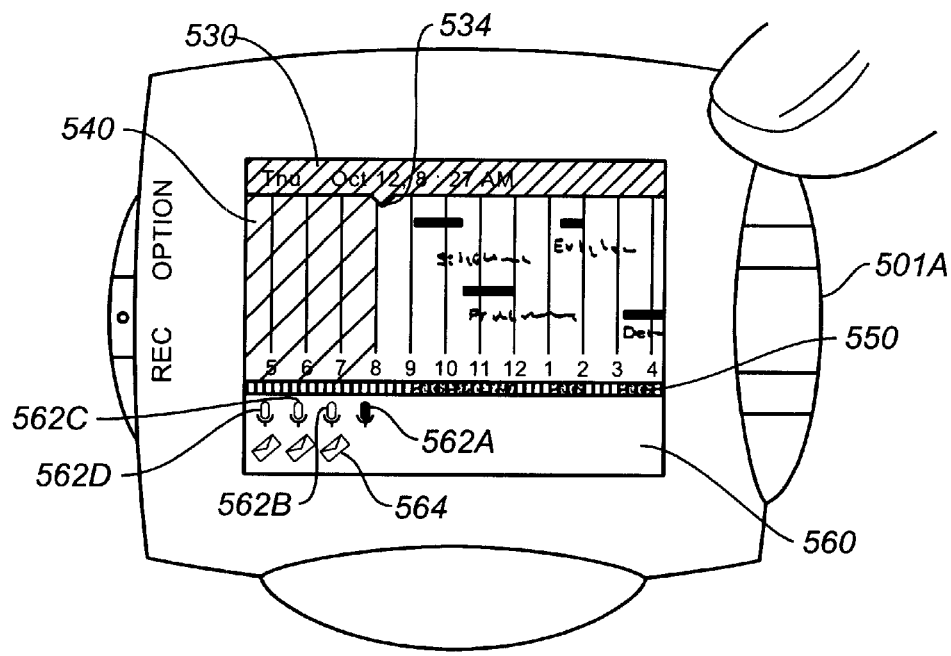
FIG._38A
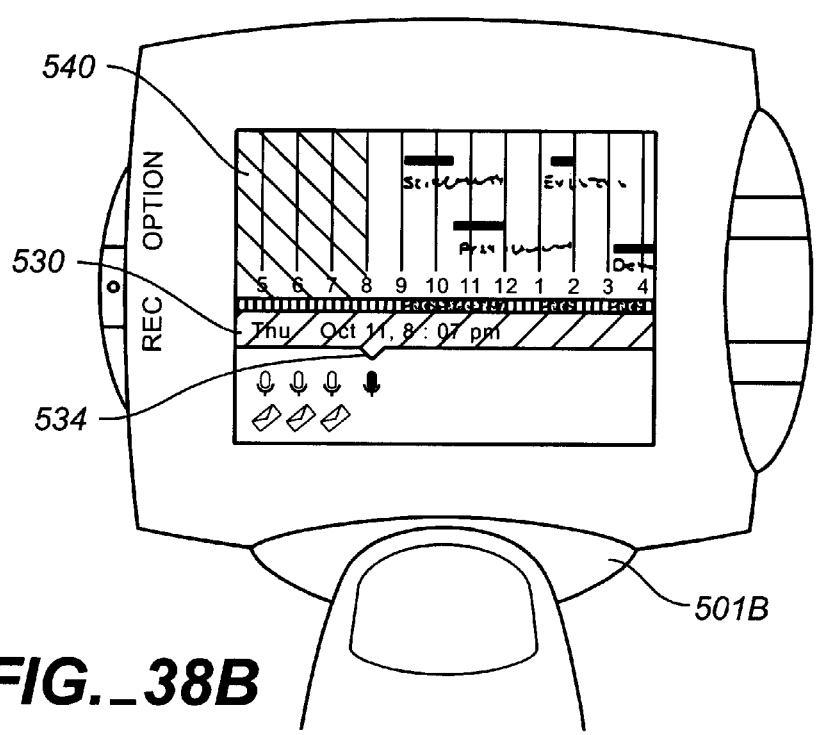
FIG._38B

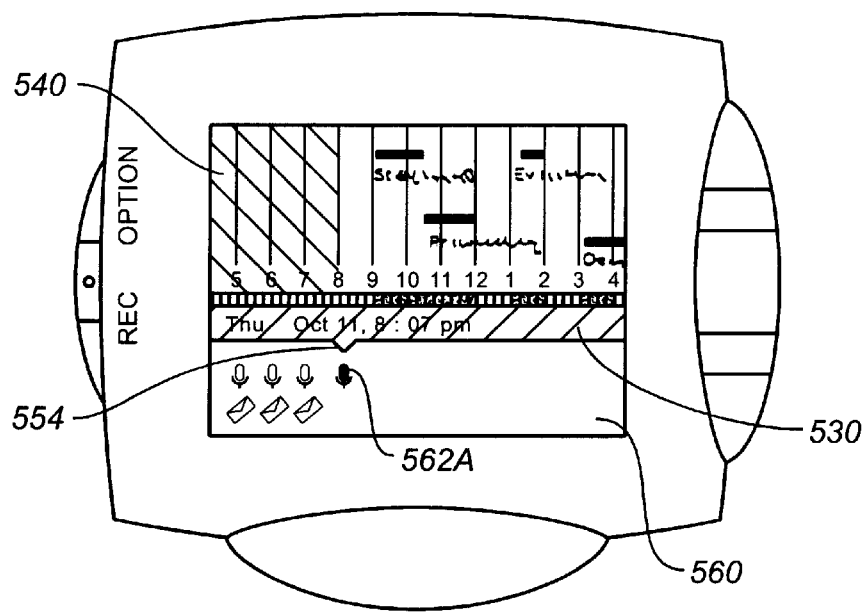
FIG._38C
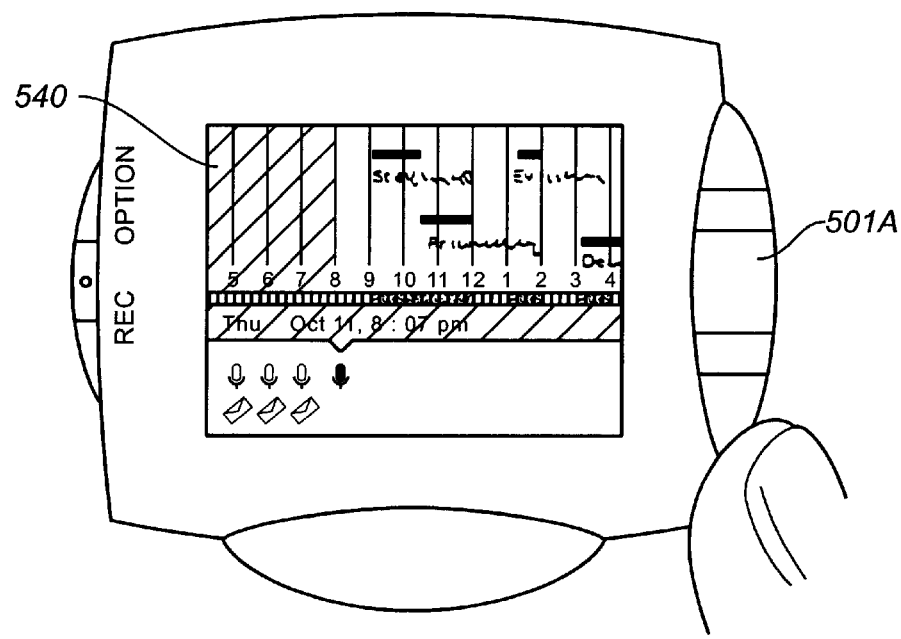
FIG._39A

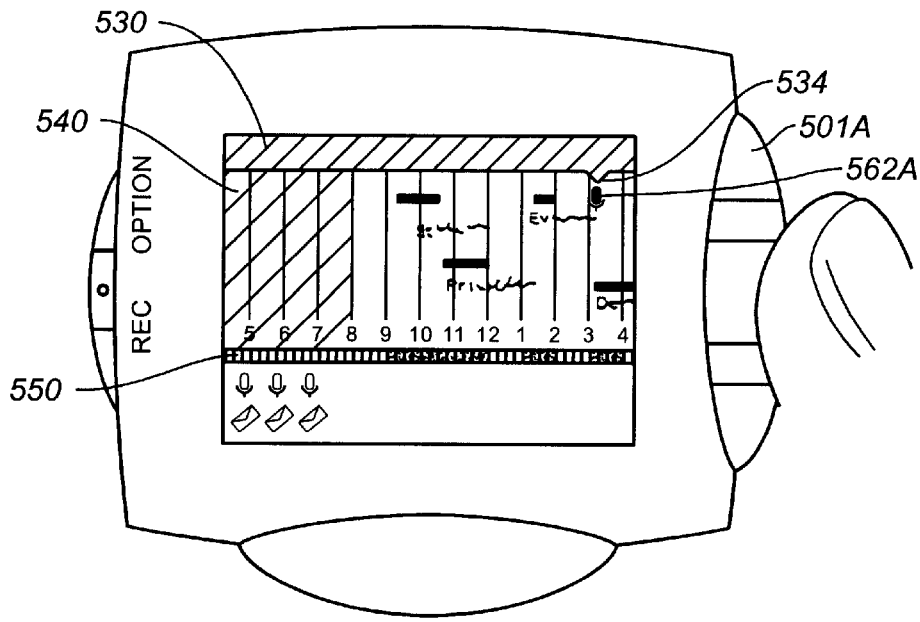
FIG._39B
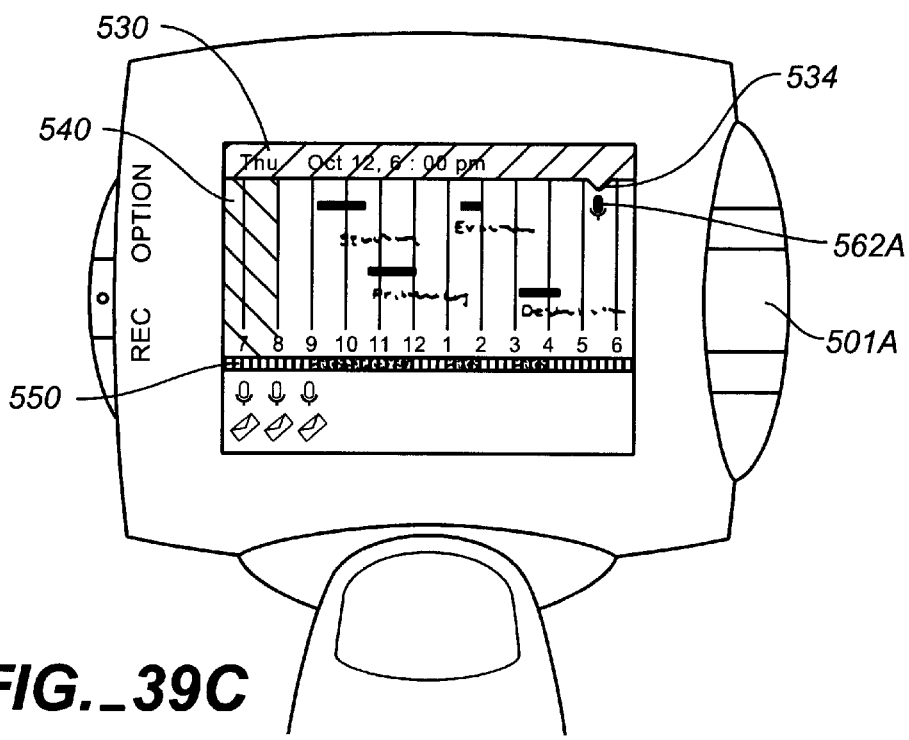
FIG._39C

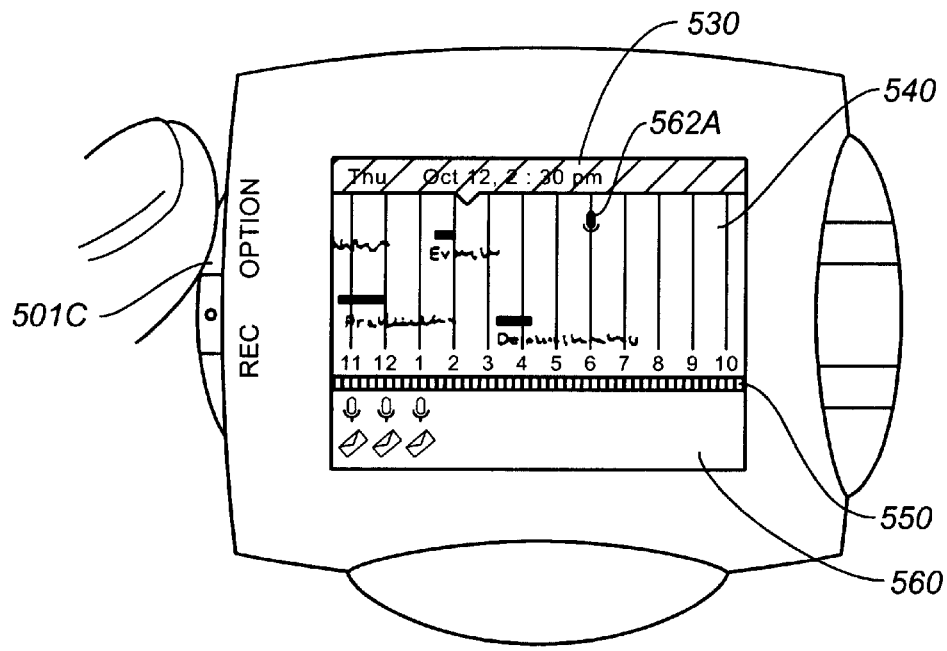
FIG._40A
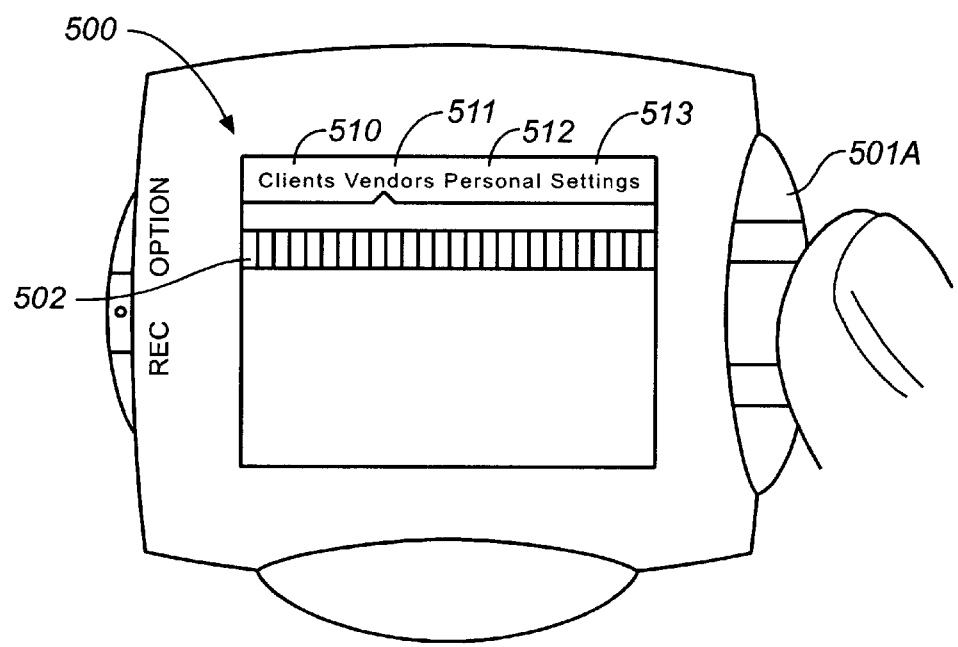
FIG._40B

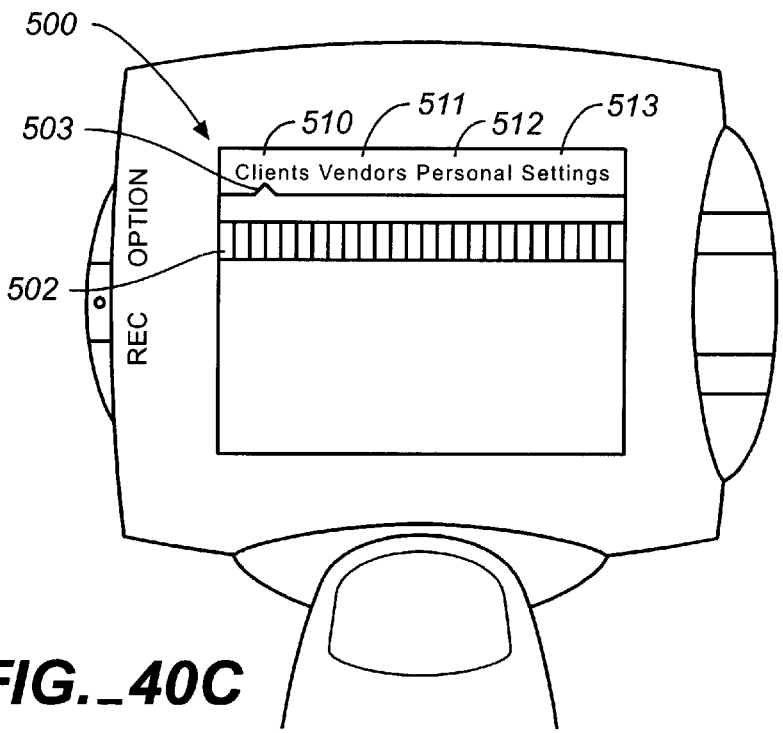
FIG._40C
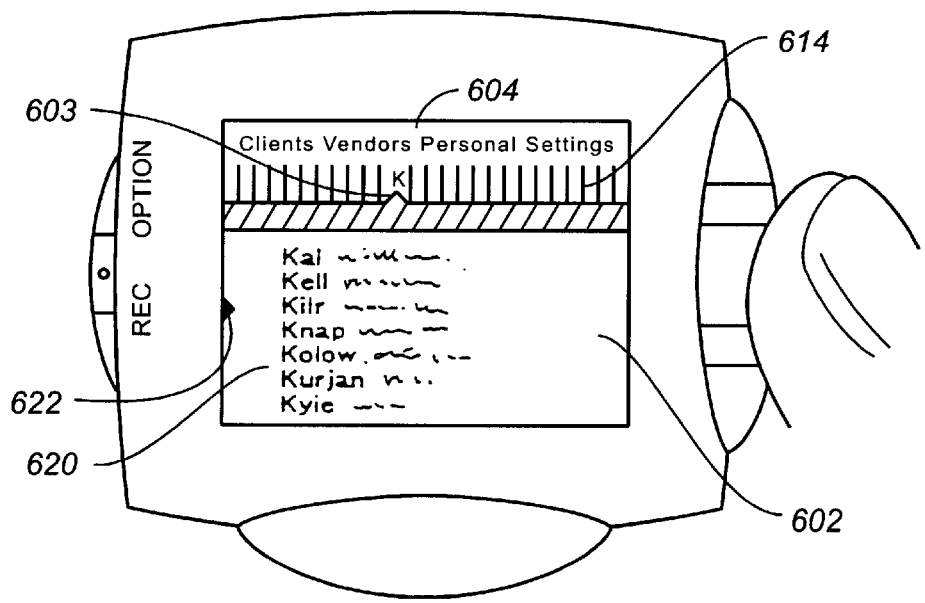
FIG._41A

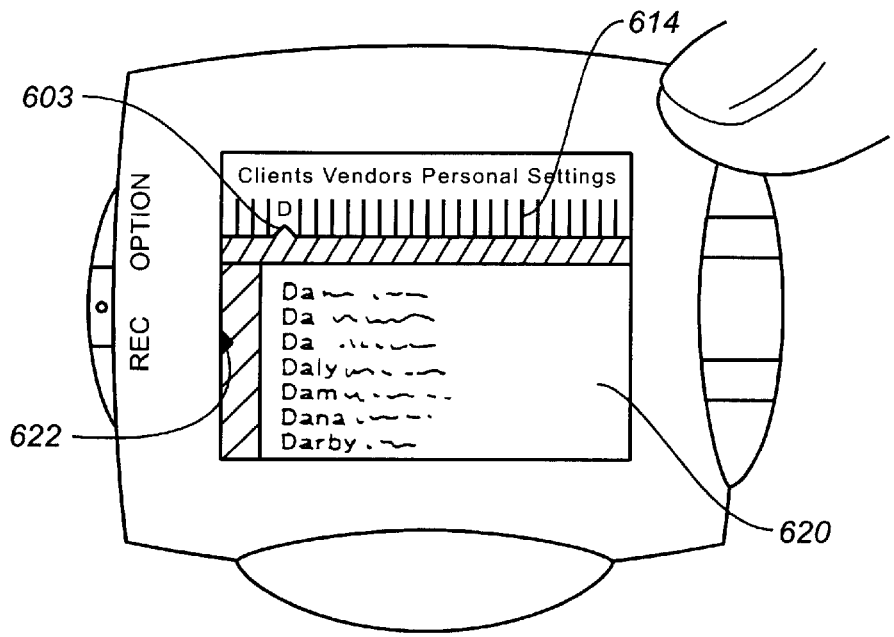
FIG._41B
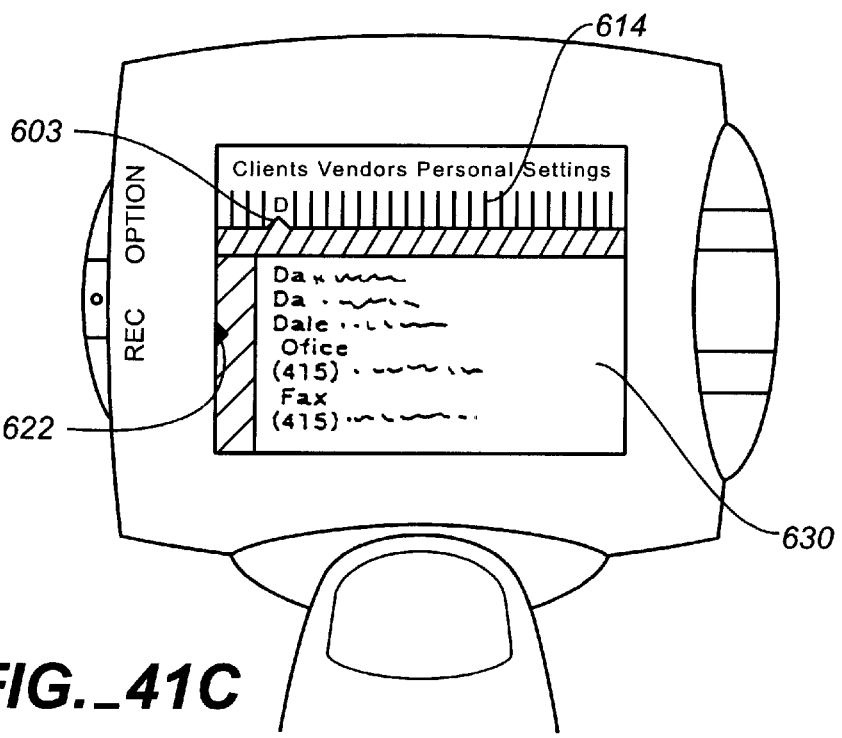
FIG._41C

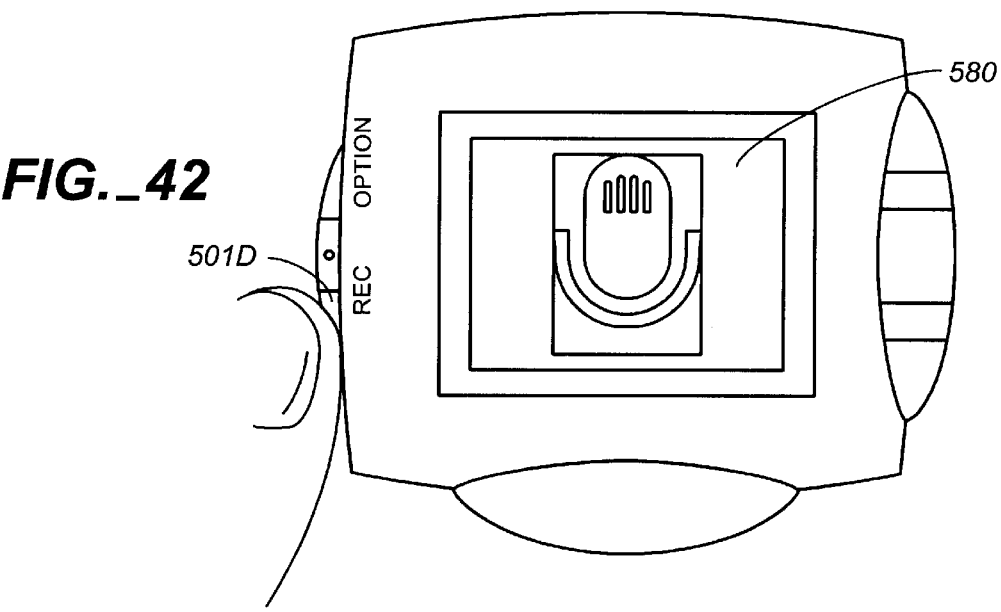
FIG._42
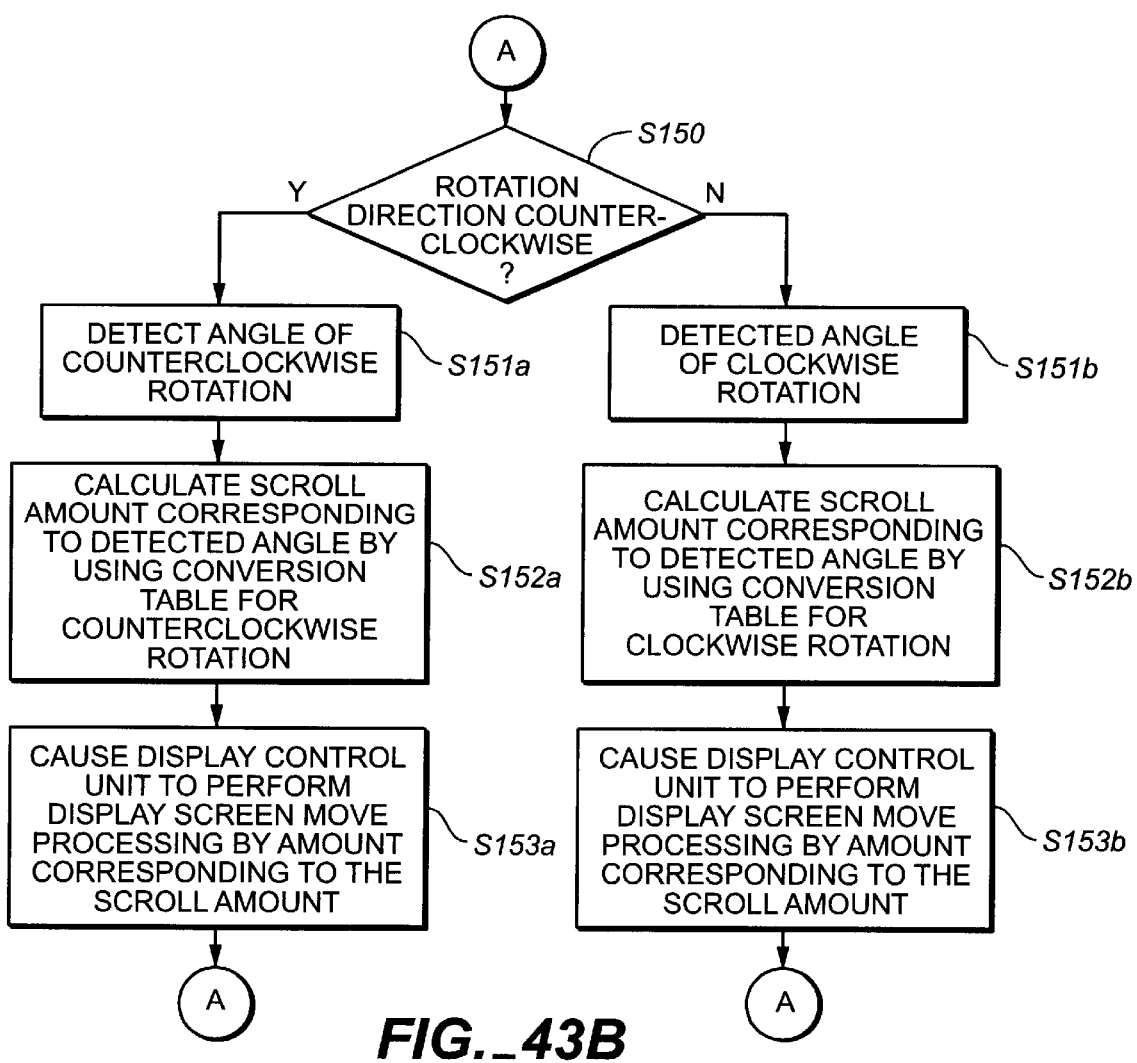
FIG._43B

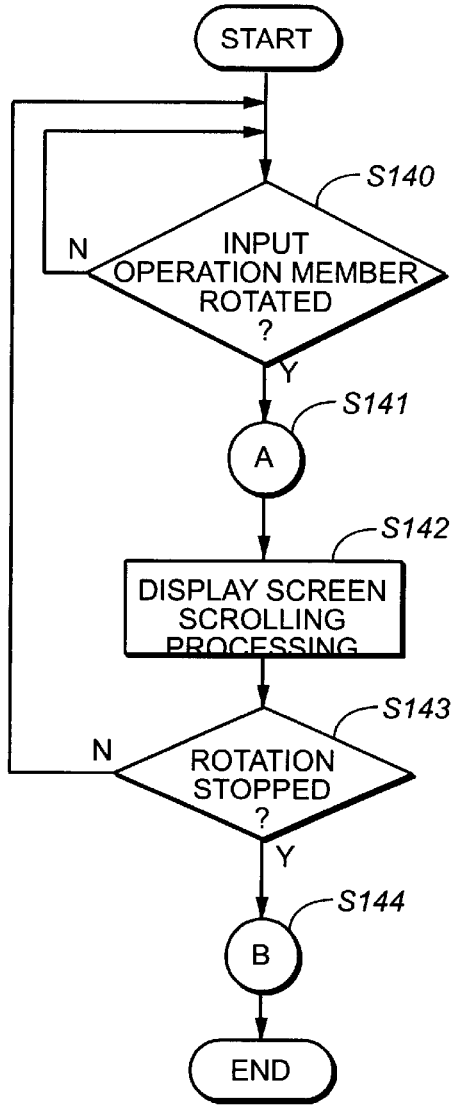
FIG._43A
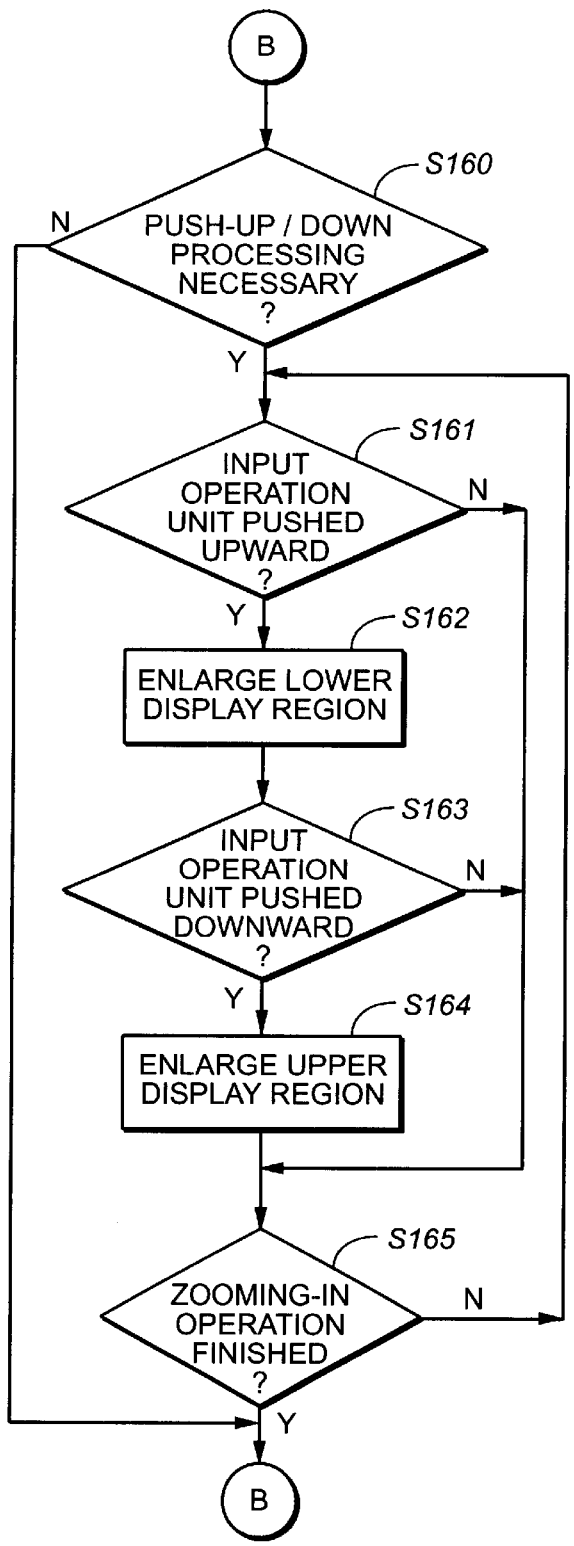
FIG._43C

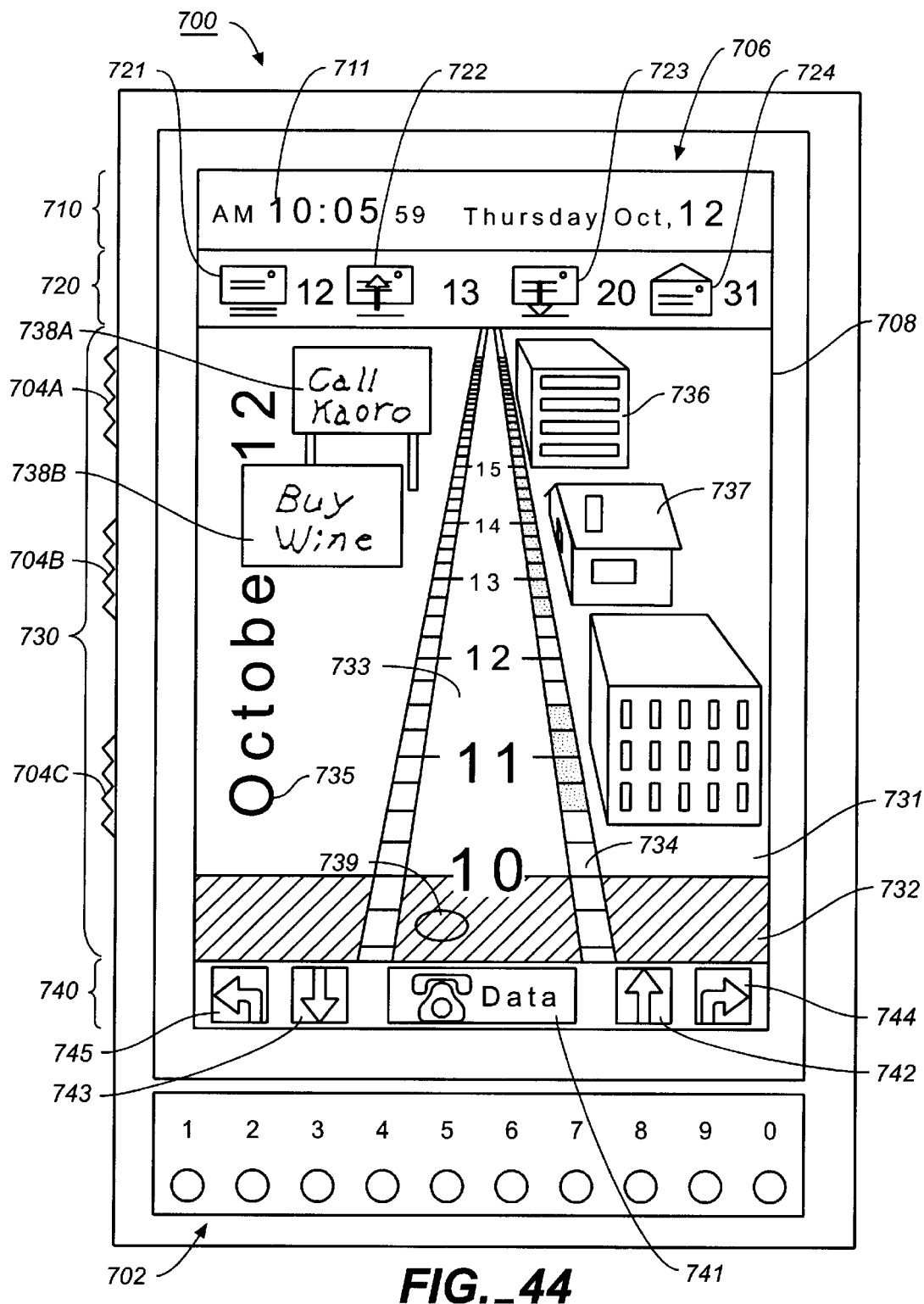
FIG._44

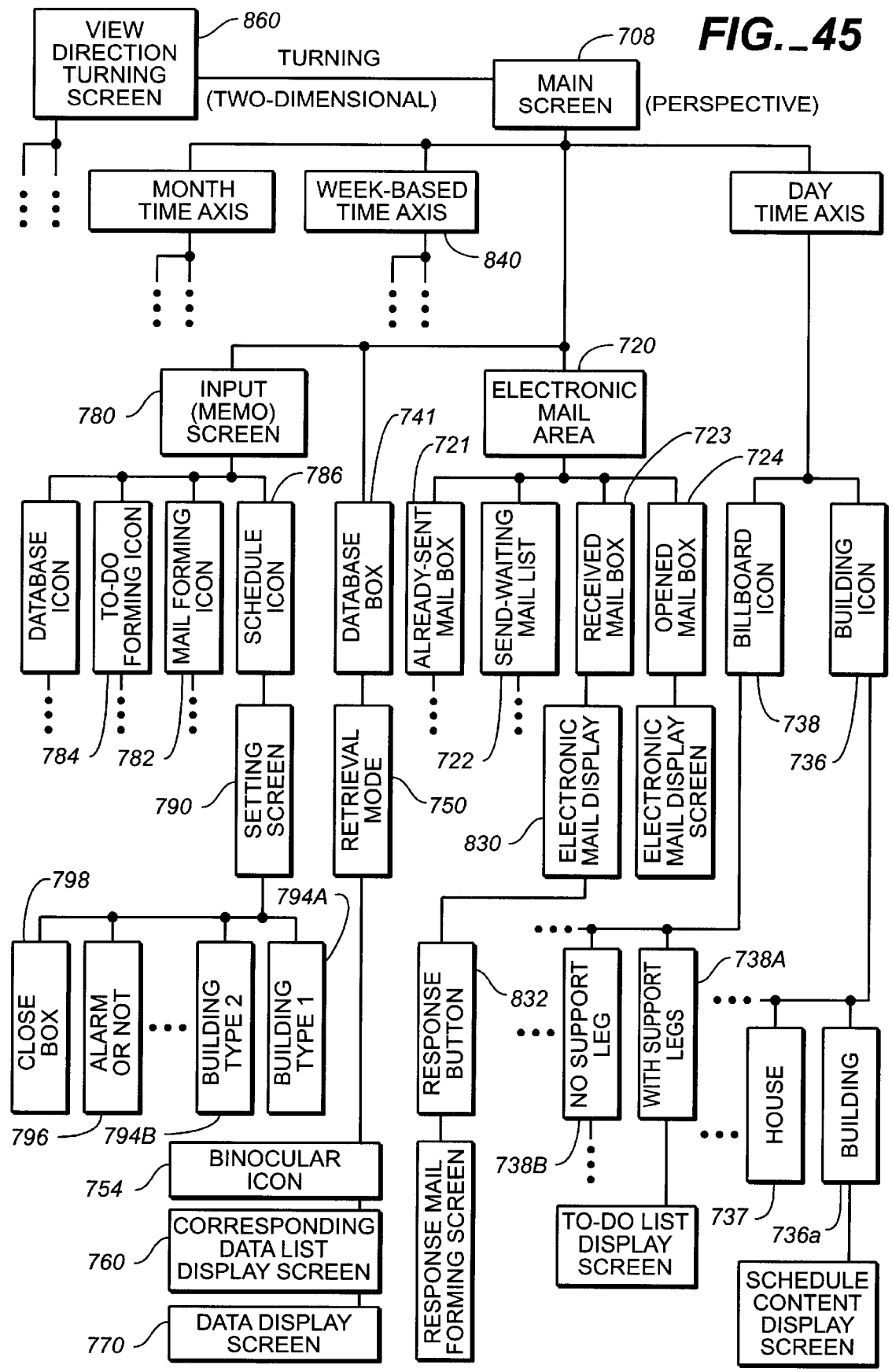
FIG._45

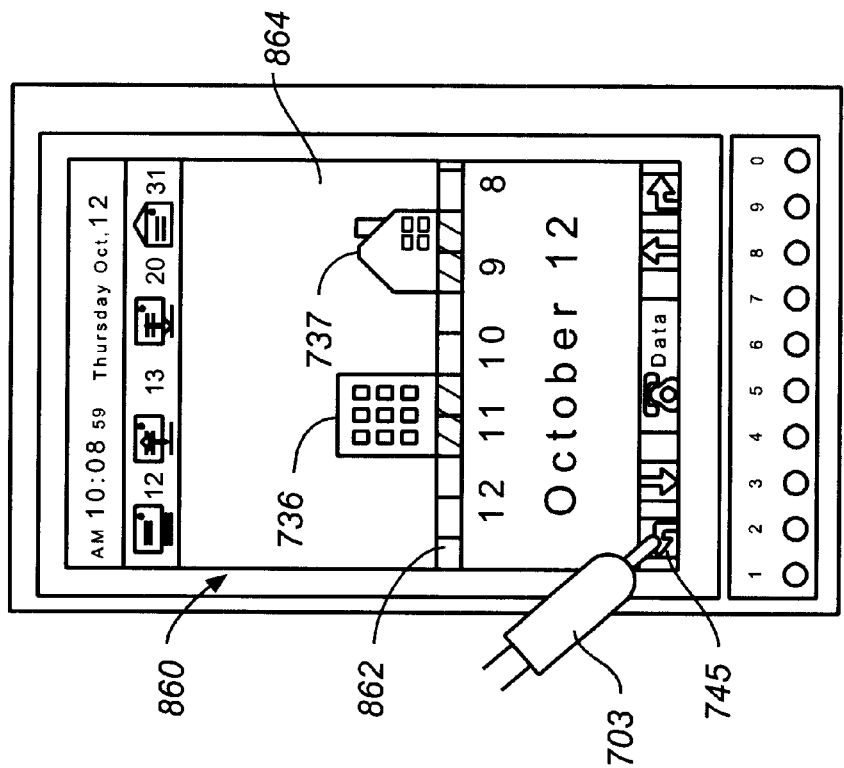
*FIG._46B*
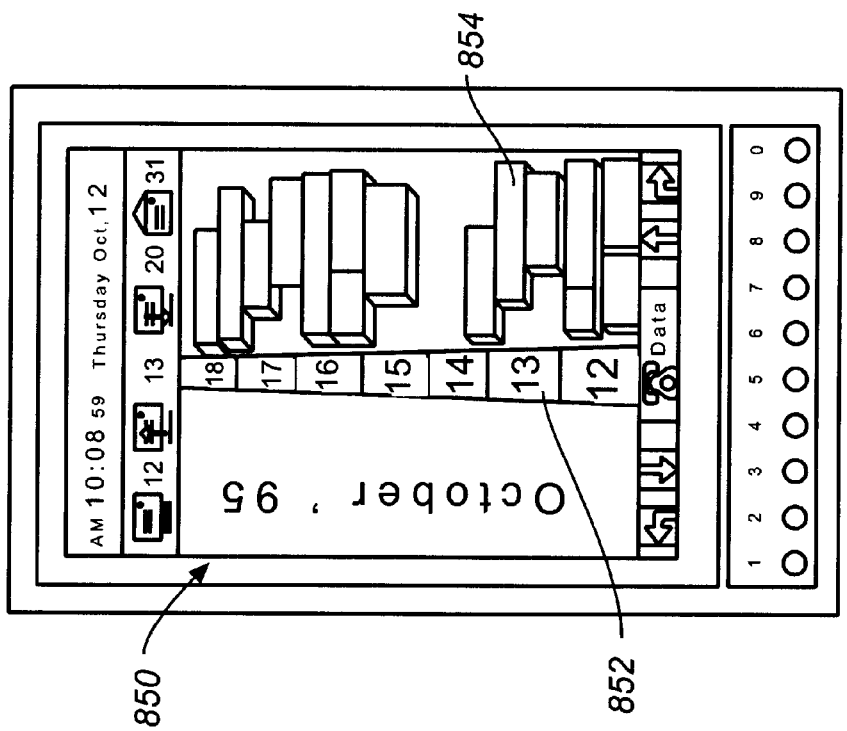
*FIG._46A*

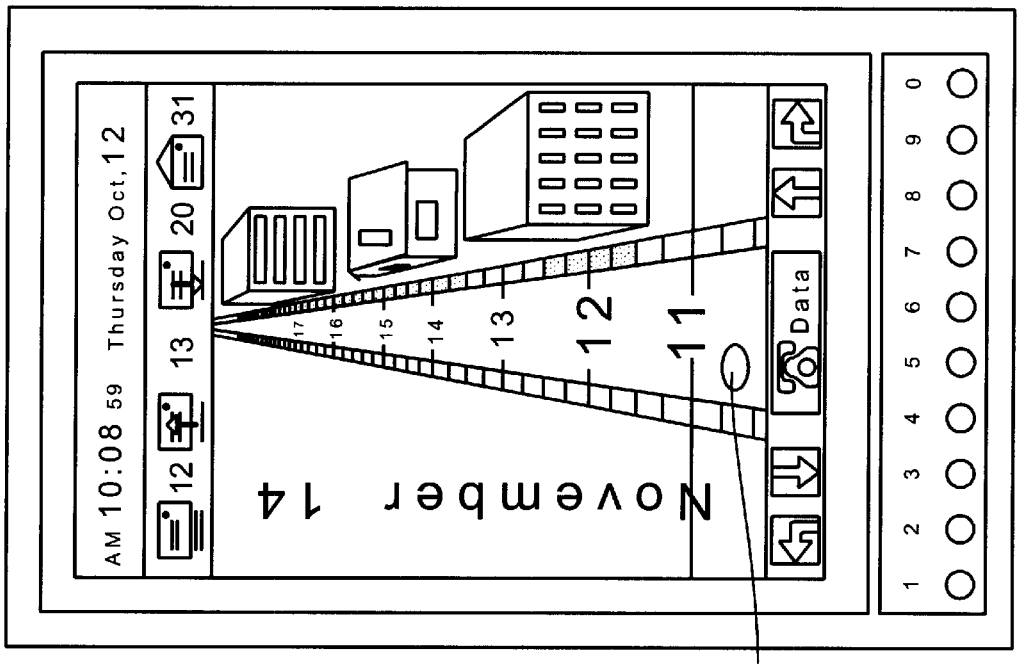
FIG._47B
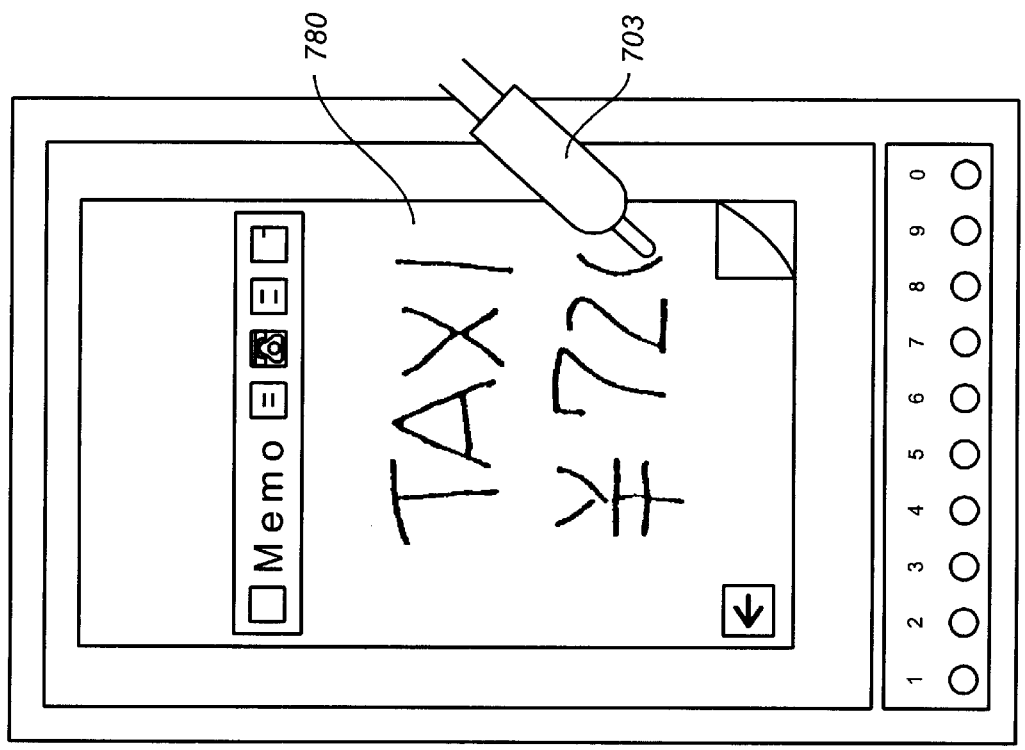
FIG._47A

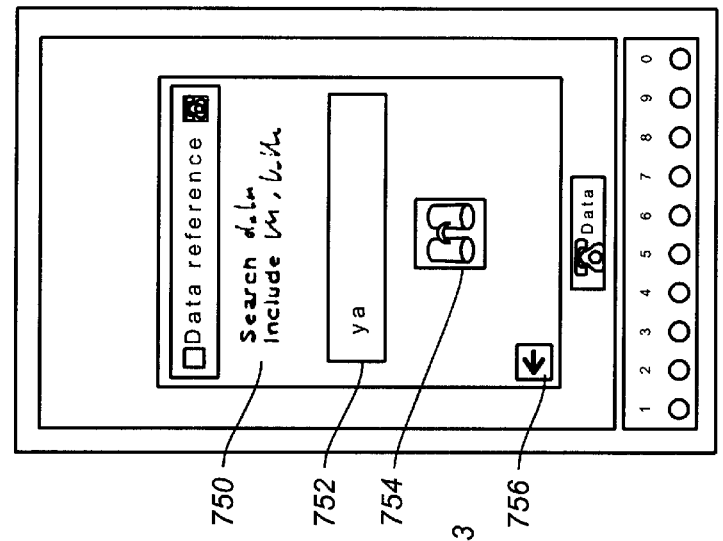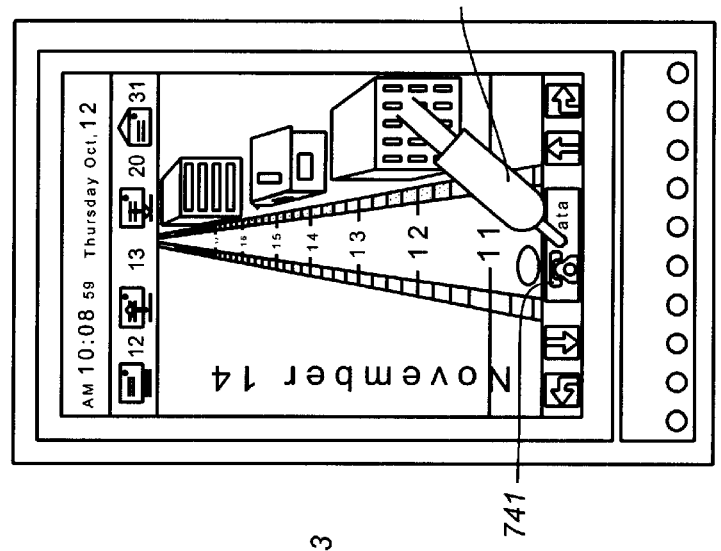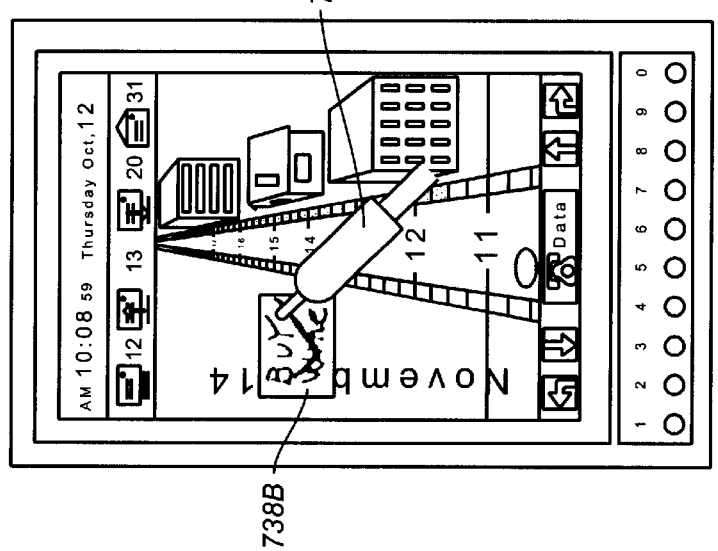

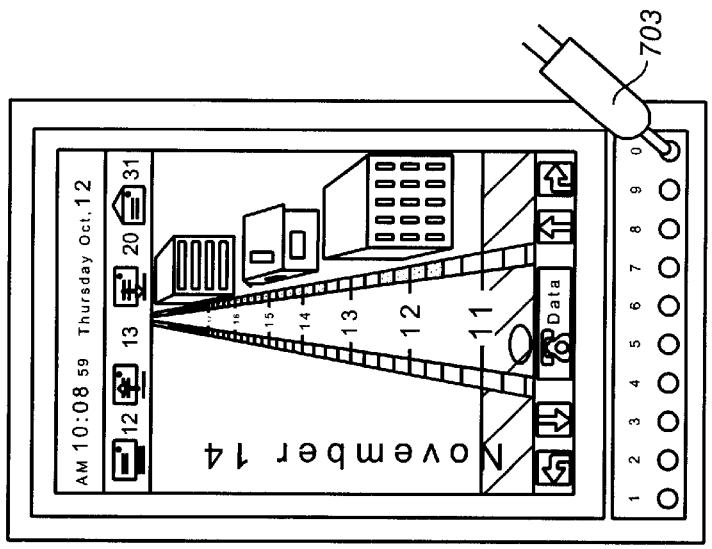
FIG._48F
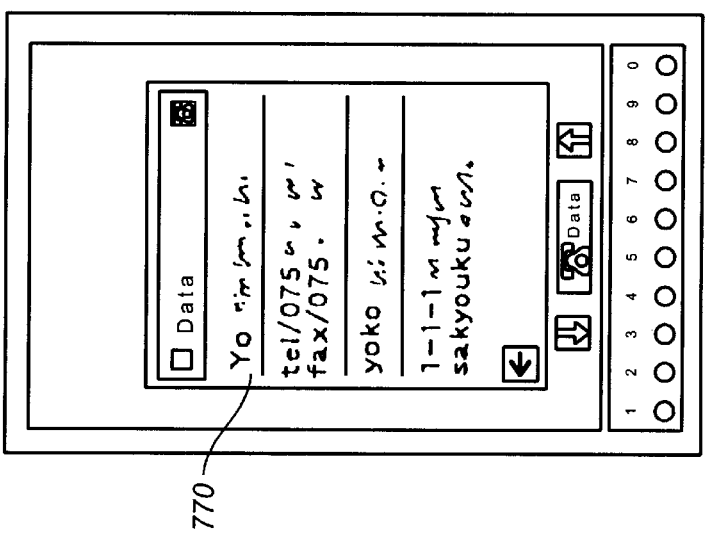
FIG._48E
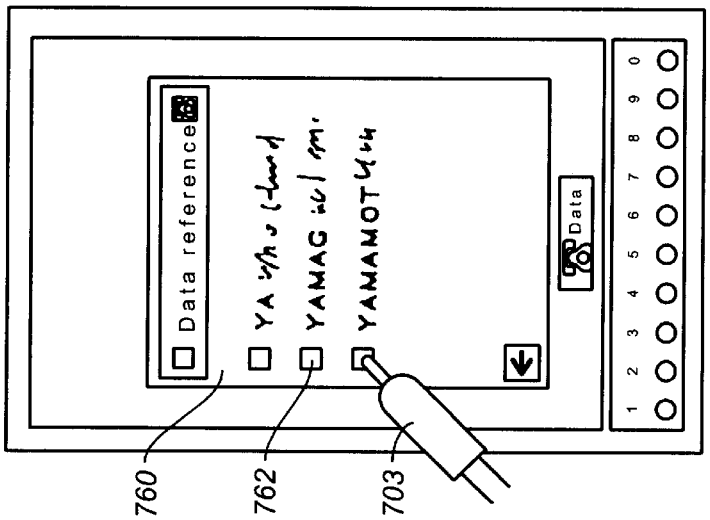
FIG._48D

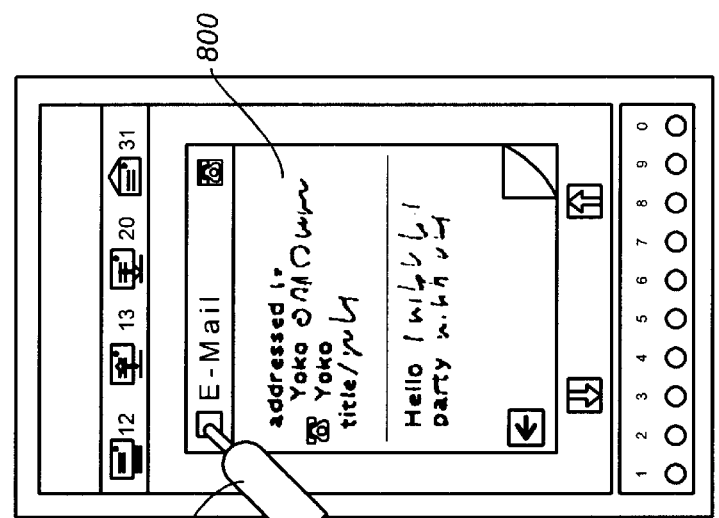
FIG._49C
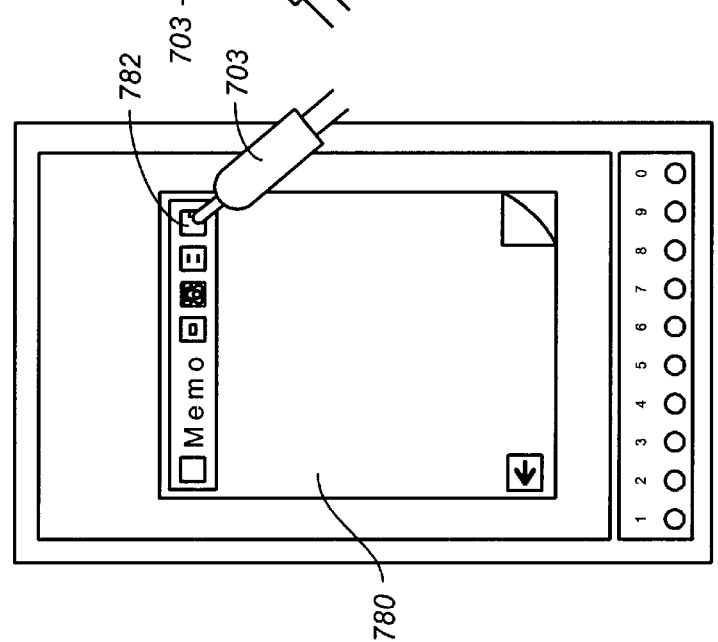
FIG._49B
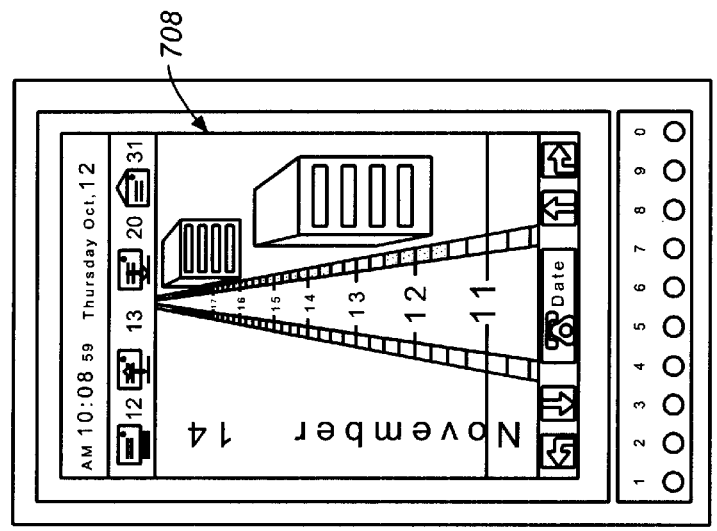
FIG._49A

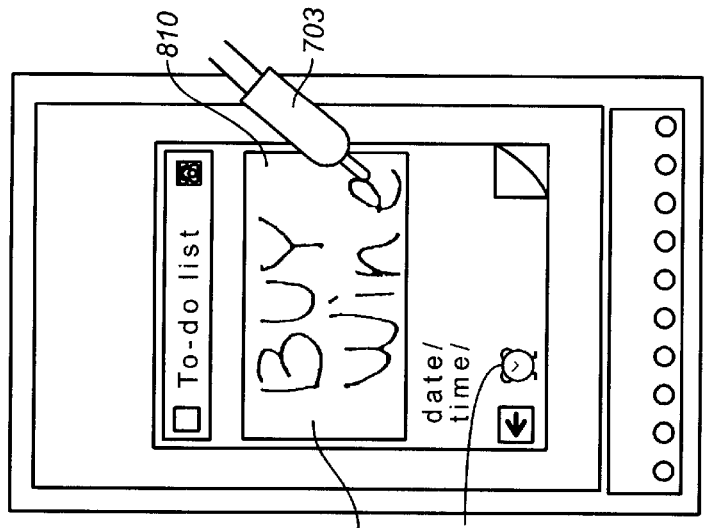
FIG._49F
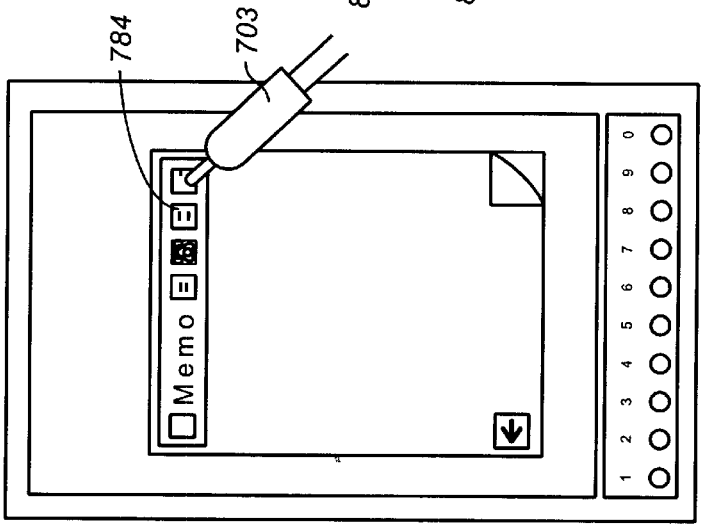
FIG._49E
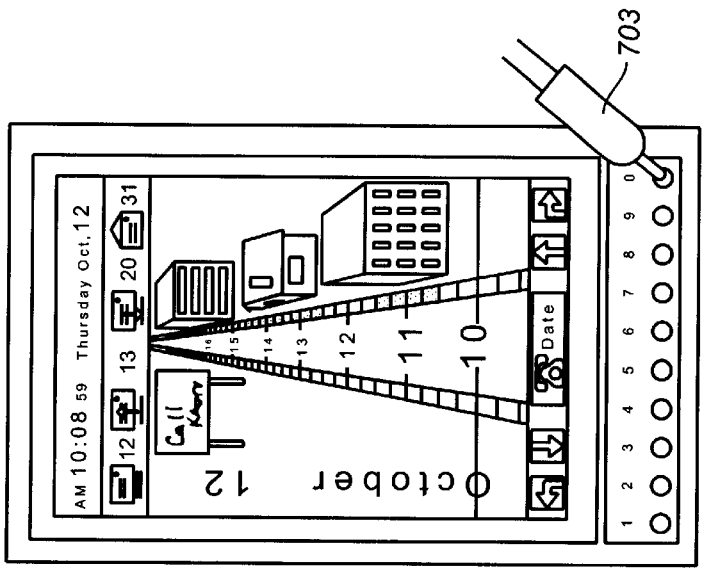
FIG._49D

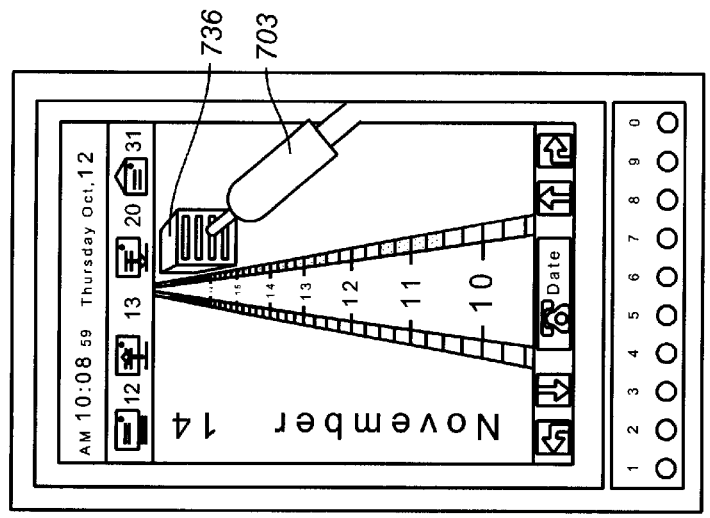
FIG._50C
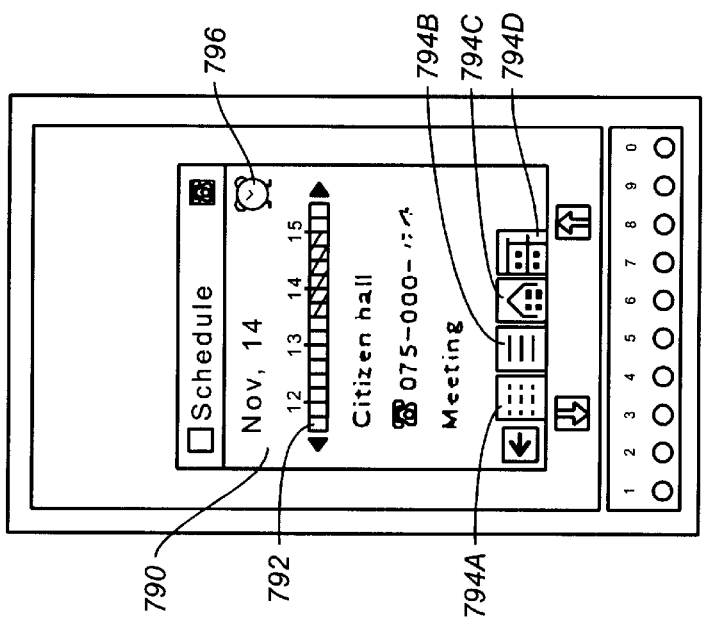
FIG._50B
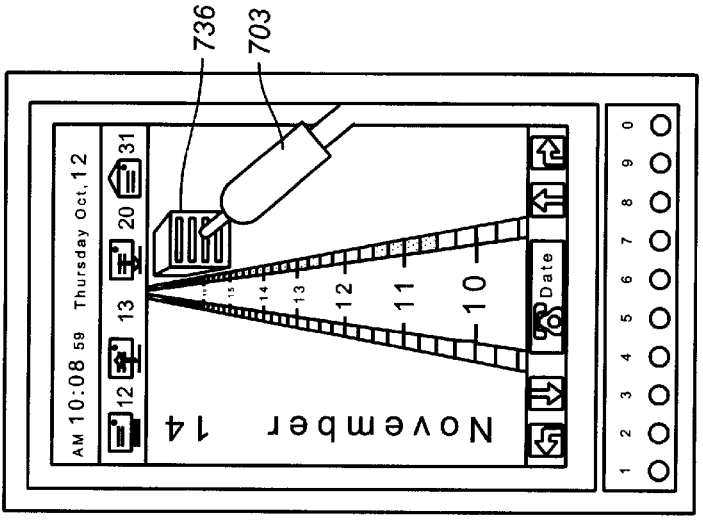
FIG._50A

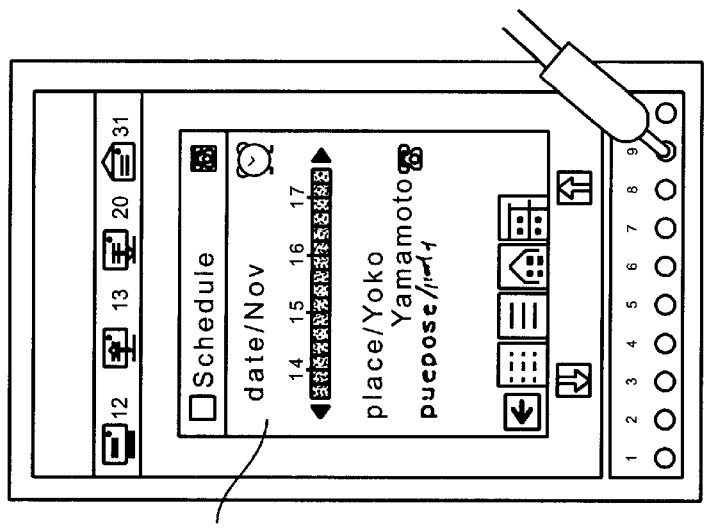
FIG. _50F
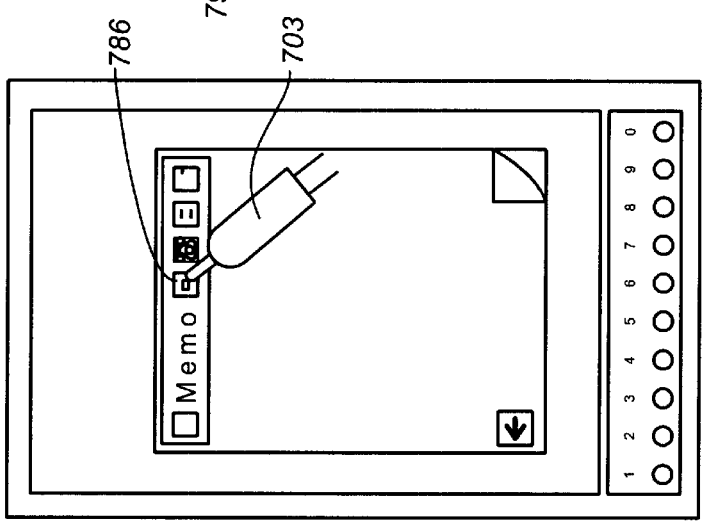
FIG. _50E
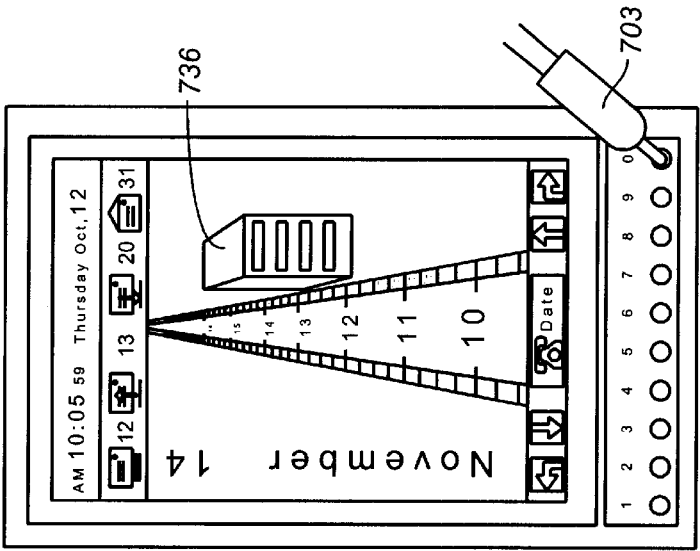
FIG. _50D

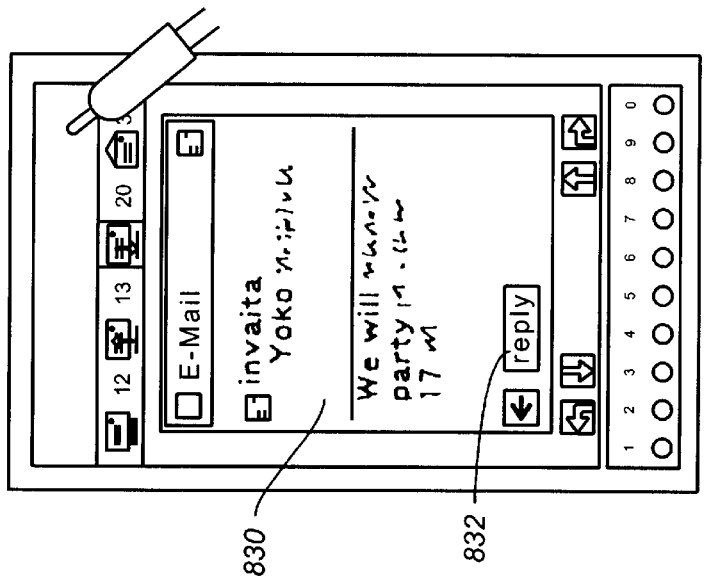
*FIG._51C*
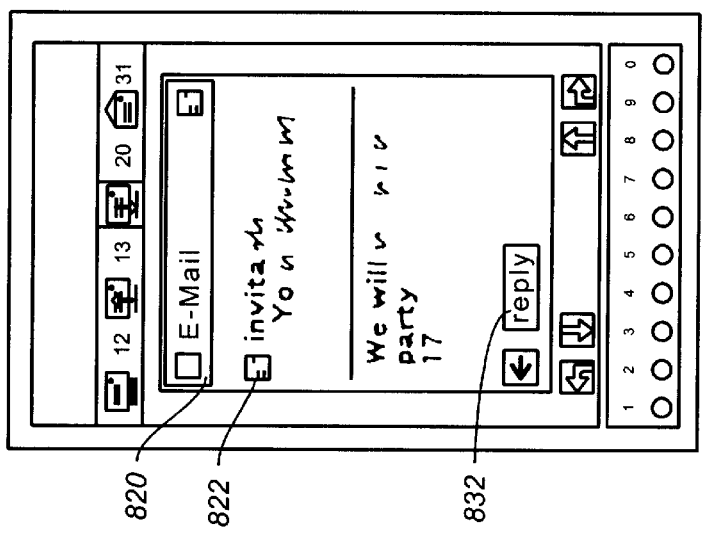
*FIG._51B*
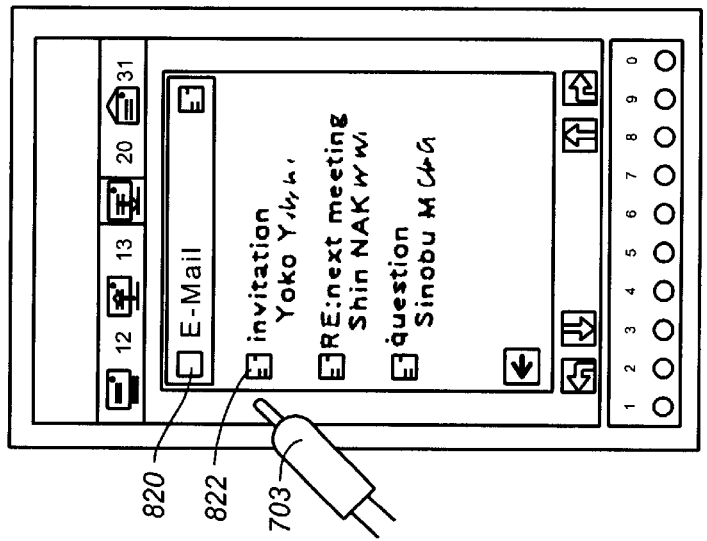
*FIG._51A*

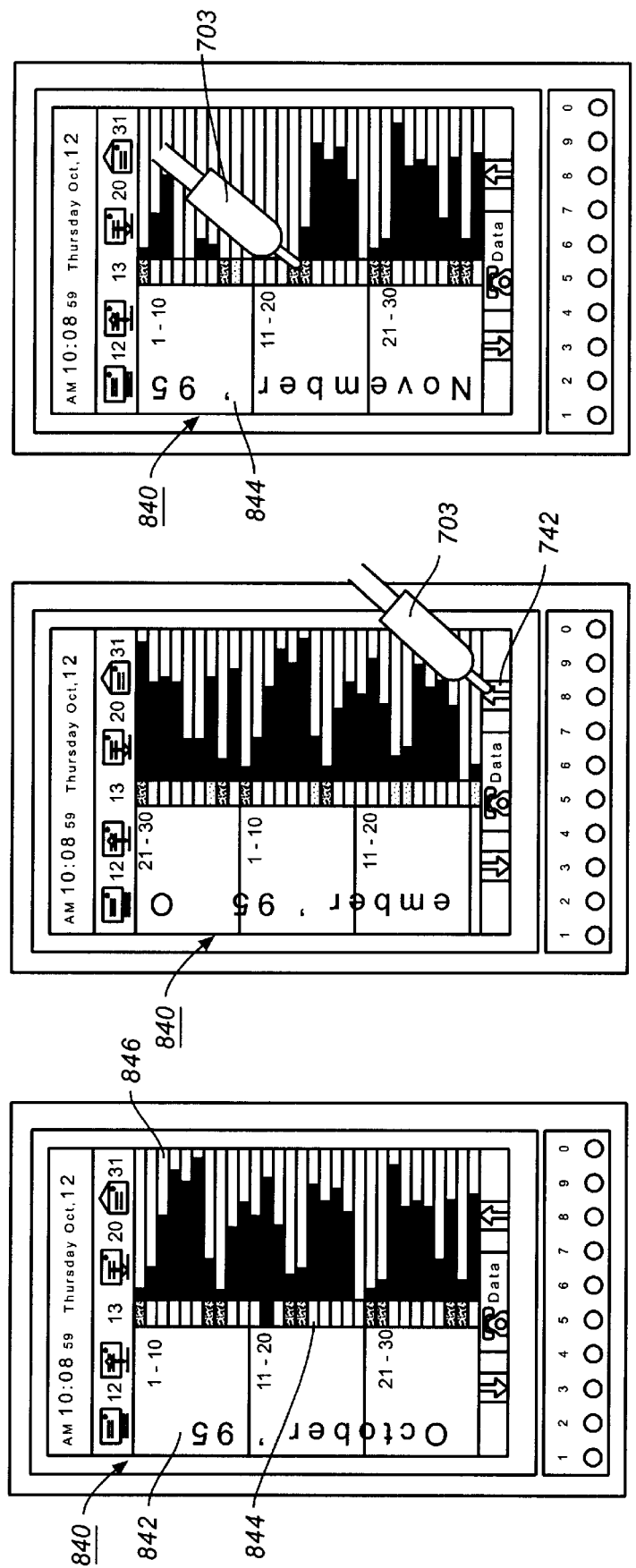

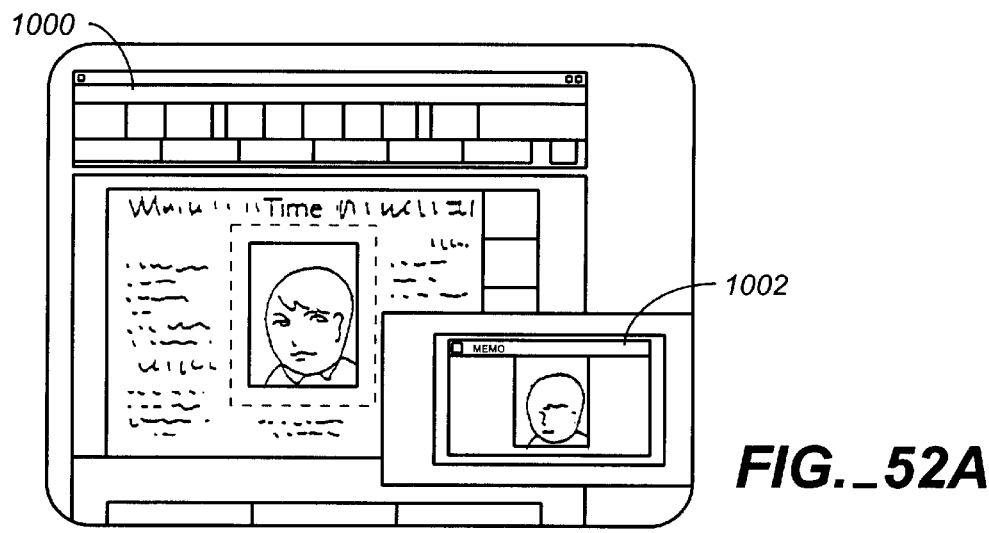
FIG._52A
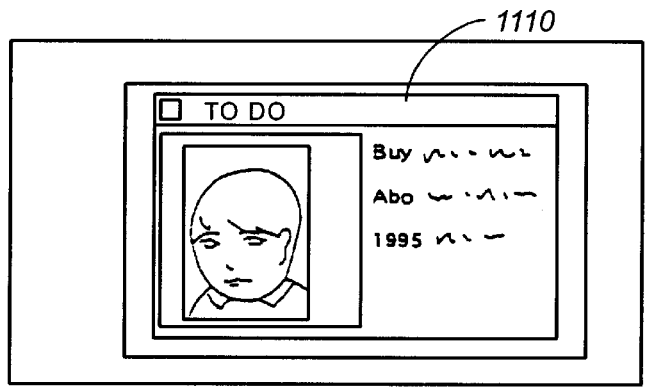
FIG._52B
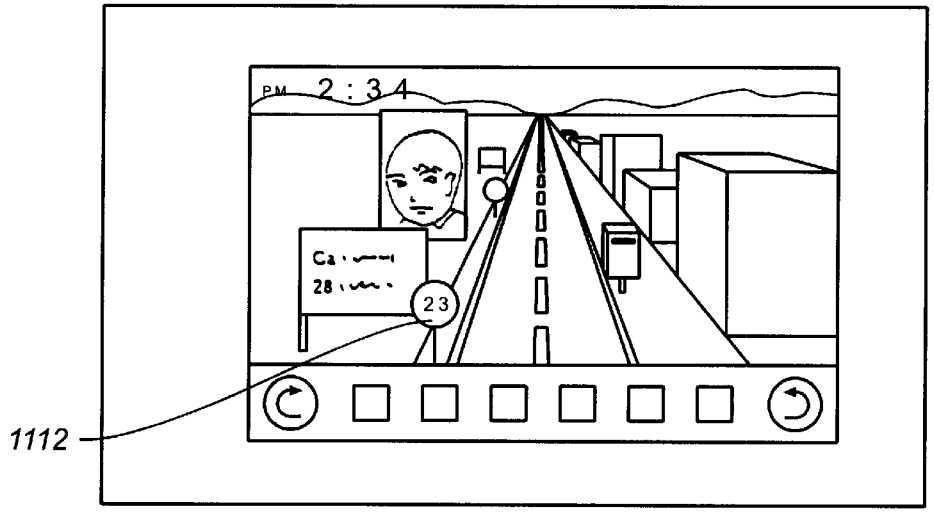
FIG._52C

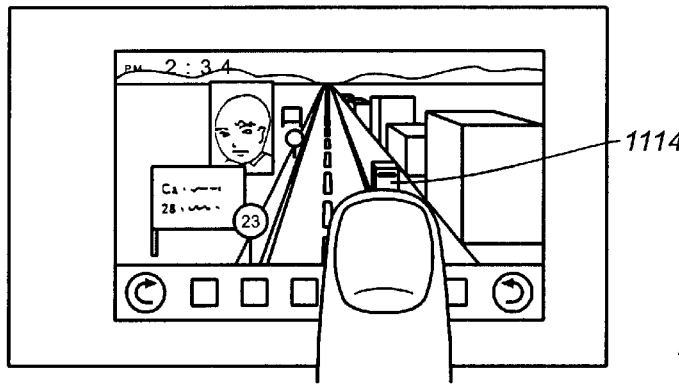
*FIG._53A*
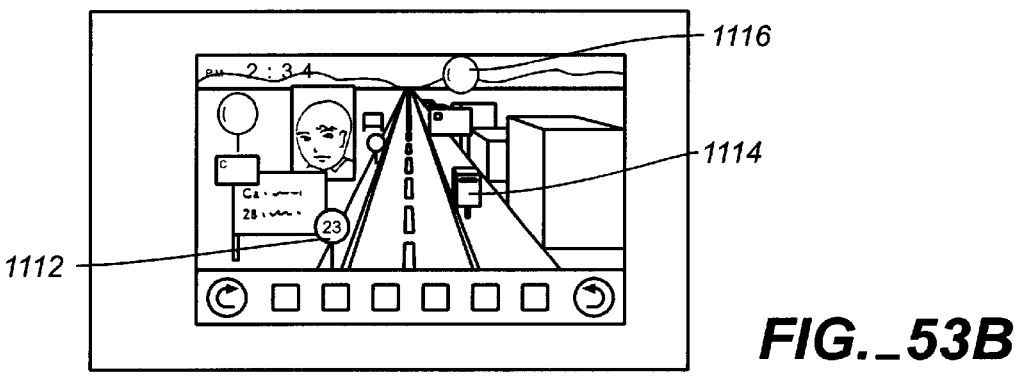
*FIG._53B*
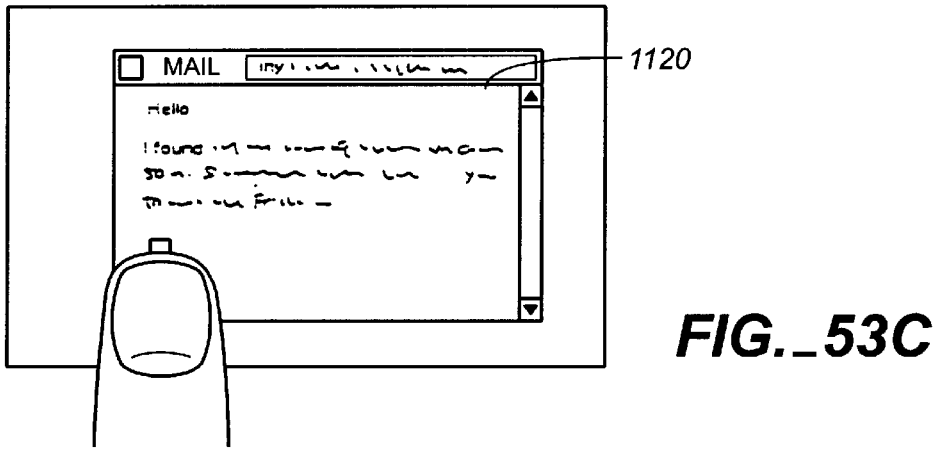
*FIG._53C*
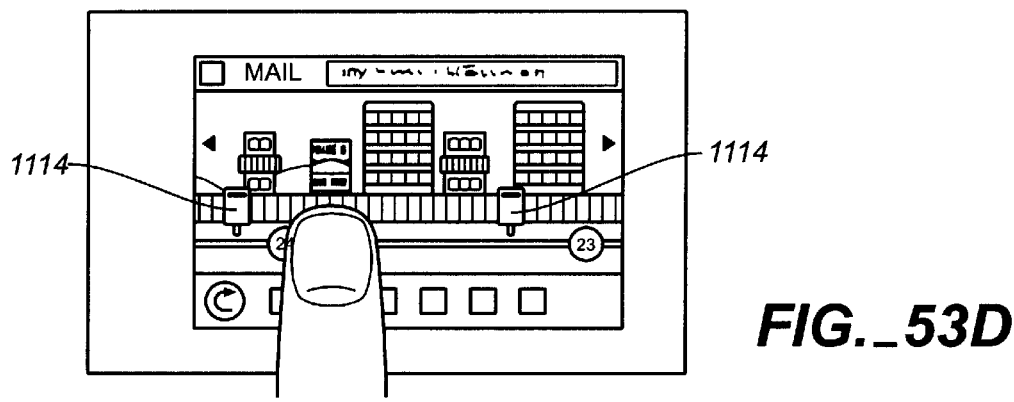
*FIG._53D*

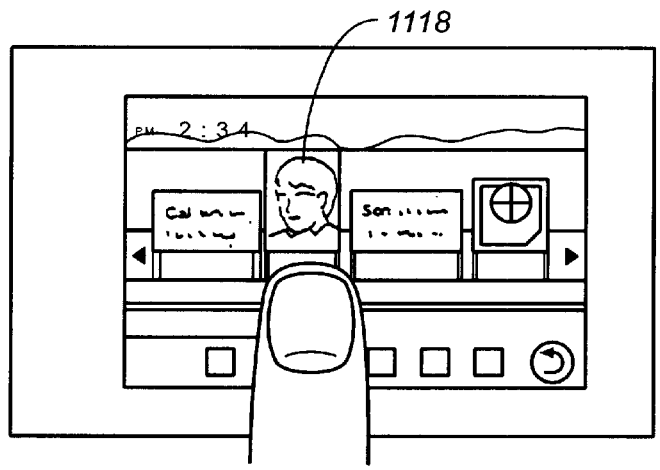
FIG._54A
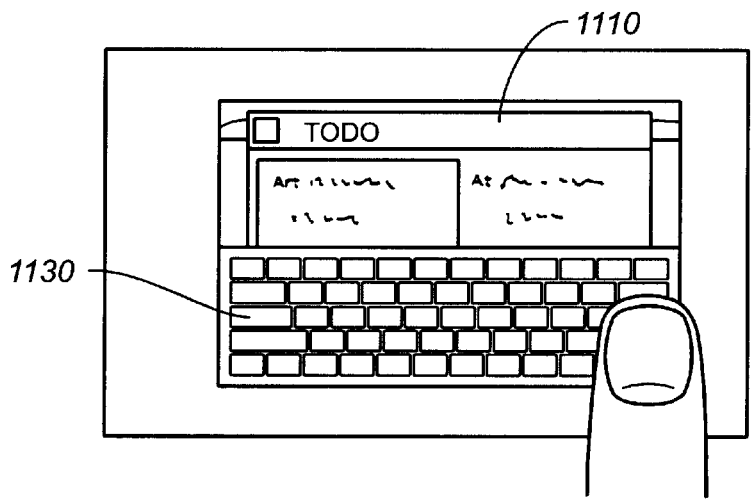
FIG._54B
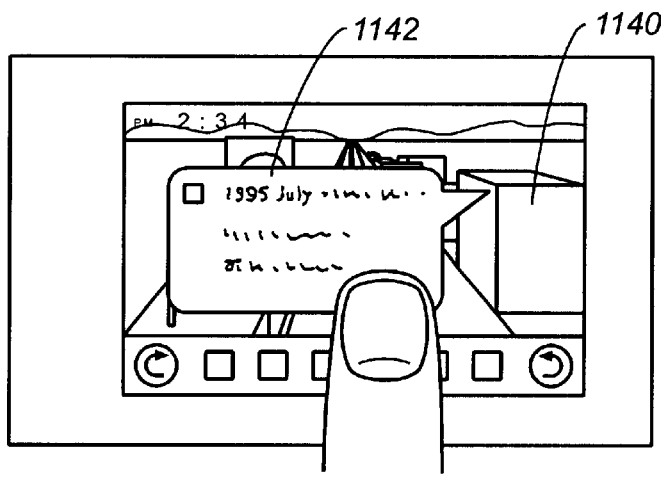
FIG._54C

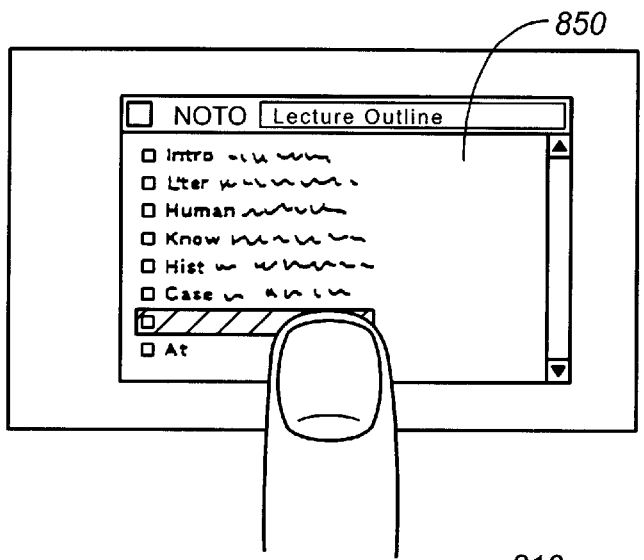
FIG._55A
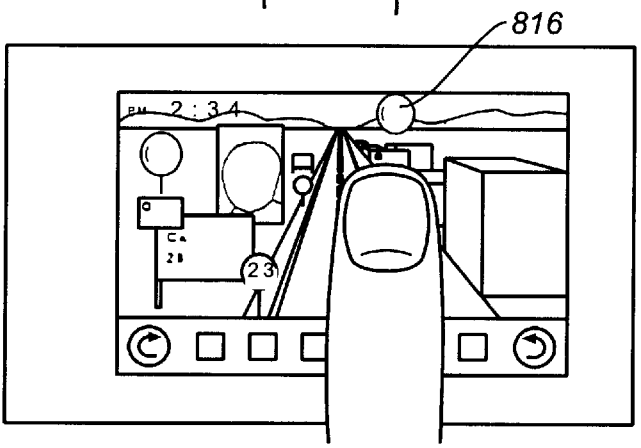
FIG._55B
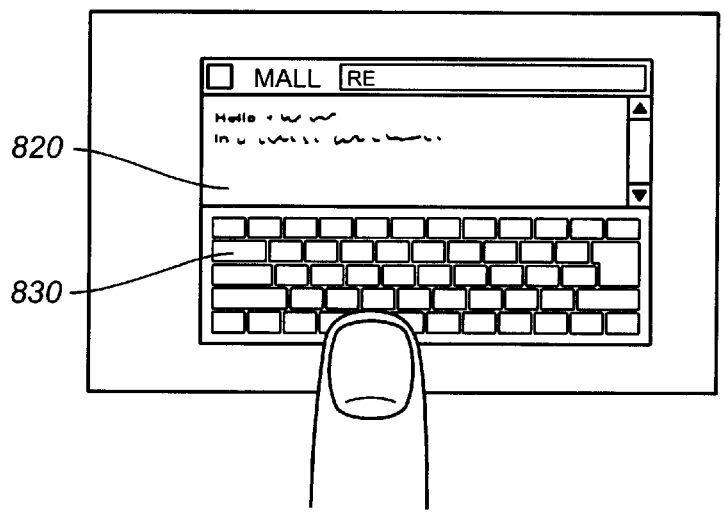
FIG._55C

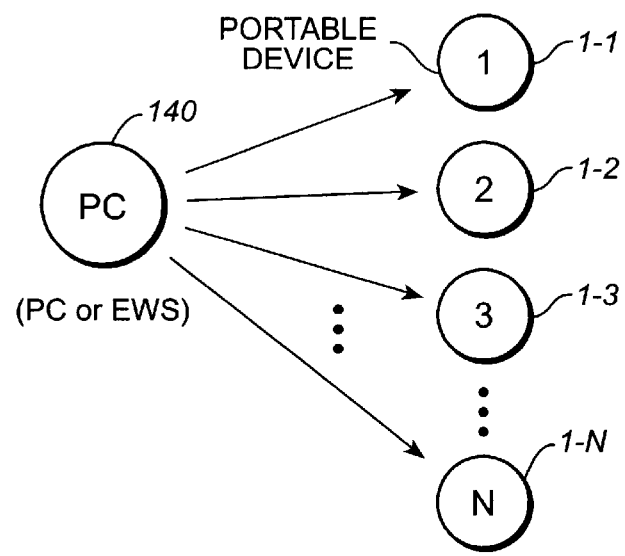
FIG._56A CASE 1
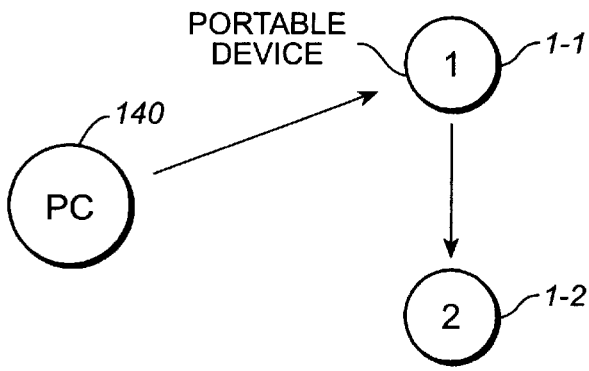
FIG._56B CASE 2
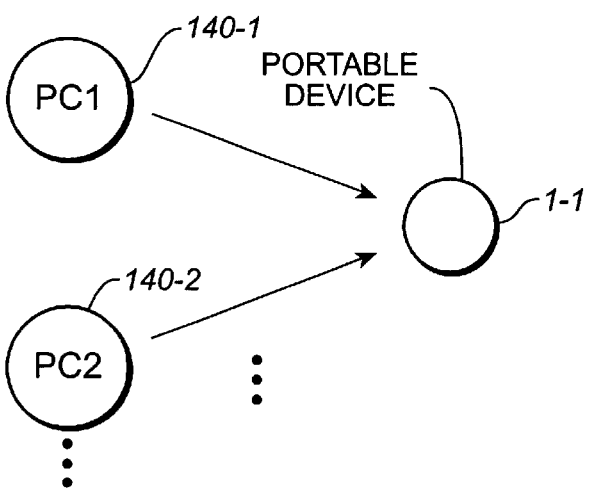
FIG._56C CASE 3

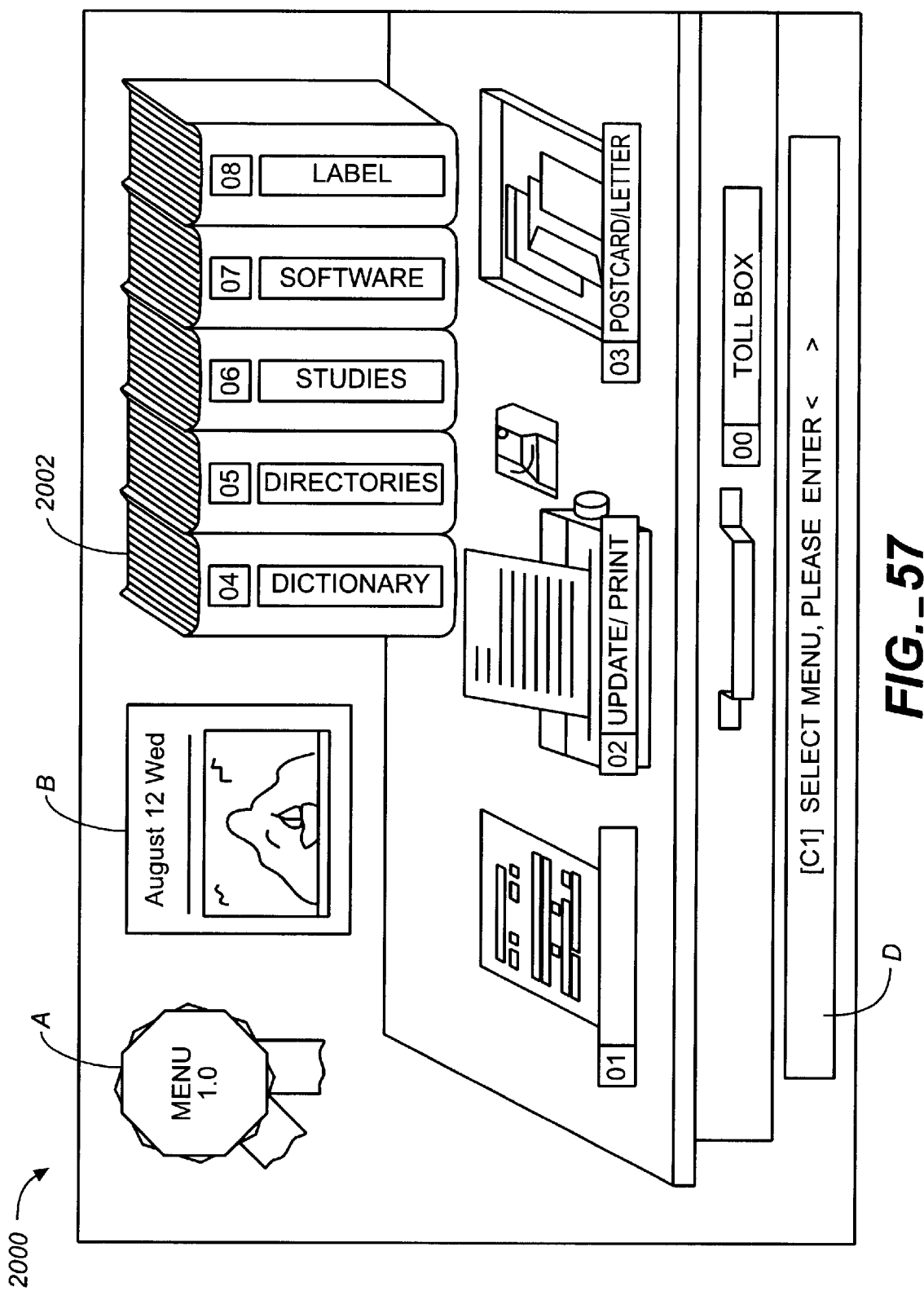
FIG._57

DISPLAY APPARATUS AND PORTABLE INFORMATION PROCESSING APPARATUS

BACKGROUND OF THE INVENTION

1. Field of the Invention

The present invention relates to a display apparatus and a portable information processing apparatus incorporating the display apparatus.

Description of the Related Art

The present invention relates to a display apparatus and a portable information processing apparatus incorporating the display apparatus.

2. Description of the Related Art

Use of icons (pictorial writings or illustrations) as one form of GUI (Graphical User Interface) is rapidly spreading. Such icons are most typically used for the purpose of starting up programs.

Methods have been proposed and used for displaying icons corresponding to functions of various programs on a menu screen. One of such known methods displays a plurality of icons in the form of a matrix consisting of m lines and n columns on a menu screen, as disclosed in, for example, Japanese Unexamined Patent Application No. 5-28157.

According to this known method, a user can select a desired program function by discriminating the desired icon information based on the pattern and function name of each piece of icon information from among many pieces of icon information which are on display. A skilled person who has knowledge about the functions corresponding to many pieces of icon information and positions thereof can quickly locate and select the desired icon information without difficulty, even when such pieces of icon information are arranged in a matrix form.

For a beginner, however, it takes a considerably long time to understand the functions of different pieces of icon information. In addition, it is not easy to remember the locations of icons of concern. Consequently, beginners tend to select wrong icon.

Japanese Unexamined Patent Application No. 2-222033 discloses a method by making access to data by way of icons. According to this method, visual image of a workshop having animated icons which can freely be opened and closed is displayed in a first window opened on the display screen. The user points a desired animated icon in the first window by means of a pointing device such as a mouse, so that a second window is automatically opened on the display screen, whereby various data which have been stored are displayed in the second screen.

This method, however, has drawbacks in that the user cannot easily understand what kind of function is started by selecting each icon and in that each icon cannot easily be pointed because it is small in size, due to the use of the multi-window display.

Apparatuses relying upon display of icons of the kind described often involves a function to enable pasting of icon information on a menu screen by an operation performed through an operating device. When a large number of pieces of icon information are pasted on the menu screen, the menu screen is crowded with icons. A further increase of icons causes the menu screen to fail to display these icons. A multi-window display might be used in order to solve this problem. Such a multi-window display, however, requires a complicated hierarchical structure. In addition, the user cannot inspect all the icons at a time, because the menu screen is hidden under the window which is newly opened. The complicated hierarchical structure requires a greater number of pointing operations such as clicking, requiring a longer time of operation.

Icons of the kind described have functions to enable visual discrimination of programs such as a document forming software, table/calculation software and a graphical writing software. In order to obtain data such as the sizes of saved files, dates and time of formation of these files and so forth in each of the software, the user is obliged to numerically check data by opening an exclusive utility software containing such data or by looking into a file table which is displayed after the software is started.

Indication of data by means of characters and numerals is not friendly to beginners because such indication does not allow easy comparison of data size and requires considerable time to grasp the meaning of the data, particularly when there are many files. In addition, visual recognition of data by means of characters and numerals is not easy when the size of the display screen is small.

FIG. 57 shows, by way of example, a known menu screen in which meaningful icons are displayed against a background image on the menu screen. More specifically, pieces of meaningful icon information 2002 are displayed as three-dimensional images on the menu screen 2000, so as to facilitate understanding of the functions represented by the icons. This known menu screen is still unsatisfactory because it needs character information which helps the user to understand the meaning. In addition, this type of menu display is not suitable for devices having small screen areas, because of difficulty in visual recognition.

Accordingly, it is a primary object of the present invention to eliminate or solve the above-described problems by providing a display apparatus, as well as a portable information processing apparatus, which can implement a plurality of icons of different colors and configurations without increasing memory size and which enables the user to easily grasp the functions corresponding to such icons.

SUMMARY OF THE INVENTION

To this end, according to one aspect of the present invention, there is provided a display apparatus, comprising: communicating means which performs at least receiving of a plurality of pieces of display data; first storage means for storing received plurality of pieces of display data; second storage means for storing at least one piece of first icon information corresponding to at least one of the pieces of display data and at least one piece of second icon information of a display form different from that of the first icon information; displaying means for displaying, on a menu screen, at least one of the first icon information and the second icon information; and controlling means for selecting the first icon information or the second icon information based on the number of pieces of display data newly registered in the first storage means and for controlling the displaying means so that the selected icon information is displayed on the menu screen.

With these features, the display apparatus of the first aspect of the present invention permits easy visual recognition of icon information, e.g., a file, corresponding to the display data, because the number of pieces of icon information increases in accordance with the state of input of the display data.

In particular, when a plurality of pieces of display data are received and newly registered, the first icon information is displayed if the total number of the pieces of newly registered display data including those newly registered does not exceed a predetermined value, whereas, when this predetermined number is exceeded, the second icon information is displayed. Therefore, when the number of pieces of received data has grown large, the display mode for displaying the first icon information piece by piece is switched to another mode in which the second icon information of a form different from the first icon information is displayed on the menu screen, so as to reduce the area on the menu screen occupied by the icon information, so that the remaining area can be used for various purposes.

The display apparatus of the first aspect of the present invention may be arranged such that, when the number of pieces of the first icon information is such that the sum of display areas of the pieces of first icon information falls within a predetermined region of the menu screen, the pieces of first icon information are displayed in accordance with the number of the pieces of display data, whereas, when the number of pieces of the first icon information is such that the sum of the display areas does no fall within the predetermined region of the menu screen, the second icon information is displayed commonly for the plurality of pieces of display data. The controlling means performs selection between the first icon information and the second icon information based on the number of the pieces of the first icon information to be displayed. Thus, when the number of pieces of received data has grown large, the display mode for displaying the first icon information piece by piece is switched to another mode in which the second icon information of a form different from the first icon information is displayed on the menu screen, so as to reduce the area on the menu screen occupied by the icon information, so that the remaining area can be used for various purposes.

The display apparatus of the first aspect also may be arranged such that the display of the first icon information is performed in such a manner that a piece of first icon information is displayed for one piece of registered display data, whereas the display of the second icon information is performed in such a manner that pieces of first icon information of a number corresponding to the number of pieces of registered display data are displayed on the menu screen in a partly overlapping manner. The controlling means performs, based on the number of pieces of the display data, a control so that a plurality of pieces of the second icon information are displayed on the menu screen in the partly overlapping manner.

With this arrangement, pieces of icon information are displayed in a partly overlapping or stacked manner when the number of pieces of display data has grown large, thus enabling the user to visually recognize the number of pieces of registered display data without increasing the area occupied by icons on the menu screen. Thus, the icon information can be displayed without requiring a large space even when the number of the pieces of this information is large, allowing an efficient use of the area of the menu screen. This form of display apparatus is therefore suitable for use in implementing devices having small size of menu screen.

In the display apparatus of the first aspect, the display data may include data size information concerning the size of the display data. In such a case, the first icon information includes third icon information which is generated and displayed when the data size does not exceed a predetermined size and a fourth icon information which is generated and displayed in a form different from that of the display of the third icon information when the data size exceeds the predetermined size. The controlling means performs selection between the third icon information and the fourth icon information based on the data size information.

In this form of the display apparatus, the third icon information is displayed when the predetermined data size is not exceeded, whereas, when the same is exceeded due to increase in the size of the data, the fourth icon information is displayed. It is thus possible to switch the display mode between the mode for displaying the third icon information and the mode for displaying the fourth icon information, in accordance with the size of the display data. The user therefore can visually check the size of the display data.

In accordance with a specific form, the display apparatus of the first aspect may further comprise operation means which permits an operation to input the display data to the first storage means. In this case, the display data includes designated time information which indicates time for inspection of input information designated by a user. The first icon information includes a plurality of pieces of fifth icon information prepared in different modes of display corresponding to time designated by the designated time information. The controlling means selects one of the pieces of fifth icon information based on the designated time information, thereby changing and controlling the mode of display of the fifth icon information in accordance with the degree of urgency of the display data.

With this arrangement, the mode of display of the fifth icon information can be varied in accordance with the designated time information indicative of the time designated by the user. The user can therefore visually recognize the degree of urgency of the display data. The term "degree of urgency" is used here to mean how urgent the display data is. A higher degree of urgency means a shorter interval between the present moment and the future time designated by the user.

The display apparatus of the first aspect may be arranged such that the display data includes designated importance information which indicates degree of importance designated by a user, while the first icon information includes a plurality of pieces of sixth icon information formed in different modes of display corresponding to the degrees of importance designated by the designated importance information. The controlling means selects one of the pieces of sixth icon information based on the designated importance information, thereby changing and controlling the mode of display of the sixth icon information in accordance with the degree of importance of the display data.

With these features, the mode of display of the sixth icon information can be changed in accordance with the designated importance information. The designated importance information may be given in terms of, for example, time, data size, or the like.

In the display apparatus of the first aspect, the first icon information may be formed in a configuration different from that of the second icon information.

The user can visually discriminate, without difficulty, pieces of icon information having different meanings of function, according to the configuration of the icon information.

In the display apparatus of the first aspect, the first icon information may be formed in a size different from that of the second icon information.

The user can visually discriminate pieces of icon information having different meanings of function, according to the size of the icon information without difficulty.

In the display apparatus of the first type, the first icon information may be formed in a color different from that of the second icon information.

The user can distinguish at a glance between the first icon information and the second icon information according to their colors.

In the display apparatus of the first aspect, the display data may include designated time information which indicates time for inspection of the display data designated by a user and representing the degree of urgency of the display data. In this case, the controlling means includes a brightness control unit for controlling the brightness of display of at least one of the first icon information and the second icon information based on the designated time information which indicates the degree of urgency.

With this arrangement, the intensity or level of brightness of one or both of the first icon information and the second icon information are varied based on the degree of urgency. It is thus possible to form a display screen on which degrees of urgency designated by the user are indicated.

In the display apparatus of the first aspect, the display data may include designated time information which indicates time for inspection of the display data designated by a user and representing the degree of urgency of the display data. The controlling means may include a blinking frequency control unit for controlling the blinking frequency of display of at least one of the first icon information and the second icon information based on the designated time information.

These features ensure more accurate notification of information given to the user, by varying the frequency of blinking.

As stated before, the display apparatus of the first aspect in its specific form may further comprise operation means which permits an operation to input the display data to the first storage means. In this case, the display data includes designated time information which indicates time for inspection of input information designated by a user. The first icon information includes a plurality of pieces of fifth icon information prepared indifferent modes of display corresponding to time designated by the designated time information. The controlling means selects one of the pieces of fifth icon information based on the designated time information, thereby changing and controlling the mode of display of the fifth icon information in accordance with the degree of urgency of the display data.

This specific form of the display apparatus may be modified so as to further comprise time measuring means for measuring time to recognize the time of registration of the display data thereby producing time information. In such a case, the controlling means performs display control such that the display of the plurality of pieces of second icon information in the partly overlapping manner is executed in a time sequence based on the time information produced by the time measuring means. It is therefore possible to reduce the space occupied by many pieces of icon information, while permitting at-a-glance discrimination between old display data and new display data. This solution is useful particularly when the area of display is limited.

In the specific form of the display apparatus of the first aspect, the second storage means may include inspection checking character data which is synthetically displayed on a window for displaying the display data when the user points a point in the window. In this case, the controlling means performs control based on an operational input through the operation means, so as to synthetically display the character data in the window.

The user, upon finishing the inspection of a piece of display data, operates the pointer so that the character data is displayed in the window for the inspected display data.

The user therefore can discriminate between the data that has already been looked into and the data that has not yet been inspected.

In the display apparatus of the first aspect, the display data may be composed of a plurality of types of information. In such a case, the controlling means may include a notification control unit which notifies the user of the presence of information by giving signs which act on the five senses of the user's body, based on the contents of plurality of types of information and the state of the user.

In general, a greater number of types of display information causes a correspondingly greater difficulty for the user to discriminate each type of display data. In addition, when the situation does not allow notification of information to the user by a loud voice message, e.g., when attending a meeting in which generation of a loud voice is strictly prohibited, it is impossible to notify the user of the receipt of information if the notification is done by way of visual or auditory recognition.

In this form of the display apparatus, notification of information to the user is performed by giving signs which act on one of five senses of the user, based on the contents of plurality of types of information and the state of the user. Therefore, the user can recognize what type of information is present, based on the type of signs given by the notification control unit, regardless of the situation of the user.

The display apparatus, when equipped with the notification control function as stated above, may further comprise time measuring means for measuring the input time of the display data thereby producing time information. In such a case, the notification control unit may have a vibration generating unit that generates vibration in a stepped manner so as to stimulate the user, based on the time information produced by the time measuring means.

With this arrangement, the user is notified of the presence of information through a sign other than a visual sign, i.e., by vibration, thus enhancing the credibility of recognition by the user.

Alternatively, the display apparatus with the notification control unit, which comprises the time measuring means for measuring the input time of the display data thereby producing time information, is arranged such that the notification control unit has a voice generating unit that generates voice adjustable in a stepped manner, based on the time information produced by the time measuring means.

With this arrangement, the user is notified of the presence of information through a sign other than a visual sign, i.e., by voice which is adjustable in a stepped manner, thus enhancing the credibility of recognition by the user.

Alternatively, the display apparatus with the notification control unit, which comprises the time measuring means for measuring the input time of the display data thereby producing time information, may be arranged such that the notification control unit has a tone changing unit that changes adjustable alarming tone in a stepped manner, based on the time information produced by the time measuring means.

With this arrangement, effective notification is given to the user by a tone which is adjustable in a stepped manner.

The display apparatus with the notification control unit, which comprises the time measuring means for measuring the input time of the display data thereby producing time information, may further comprise operation means for enabling the user to input designated time. In this case, the notification control unit operates based on the designated time so as to cause one of the first icon information, the second icon information and the display data to be displayed on the displaying means.

With this arrangement, the first icon information, the second icon information or the display data is displayed when the designated time has come, thereby notifying the user of the presence of information. It is thus possible to effectively enhance the credibility of recognition by the user.

In accordance with a second aspect of the present invention, there is provided a display apparatus, comprising: first storage means for storing at least one piece of display data: second storage means for storing at least one piece of icon information corresponding to the at least one piece of display data; displaying means having a menu screen on which the at least one piece of icon data is displayed; and controlling means which performs control such that the icon information stored in the second storage means is displayed on the menu screen, based on the number of pieces of display data newly registered in the first storage means.

These features causes the number of pieces of icon information to increase or decrease in accordance with the states of input and output of related information, thus enabling the user to visually recognize the files of the related information on the menu screen. Furthermore, since the pieces of icon information are arrayed in a time sequence, the user can visually recognize which one of the related information is old or new.

In a specific form of the display apparatus in accordance with the second aspect of the invention, the controlling means may perform control such that pieces of icon information displayed on the menu screen are erased from the menu display screen based on the number of pieces of the display data erased from the first storage means.

With this arrangement, the icon information is erased when the display data is erased. Therefore, the user can visually recognize at a glance the number of pieces of existing display data. This eliminates the necessity of numerical indication of information regarding the existing display data, offering a great advantage particularly when the area of the display screen is so limited as to allow display of only small fonts of characters.

A second specific form of the display apparatus of the second aspect further comprises communicating means that performs at least receiving of the display data. In this case, the controlling means performs control of display of the icon information based on the number of pieces of the display data newly registered in the first storage means via the communicating means.

In this display apparatus, the number of pieces of icon information increases in accordance with the number of pieces of display data received through the communicating means. This enables the user to visually recognize the number of the pieces of received display data at a glance of the menu screen. This menu screen permits the inspection of the received display data without requiring any complicated hierarchical structure, as well as complicated operation to be performed by the user, thus reducing the burden on the user.

The display apparatus of the second aspect may further comprise operation means which permits the display data to be newly registered in the first storage means. In this case, the controlling means performs control of display of the icon information based on the number of pieces of the display data newly registered in the first storage means by an operation of the operation means.

In this display apparatus, the number of pieces of icon information increases in accordance with the number of the newly registered display data. The user therefore can visually recognize the number of the pieces of registered display data at a glance on the menu screen. This menu screen permits the user to inspect the registered display data without requiring any complicated hierarchical structure and without necessitating complicated operational steps, thus reducing burden on the user.

In the aforementioned specific form of the display apparatus in accordance with the second aspect of the invention, the controlling means may perform control such that pieces of icon information displayed on the menu screen are erased from the menu display screen based on the number of pieces of the display data erased from the first storage means.

This specific form of the display apparatus of the second aspect may further comprise communicating means which performs at least transmission of the display data. In this case, the controlling means performs control based on the number of pieces of display data erased from the first storage means and transmitted by the communicating means, such that pieces of icon information of the number corresponding to the number of the pieces of the erased display data are erased from the menu screen.

In this display apparatus, when pieces of display data have been transmitted through the communicating means, the number of pieces of icon information on the menu screen is reduced by a number corresponding to the number of pieces of the transmitted display data. The user, therefore, can visually recognize the number of the remaining pieces of display data at a glance on the menu screen. This menu screen permits the user to inspect the registered display data without requiring any complicated hierarchical structure and without necessitating complicated operational steps, thus reducing burden on the user.

The above-described specific form of the display apparatus of the second aspect may further comprise operation means for erasing the display data from the first storage means. In this apparatus, the controlling means performs control based on the number of pieces of display data erased from the first storage means by an operation input through the operation means, such that pieces of icon information of the number corresponding to the number of the pieces of the erased display data are erased from the menu screen. This menu screen permits the user to inspect the registered display data without requiring any complicated hierarchical structure and without necessitating complicated operational steps, thus reducing burden on the user.

As stated before, the second specific form of the display apparatus of the second aspect may further comprise communicating means that performs at least receiving of the display data. In this display apparatus, the controlling means performs control of display of the icon information based on the number of pieces of the display data newly registered in the first storage means via the communicating means. In this display apparatus, the first storage means may have a plurality of pieces of attribute information for identifying attributes of the plurality of pieces of display data. In such a case, the controlling means selects, based on at least one piece of attribute information, at least one piece of icon information corresponding to the attribute of at least one piece of display data, and causes the selected icon information to be displayed on the menu display.

This arrangement permits discrimination of icon information based on the attribute of the display data, so that the user can recognize the type of display data at a glance.

In this display apparatus, the display data may include electronic mail information received through the communicating means and arrival time information concerning the time of arrival of the electronic mail information. The controlling means performs, based on the arrival time information, control of display of the pieces of icon information on a menu screen in a time sequence corresponding to the order of the arrival time.

In this display apparatus, icons of electronic mails are displayed on the menu screen in the order of arrival time, so that the user can visually recognize the number of the received electronic mails and can discriminate between current and old mails at a glance on the menu screen. This menu screen permits the user to inspect the registered display data without requiring any complicated hierarchical structure and without necessitating complicated operational steps, thus reducing burden on the user.

As stated before, the display apparatus of the second aspect may further comprise operation means which permits the display data to be newly registered in the first storage means, with the controlling means performing control of display of the icon information based on the number of pieces of the display data newly registered in the first storage means by an operation of the operation means. This display apparatus may be arranged such that the display data includes input information which is input by an operation conducted by the user, and input time information concerning the time at which the input information is input by the operation. In this case, the controlling means performs display control based on the input time information such that the so as to cause the icon information to be displayed on the menu screen.

In this display apparatus, pieces of input information are displayed on the menu screen in the order of the input time, so that the user can visually recognize the number of the input pieces of data and can discriminate between current and old information, at a glance on the menu screen. This menu screen permits the user to inspect the registered display data without requiring any complicated hierarchical structure and without necessitating complicated operational steps, thus reducing burden on the user.

The aforesaid second specific form of the display apparatus of the second aspect further comprises communicating means that performs at least receiving of the display data, with the controlling means performing control of display of the icon information based on the number of pieces of the display data newly registered in the first storage means via the communicating means. This display apparatus may be arranged such that the display data includes electronic mail information supplied from a source of the information via the communicating means, and sender information concerning the sender of the electronic mail. A plurality of the second storage means are prepared corresponding to different senders, and a plurality of pieces of character data representing portrait of the senders are contained in the second storage means. In this case, the controlling means selects one from the plurality of pieces of character based on the sender information and causes the selected character data to be displayed simultaneously with the arrival of the electronic mail information.

The display apparatus of the second aspect of the invention may further comprise operation means which enables the user to appoint a position of a display cursor movable on the display screen of the display means and to select one piece of icon information through the appointment of the cursor position. In this display apparatus, the second storage means includes first character data indicating one mode of display of the cursor and a plurality of pieces of second character data indicating other modes of display of the cursor. The controlling means performs control such that, when no operation input has been made through the operation means, the first character data is displayed on the display means, whereas, when operation input has been made through the operation means, the plurality of pieces of second character data are displayed on the display means while being selectively switched from one to another.

By virtue of these features, the mode of display of the cursor is varied in accordance with the plurality of pieces of character data when an operation input through the operation means exists in a given period. It is therefore possible to vary the display cursor in accordance with the nature of the display data.

In accordance with a third aspect of the present invention, there is provided a portable information processing apparatus comprising a display apparatus which may be configured in accordance with any aspect and form of the invention described hereinbefore. In general, portable information processing apparatus is small-sized and light-weight. Therefore, the size of the display in most of portable information processing apparatus is considerably smaller than that of ordinary personal computers. However, the portable information processing apparatus having the display apparatus of the present invention can display on the menu screen various types of information such as electronic mails, schedules, plans, notes, voice memos, voice mails and so forth, along a common time axis as a reference, despite the small area of display. The user, therefore, can recognize the time at which each information was received, at a glance on the menu display, based on the positional relations of the icons displayed along the time axis. The attributes of pieces of icon information can simply be discriminated by the modes of display of the icons displayed on the menu screen. This eliminates the necessity of complicated hierarchical structures such as combinations of different types of software, and enables even those who are rather unfamiliar with the operation to easily operate the apparatus. It is thus possible to provide a portable information processing apparatus which can conveniently be used by users without difficulty.

These and other objects, features and advantages of the present invention will become clear from the following description of the preferred embodiments when the same is read in conjunction with the accompanying drawings.

BRIEF DESCRIPTION OF THE DRAWINGS

FIG. 1A is a schematic illustration of display on a display screen of an embodiment of the display apparatus in accordance with the present invention;

FIG. 1B is a schematic illustration of a main display screen displayed on the display apparatus shown in FIG. 1;

FIG. 2 is a block diagram showing hardware architectures of a portable information processing apparatus and a personal computer which are shown in FIG. 1;

FIG. 3 is a function block diagram showing a software architecture of a portable information processing apparatus in accordance with the present invention;

FIGS. 4, 4A and 4B form a function block diagram showing the detail of the block diagram shown in FIG. 3;

FIG. 5 is a schematic illustration of upper-level menus, lower-level menus and a definition screen, that are displayed in accordance with hierarchical order by the operation of a control system of the display apparatuses shown in FIGS. 1A and 1B;

FIG. 6 is a schematic illustration of an example of the content of display displayed by a display unit of the display apparatus shown in FIGS. 1A and 1B;

FIGS. 7A to 7D are schematic illustrations of examples of the contents of display on the display unit of the display apparatuses shown in FIGS. 1A and 1B;

FIGS. 8A to 8D are schematic illustrations od examples of display screens displayed on the display apparatus of FIGS. 1A and 1B;

FIG. 9 is a schematic illustration of an example of the content of display on the display unit of the display apparatuses shown in FIGS. 1A and 1B;

FIGS. 10A and 10B are schematic illustrations of examples of the contents of display on the display unit of the display apparatuses shown in FIGS. 1A and 1B;

FIGS. 11A to 11C are schematic illustrations of examples of the contents of display on the display unit of the display apparatuses shown in FIGS. 1A and 1B;

FIGS. 12A and 12B are schematic illustrations of examples of the contents of display on the display unit of the display apparatuses shown in FIGS. 1A and 1B;

FIGS. 13A to 13C are schematic illustrations of examples of the contents of display on the display unit of the display apparatuses shown in FIGS. 1A and 1B;

FIG. 14 is a function block diagram showing a software architecture of a portable information processing apparatus in accordance with the present invention;

FIG. 15 is a schematic illustration of a memory map showing the hierarchy of information stored in a storage section of a portable information processing apparatus of the present invention;

FIG. 16 is an illustration of the concept of an electromagnetic signal of data transmitted and received through a communication unit or between internal devices;

FIG. 17A is an illustration of an example of a table which defines correlation between character data stored in the storage section of a portable information processing apparatus and function programs;

FIG. 17B is an illustration of an example of a table which shows character data stored in a storage section of the portable information processing apparatus, as well as positions of icons on the screen and menu forms, for each of a plurality of menu modes;

FIG. 18A is an illustration of examples of background-image character data, stored in the storage section of the portable information processing apparatus;

FIG. 18B is an illustration of examples of icon character data stored in the storage section of the portable image processing apparatus;

FIG. 19 is a flowchart illustrating the flow of control performed by a control system;

FIG. 20 is a flowchart showing the detail of the processing "A" of the flow shown in FIG. 19;

FIG. 21A is a flowchart showing the detail of Step 3 of the flow shown in FIG. 19;

FIG. 21B also is a flowchart showing the detail of Step 3 in the flow shown in FIG. 19;

FIG. 22A is a flowchart showing details of Steps 32 and 42 in the flowcharts of FIGS. 21A and 21B;

FIG. 22B is a flowchart showing the detail of a routine for executing Steps 32 and 43 of the flowcharts shown in FIGS. 21A and 21B;

FIG. 22C also is a flowchart showing the detail of a routine for executing Steps 32 and 43 of the flowcharts shown in FIGS. 21A and 21B;

FIG. 23A is a flowchart showing the procedure of operation executed by means of an operation system of the display apparatuses shown in FIGS. 1A and 1B;

FIG. 23B is a flowchart showing the detail of Sep 101 of the flow shown in FIG. 23A;

FIG. 23C is a flowchart showing the detail of Sep 104 of the flow shown in FIG. 23A;

FIG. 24 is a schematic illustration of the content of display on a display screen of another embodiment of the display apparatus in accordance with the present invention;

FIG. 25 is a schematic illustration of a lower-level menu screen (window) which is opened when an icon on the display screen of FIG. 24 is clocked;

FIG. 26 also is a schematic illustration of a lower-level menu screen (window) which is opened when an icon on the display screen of FIG. 24 is clocked;

FIG. 27 is a perspective view of a portable information processing apparatus of the present invention and a personal computer which in combination form a network system, arranged to perform synchronization of data;

FIG. 28 is a front elevational view of a portable information processing apparatus of the present invention;

FIG. 29 is a schematic illustration of a main screen displayed on a display unit of the portable information processing apparatus shown in FIG. 28;

FIGS. 30A to 30F are schematic illustrations of lower-level menus shown in a lower-level menu of the main screen of FIG. 29;

FIGS. 31A to 31E are schematic illustrations of contents of display on the display unit of the portable information processing apparatus of FIG. 28;

FIG. 32 is a schematic illustration of upper-level menus, lower-level menus and a definition screen, that are displayed in accordance with hierarchical order by the operation of a control system of the display apparatuses in accordance with the present invention;

FIG. 33 is a flowchart showing the operation procedure executed by an operation system;

FIG. 34A is a schematic illustration of an example of a display screen in a different embodiment of the display apparatus in accordance with the present invention;

FIG. 34B is a schematic illustration of a main screen of display in the display apparatus shown in FIG. 34A;

FIG. 35 is a schematic illustration of upper-level menus, lower-level menus and a definition screen, that are displayed in accordance with hierarchical order by the operation of a control system of the display apparatuses shown in FIGS. 34A and 34B;

FIGS. 36A to 36C are schematic illustrations of an example of the display screen on a display unit of the display apparatus shown in FIGS. 34A and 34B;

FIGS. 37A and 37B are schematic illustrations of examples of display contents displayed on the display unit of the display apparatus shown in FIGS. 34A and 34B;

FIGS. 38A to 38C are schematic illustrations of examples of display contents displayed on the display unit of the display apparatus shown in FIGS. 34A and 34B;

FIGS. 39A to 39C are schematic illustrations of examples of display contents displayed on the display unit of the display apparatus shown in FIGS. 34A and 34B;

FIGS. 40A to 40C are schematic illustrations of examples of display contents displayed on the display unit of the display apparatus shown in FIGS. 34A and 34B;

FIGS. 41A to 41C are schematic illustrations of examples of display contents displayed on the display unit of the display apparatus shown in FIGS. 34A and 34B;

FIG. 42 is a schematic illustration of display content displayed on the display unit of the display apparatus shown in FIGS. 34A and 34B;

FIG. 43A is a flowchart showing the procedure of operation executed by means of an operation system of the display apparatuses shown in FIGS. 34A and 34B;

FIG. 43B is a flowchart showing the detail of Sep 141 of the flow shown in FIG. 43A;

FIG. 43C is a flowchart showing the detail of Sep 144 of the flow shown in FIG. 43A;

FIG. 44 is a schematic illustration of the content of display on a display screen of a different embodiment of the display apparatus in accordance with the present invention;

FIG. 45 is a schematic illustration of upper-level menus, lower-level menus and a definition screen, that are displayed in accordance with hierarchical order by the operation of a control system of the display apparatus shown in FIG. 44;

FIGS. 46A and 46B are schematic illustrations of an example of display screen displayed on the display unit of the display apparatus shown in FIG. 44;

FIGS. 47A and 47B are schematic illustrations of an example of display screen displayed on the display unit of the display apparatus shown in FIG. 44;

FIGS. 48A to 48F are schematic illustrations of an example of display screen displayed on the display unit of the display apparatus shown in FIG. 44;

FIGS. 49A to 49F are schematic illustrations of an example of display screen displayed on the display unit of the display apparatus shown in FIG. 44;

FIGS. 50A to 50F are schematic illustrations of an example of display screen displayed on the display unit of the display apparatus shown in FIG. 44;

FIGS. 51A to 51F are schematic illustrations of an example of display screen displayed on the display unit of the display apparatus shown in FIG. 44;

FIG. 52A is a schematic illustration of a display screen in a different embodiment of the display apparatus in accordance with the present invention;

FIGS. 52B and 52C are schematic illustrations of examples of display screen on the display unit of the display apparatus shown in FIG. 52A;

FIGS. 53A to 53D are schematic illustrations of examples of display screens on a display unit of the display apparatus shown in FIG. 52A;

FIGS. 54A to 54C are schematic illustrations of examples of display screens on a display unit of the display apparatus shown in FIG. 52A;

FIGS. 55A to 55C are schematic illustrations of examples of display screens on a display unit of the display apparatus shown in FIG. 52A;

FIGS. 56A to 56C are schematic illustrations of a portable information processing apparatus of the present invention and a personal computer which in combination form a network system, arranged to perform synchronization of data; and FIG. 57 is a schematic illustration of an example of the menu configuration in a conventional display apparatus.

DESCRIPTION OF THE PREFERRED EMBODIMENTS

First Embodiment (Overall System Configuration)

FIG. 2 shows a system which suitably incorporates the present invention. The system includes one or more wearable, e.g., wrist-type, portable devices 1 serving as user terminals or PDAs and functioning as first information processing apparatus, and a personal computer (referred to as "PC", hereinafter) 140 serving as a host computer that provides predetermined services and functions as a second information processing apparatus. A network is formed by the PC 140 and the portable devices 1, such that they can communicate with each other. The PC 140 is installed in, for example, a home or an office, while the portable device 1 is worn by a user by being wound around a wrist.

The PC 140 comprises, as known in the art, a computer having high performance and incorporates therein various parts or components as shown in FIG. 2: namely, a time measuring unit 141 for measuring time; a storage unit 142 for storing various kinds of data; a display unit 143 for displaying data; operating unit 144 which permits various operations to be executed on various kinds of information displayed on the display unit 143; communication unit 145 which permits exchange of information between the PC 140 and another information processing apparatus such as the portable device 1; a voice output unit 146 that outputs voice information; a voice input unit 147 which permits input of voice information; and a CPU 148 that control these units.

The storage unit 142 stores various programs and data, including an exclusive software for running the PC 140 itself, an exclusive application software for generating display screens peculiar to the present invention, a web browser and a protocol which enable downloading of data to the portable device 1, and so on.

Preferably, the software which generates the display screen peculiar to the invention is formed in the form of, for example, an exclusive PC card, independently from the storage area of the PC 140.

(Synchronization of Data)

The portable device 1 is used independently but may be synchronized with the PC 140 so as to form a system together with the PC 140.

Various techniques are available for the purpose of synchronization of data. For instance, data updating means (not shown) is provided in each of the PC 140 and the portable device 1. The data updating means performs comparison between the data in the portable device 1 and the data stored in the PC 140 and, based upon the result of the comparison, performs updating and synchronization of the data. Preferably, the data updating means is provided in each of the communication unit 145 of the PC 140 and the communication unit 15 of the portable device 1.

In another technique for synchronizing the data, data stored in the storage unit 142 of the PC 140 is downloaded to a storage unit 12 of the portable device 1, in response to a request which is produced by the portable device 1 simultaneously with the start-up of the system upon turning on of the power supply of the portable device 1. Data in the storage unit 142 of the PC 140 is rewritten when updating of the data is required. Thereafter, as the portable device 1 is turned on, the portable device 1 set in the same state as the PC 140 in accordance with the updated data.

Thus, inputting or changing basic data in one of the PC 140 and the portable device 1 causes the other to be automatically updated. In the described embodiment, the portable device 1 and the PC 140 can be synchronized without requiring any specific attention of the user, even when the portable device 1 and the PC 140 are spaced a long distance from each other.

The user can edit the content of the information displayed on the display unit 13 of the portable device 1, by suitably operating the PC 140 while monitoring the display on the display unit 143 of the PC 140. In order to assist the user conducting the editorial work, an image of the portable device 1 appears on a part of the display unit 143 of the PC 140 (see FIG. 52). It is therefore possible to take-up a desired image from the PC 140 into the portable device 1, by clipping the image information at the PC 140 and pasting the information into the window opened on the PC 140. This operation will be described later in more detail in conjunction with a fifth embodiment of the present invention. This feature is particularly useful in the case where a PC card is incorporated in the PC 140, because the content of the displayed information can be inspected.

In the described system, the size of the display area of the display unit 143 of the PC 140 is much greater than that of the display unit 13 of the portable device 1. Therefore, a mere synchronization produces only an effect to compress the image displayed on the PC 140 and to display the compressed image on the display unit 13 of the portable device 1. This embodiment is arranged such that the display unit 143 and the display unit 13 have identical images, and employs the following unique features in order that the user can naturally recognize the two devices, i.e., the PC 140 and the portable device 1, as being an identical device.

More specifically, in this embodiment, character patterns different from those generated in the PC 140 are formed in the portable device 1 so that display of icons on the portable device 1 is performed in such a manner as to facilitate understanding by the user, although the images on both devices are the same. In addition, both the PC 140 and the portable device 1 employ the same background image and icon character image, thus providing a user interface which permits easy visual recognition by the user, even when the user is a beginner.

(Hardware Architecture of the Portable Device)

FIG. 1A schematically shows the appearance of the portable device 1. The portable device 1 use in this embodiment is small-sized and light-weight so that it can be worn by a user, for example, by being wound around a user's wrist. More specifically, the portable device 1 has a wrist band portion (not shown) adapted to be wound around the user's wrist, a display unit 13 having, for example, a liquid crystal display and serving as displaying means, connected to the wrist band portion, and an input operation unit 14 serving as an input operating means and having operating portions arranged on side edges of the display unit 13.

More specifically, the input operation unit 14 has a crown 14A which serves as a rotational input portion, a zoom-in button 14B on the upper side of the crown 14A as viewed in the Figure, a zoom-out button 14C on the lower side of the crown 14B, and a function button 14D and a recording button 14E arranged on opposing sides of the display unit.

The crown 14A permits two types of operation, i.e., rotational operation in clockwise and counterclockwise directions as indicated by arrows R and S, and push-pull operation as indicated by a double-headed arrow T. The rotational motion of the crown 14A causes a cursor to move up and down (U, V). Upward (U) or downward (V) scrolling of the display screen is commenced when the cursor has reached the upper or lower end of the display screen.

The zoom-in button 14B is used for switching of schedule displaying mode over a 5-hour mode, 12-hour mode, 1-week mode, 1-month mode and 1-year mode. Switching back from one to the preceding mode is effected by operating the zoom-out button 14C. The zoom-out button 14C also enables selection of icons to cause the display unit to display lower-level menu screens. Simultaneous pressing of zoom-in and zoom-out buttons 14B, 14C causes resetting to the one-day 5-hour mode which shows also the instant time, regardless of the type of the display screen displayed when these buttons are pressed simultaneously.

Referring now to FIG. 2, the portable device 1 further has a CPU 18 which performs overall control of the portable device 1. The input operation unit 14 and the display unit 13 are connected to a BUS line of the CPU 18. Various functions shown in FIGS. 3 and 4 are implemented by a display driving function of the CPU 18 and a display interface (not shown) in the display unit 13.

To the BUS line of the CPU 18, also connected is a storage unit 12. As shown in FIG. 15, the storage unit 12 has a control section 22A storing a control program, and real data section 22B which stores various types of data. The real data section 22B will be described later in detail, but it is to be understood here that the real data section 22B preferably has a ROM and a RAM that store the data. The ROM has a data memory that stores various kinds of data such a icon character data, background character (image) data, font data and position data defining positions of the icons relative to the background image. The ROM also has a program memory which contains various programs including a menu displaying program for displaying various menus used in those embodiment, a function program which defines various functions of this embodiment, a boot program which activates the CPU 18 in response to turning on of the power supply of the portable device 1 to start the latter, a display program which is determined by first to fourth display setting portions which will be described later. When the power of the portable device 1 is turned on, the boot program makes access to the storage unit 142 of the PC 140 so as to read the web browser, various communication protocols and other data, and loads them down into the RAM.

The RAM stores information which has been input through various kinds of setting screen. Thus, the functions of the first to fourth display setting portions are implemented by the display setting function of the CPU 18, the storage unit 12, and a memory interface (not shown) which is provided in the storage unit 12.

To the BUS line of the CPU 18, further connected are a time measuring unit 11, voice input unit 17 and a voice output section 16 having a microphone which is not shown.

A communication unit 15, which serves as the communicating means also is connected to the BUS line of the CPU 18, as will be seen from the block diagram in FIG. 2. The communication unit 15 includes an infrared communicating portion (IRDA) 15D which performs communication by way of infrared rays, a radio communicating portion 15C for wireless radio communication, a MODEM 15B connected to these communicating portions to perform modulation and demodulation, a telephone 15E and a communicating portion 15A which incorporate the telephone 15 as a serial interface and which is connected to the MODEM 15B. The connection to the CPU 18 is made through this communicating portion 15A. The infrared communicating portion (IRDA) 15D has a transmitting portion (port) for infrared rays. The MODEM 15B is configured in the form of a soft MODEM through which a serial bit train is received by the CPU 18. The MODEM 15B has an interface for infrared rays. The CPU 18 conducts various processings relating to the MODEM 15B and the communicating portion 15A. Thus, the portable device 1 is capable of communication via infrared rays and transmission/receipt of electronic mails.

A notification unit 19B for notifying the user of the presence of information is connected to the CPU 18. The notification unit 19B may be implemented by various means such as vibration generating means capable of generating vibration of magnitude variable in a stepped manner to stimulate the user, a smell generating means for generating smell of intensity variable in a stepped manner, alarming tone changing means which generates tone of a level variable in a stepped manner, light generating means capable of generating light adjustable in a stepped manner, an electric discharging means which gives an electrical shock to the user in a manner adjustable stepwise, and so forth. A battery capacity detecting unit 19A for detecting the remaining capacity of a battery as the power supplying means is connected to the CPU 18.

It is possible to connect to the CPU 18 a detection means (not shown) that detects posture of the display unit with respect to a horizontal plane. In this case, the CPU serves also as a posture switch control means which controls the power supply in response to the detection output from the posture detection means in such a manner as to turn the power supply on when the detected posture angle falls within a predetermined range and turns the power off when the posture angle is outside the above-mentioned range. With this arrangement, power is turned on or off in accordance with the posture of the display device itself. For instance, when the user does not wish to look into the display, the power is kept off to save wasteful operation, thus achieving a reduction in the power consumption.

(Display Screen of Portable Device)

Referring to FIG. 1B, a schedule display screen as a main screen obtained in a schedule displaying mode 20 has three display areas: namely, a schedule date display area 22, a time axis display area 30, a schedule display area 40 and an instant time display area 26, which are arranged in the mentioned order from the left to the right as viewed on the Figure. The time axis and the schedule are displayed such that future time and schedule are shown at the upper side and past time and schedule are shown at the lower side of the display screen, and the border line which separates the future time and the past time indicates the instant time. The background of the lower area below the border line may be colored in, for example, gray.

At a lower part of the display area of the display unit 13, formed are voice memo icons 60A and electronic mail icons 70, whereas, in upper part of the display area, formed are "To do" list icons 46A to 46D. A schedule icon 44 is formed in the display area 40.

The "To do" list icons 46 show future events or tasks so that they are displayed in an array at an upper right corner of the display area. The size of the "To do" icons 46 is correlated to the degree of importance or degree of urgency of each item represented by this icon. These "To do" icons are arrayed in an order such that the earlier event or task appears at the left side.

The described display screen has a unique feature that the icon information, e.g., the schedule icon 44, "To do" list icons 46A and so forth shown in FIG. 1B are progressively enlarged as the due time approaches. The size of the voice memo icon 60A is varied such that the size of this icon is large when the recording time is long. The user therefore can remember or recall the content of the voice memo solely by recognizing the size of the icon.

The "To do" icons 46 include a "To do" list icons 46A as the first icon information and a "To do" list icons 46B as a second icon information. In this embodiment, the degrees of importance and urgency are represented by providing difference in size between the first icon information and the second icon information. This, however, is only illustrative, and various modes of display can be used for giving meanings to the icons, such as color, configuration, motion, blinking and so forth, in accordance with the content or nature of the information, e.g., degree of importance, degree of urgency, size of the data, etc. Such display modes may be used not only for the "To do" list icons but also to other kinds of icons such as electronic main icons, voice memo icons, and so on.

The electronic mail icons are displayed in a stacked manner so as to contain overlapping regions. Thus, a multiplicity of icons of the same kind are stacked on display one on another, enabling displaying of a multiplicity of icons. With this function, the user can visually and roughly grasp the number of received electronic mails, at a glance of the size of the stack. The number of the icons that can be stacked on the display, however, is limited. Electronic mails received after a predetermined number has reached are handled as "many mails".

Clicking a "To do" icon 46 opens a window which presents a display screen 47 as shown in FIG. 10A. The user can select "DONE" 48A or "NOT YET" 48B by pushing or pulling the crown 14A. A subsequent selection is made through the zoom-in button 14B. When the DONE tab 14 is selected, a check mark 49 as shown in FIG. 10B appears on the display means are provided for displaying the window as if the window is exploding, thereby giving a feel of achievement of the task "To do" to the user.

The voice memo icons 60A are arrayed at right lower corner of the display screen, because these memos are events conducted in the past.

Referring to FIG. 7C, the 1-week mode of the schedule display shows the electronic mail icons 70 and the voice memo icons 60 simply positioned along the time axis, but does not show details of the schedule. When the user wishes to confirm the detail of the schedule, the user moves the cursor to the week displayed in the 1-month mode and magnifies the appointed week by operating the zoom-in button 14B. Then, the user selects the date which is contained in the magnified display of the week and magnifies the information on the selected data by using the zoom-in button 14B, whereby the user can make access to the time band of interest.

When the user selects the voice memo icon 60 by means of the zoom-in button and opens the window of this icon, a bar graph 63 appears in an upper part of the window to indicate the date and time of writing (recording) of the memo, as well as the time length of recording, as shown in FIG. 11A. This triggers the user to recall the content of the memo, without necessitating reproduction of the recorded information.

At a lower part of the window, there are shown icons "DISPOSE" 62A, "REPRODUCE" 62B and "MOVE TO TIME AXIS" 62C which enables the user to select how to deal with the memo.

The user then inverts the icon of interest by a push or pull of the crown 14A, and selects the inverted icon by means of the zoom-in button 14B which has a selecting function. If there is no need for making access to the memo, the user presses the zoom-out button 14C which has a canceling function, so that the window is closed.

Selection of "MOVE TO TIME AXIS" causes the cursor to trap the voice memo icon 60A to make it blink. The user then rotates the crown 14A to "drag" this icon to the time axis and pastes it to the time axis by pressing the crown 14A.

Then, pressing of the zoom-in button 14B opens a window which enables setting of desired date and time and selection of a desired notification means such as alarming tone, beep, vibration or the like. After confirmation of date and time and selection of the notification means, a voice memo icon 60C is placed on the schedule (see FIG. 11B).

The notification unit is switchable to select one of three portions: namely, a first notification portion that performs notification in accordance with the state or condition of the user, a second notification portion that performs the notification based on the content of the information, and a third notification portion that performs notification in accordance with the degree of importance or urgency. For instance, weak blinking is selected for a time period in which the user is sleeping. In case of a meeting, arrival of a mail is notified by way of vibration rather than sound, so as not to disturb the meeting. It is possible to arrange such that a notification of arrival of a mail is made by voice which announces the name of the user. Various other notification means are usable such as tone changing means, voice changing means, vibration generating means, smell generating means, light generating means, electricity generating means for giving an electrical shock, and so forth.

For the purpose of recording a voice memo, the user presses the recording button 14E, thereby opening a window as shown in FIG. 13A, whereby the device is ready for recording the user's voice. Upon recognition of the voice, the display screen 130 starts to blink as shown in FIG. 13B to indicate that the voice is being recorded. When the user stops to speak, the recording is automatically ceased, and a next window 134 of a low-level is opened.

As shown in FIG. 13C, the window 134 shows the date, time and time length of recording. One of subsequent operations such as "ERASE" 136C, "REPRODUCE" 136B and "MOVE TO TIME AXIS" 136A is selectable by push-pull operation of the crown 14A and operation of the zoom-in button 14B. Pressing of the zoom-out button 14C causes the display to be reset to the schedule display screen.

Arrival of an electronic mail to a desktop or note PC or to a server is informed also to the portable device. More specifically, an electronic mail icon 70 appears at the position of the instant time and blinks, as shown in FIG. 12A. Pressing of the zoom-in button 12B causes a window 71 of a lower-level menu to appear, with indication of the nature of the mail such as "URGENT" or "R.S.V.P.". This window 71 also displays a photo 71A of the sender's portrait, as well as a summary 71c of the content of the message.

An additional pressing of the zoom-in button 14B causes a lower-level menu screen .72 to appear as shown in FIG. 12B, showing the time and date of the receipt, as well as the sender's name. Icons "INSPECTED" 73B and "MOVE TO TIME AXIS" 73A are selectably displayed at a lower part of this window 72. Selection of "MOVE TO TIME AXIS" enables the user to be notified when the designated time has come.

Various icons described hereinbefore can freely be pasted on the time axis, so as to be incorporated in the schedule in the order of time. For instance, in the display screen shown in FIG. 11C, the voice memo icon 60B appears also along the time axis.

In this embodiment, the voice memo icon 60 and the electronic mail icon 70 are positioned along the time axis according to the input time and arrival time. This embodiment, however, may have a catch-net metaphor function in which events of times preceding the displayed time are collected in a lower region of the schedule display screen.

FIG. 9 shows an initial screen displayed in a sleep mode after turning on of the power supply. In this sleep mode, the lower region indicating the instant time 28 is widened to spread over a substantial area of the screen in a manner like a lower eyelid. This spread region additionally indicates the remaining capacity of the battery. The sleep mode display may be such one as to completely cover the display area or to expose a portion of the schedule display region over a period of, for example, 2 hours from now on. In the latter case, the user can confirm the schedule in forth coming two hours or so, without switching the display to the main screen. This sleep mode darkens the display so as not to allow any other person to look into the user's schedule. The schedule display area may be darkened out for the security purpose. Icons on display however, remain on the display to allow the user to confirm whether there is any task or event. The bar graph appearing on the right end indicates the level of charging of the battery.

As in the case of a screen saver, the schedule display mode as shown in 36B can be recovered when any switch is operated. Suspension of operation over a predetermined period causes the display to the sleep mode again.

(Scrolling)

The screen can be scrolled by rotating the crown as shown in FIGS. 7A to 7D. The arrangement is such that the speed of rotation of the crown corresponds to the speed of the scrolling.

Referring to FIG. 23A, for the purpose of scrolling, the crown is rotated (Step S100), and a routine "A" (Step S101) is conducted to determine the direction of rotation.

In the routine "A", whether the direction of rotation is upward or downward is determined (Step S110). When the direction is upward, the amount of the upward rotation, e.g., angle of rotation or number of revolutions, is detected (Step S111*a*). Then, the amount of scrolling to be performed on the display screen corresponding to the detected amount of rotation is calculated (Step 112*a*). by making reference to a rotation-scroll conversion table which is prepared beforehand and which indicates the relation between the amount of rotation and the amount of scrolling. The display control unit then performs a screen moving operation (Step S 113*a*), i.e., screen updating operation, to scroll the display screen by the amount calculated in the preceding step. The scroll processing (Step S102) of the main flow is thus reached.

The display screen updating processing for the scrolling purpose is preferably such that, when the amount Y of upward movement of the screen is smaller than the size Y1 of the display screen, the region Y1–Y of the old data, which needs not be updated, is left on the screen, and only the region Y o be newly displayed is displayed above the region Y1–Y in which the old data remains.

Such a processing effectively enhances the speed of the scrolling processing. When the rotation of the crown is downward in Step S 110, steps S 111*b* to S 113*b*, similar to Steps S 111*a* to S 113*a*, are executed. Although Step S 112*b* refers to a rotation-scroll conversion table prepared specifically for downward rotation, it is possible to arrange such that a common conversion table is used both for upward and downward rotations.

Display processing regarding the scroll processing is then executed (Step S 102). Thereafter, Step S 103 is executed to confirm stopping of rotation of the crown, followed by a processing "B" (Step S 104).

In this embodiment, the crown 14A can effect scrolling operation by being rotated and, in addition, left and rightward cursor moving processing by being pushed and pulled. The following processing "B" therefore can be conducted by using the crown 14A.

Referring to FIG. 23C, the routine "B" in Step S 104 begins with Step S 120 which determines whether or not any push/pull operation of the crown 14A has been made. If no operation is confirmed, the routine "B" is ceased. However, if the crown 14A has been pushed or pulled, the process advances to Step S 121 which detects the amount of movement of the crown 14A. Then, the amount of movement of the cursor is calculated (Step S 122) based on the amount of movement of the crown 14A, by referring to a correlation table, and a processing is performed to move the cursor (Step S 123). Subsequently, various display processings are conducted (Step S 124) through the operation such as clicking and dragging using the cursor. The process then proceeds to Step S 125 which determines whether or not a further movement of the cursor is necessary. If Step S 125 has determined that a further cursor movement is necessary, Steps S 120 onwards are executed again, otherwise, the routine "B" is ceased.

As shown in FIGS. 7A to 7D, when scrolling the display screen, the scale of the schedule can be switched over to select one of the 5-hour mode, 12-hour mode, 1-week mode and 1-month mode. Therefore, the balance of display area between the data display, time display and the schedule display, in particular the width of the time axis (width of the time axis display area 30), is progressively reduced in the order of G1 □ G2 □ G3 □ G4. At the same time, the width of the non-colored area for the schedule display is reduced from H1 to H2, while the schedule date display area is reduced in the order of F1 □ F2 □ F3 □ F4. The user therefore can visually understand that the time scale has been compressed, without difficulty. The number and size of the fonts describing the title of the schedule are also varied in accordance with the change in the time scale.

When the first information in the lower hierarchical level of an item of the schedule has a specific relation to an information, e.g., address information, stored in the portable device, an automatic correlating operation is performed so that the related information is displayed in the same column as the schedule item on the display.

(Database)

Selection of the function button 14D switches the operation to a database mode, so that a database menu screen 82 appears as shown in FIG. 8A. The database menu screen 82 displays five categories: namely, "PEOPLE" 82A, "OFFICE" 82B, "PROJECT" 82C, "SYNCHRONIZE" 82D AND "REFERENCE" 82E. A desired category can be inverted by rotating the crown 14A. In the illustrated embodiment, the category "OFFICE" 82B has been inverted. Pulling of the crown 14A causes the inverted category to be selected and switches the display to a lower level of hierarchy. As a result, an initial selection screen 94 comes into the display screen from the right side thereof. This display screen 94 is of a lower hierarchical level and contains a list of names arranged in alphabetic order, while the menu selection region 92 of the higher hierarchical level, showing the categories for selection, is pressed towards the left end of the display screen.

A desired initial is inverted in the initial selection screen 94 by rotation of the crown 14A. In the case of FIG. 8B, the character "G" is inverted. The inverted initial is selected, and the display is changed to lower hierarchical level, as a result of pulling of the crown 14A.

Preferably, the display screen as shown in FIG. 8B is formed as follows. In general, the region in which the cursor can move is a meaningful area, while other area where the cursor cannot move is an insignificant area. Therefore, the area of the display screen other than the initial selection region 94 is displayed as a background image. In response to a scrolling operation performed through the input operation unit, i.e., the crown 14A, the character displayed on the initial selection region 94 is successively updated. Namely, character appears on the order of A, B, C, D and so forth, in accordance with the rotation of the crown 14A. A further rotation of the crown 14A causes the character G to appear, followed by H. In this case, only the portion of the region 94 corresponds to G is inverted to allow the character G to appear.

After the character G has been selected, the display screen is changed such that the display contents are compressed leftward as shown in FIG. 8C. More specifically, the region 92 remains without being rewritten, while other regions are rewritten. By arranging the data in the order of the hierarchical structure, it is possible to eliminate the step of sorting and extracting the data which is necessary each time of retrieval when the data is arranged in a random manner. Such an arrangement therefore facilitates the control. It is therefore preferred that all the data are arranged in the alphabetic order.

In the hierarchical level shown in FIG. 8C, a name selection display screen 100 is displayed showing a list of names arranged in alphabetic order. In this name selection screen, the menu selection region 92 and the initial selection region 94 have been compressed further towards the left end. A desired name is inverted in this name selection screen 100 by rotation of the crown 14A and is selected by pulling of the crown 14A. As a consequence, a personnel data screen 110, which is of the lowest hierarchical level, appears as shown in FIG. 8D. In this screen 110, the menu selection region 92, initial selection region 94 and the name selection region 106 have been further compressed to the left. Data such as a photograph 120 of the portrait of the person designated by the name, as well as the name 122A, phone number 122B and address 122C, is displayed in a personnel data display area 118 of the personnel data screen 110.

In this embodiment, the category "PEOPLE" 82A has a hierarchical structure represented by menu screen 82 □ initial selection screen 90 □ name selection screen 110 □ personnel data screen 110.

Display screens of lower levels of hierarchy successively appear from the right side of the display screen. Consequently, the width of the menu selection region 92 progressively decreases as L1 □ L2 □ L3 as the screens of lower hierarchical levels appear. Similarly, the width of the initial selection region 94 decreases as M1 □ M2 □ M3, as will be seen from FIGS. 8B to 8D. Thus, the data of different hierarchical levels are arrayed horizontally, and items in each hierarchical level are arrayed vertically. Shifting from one to another hierarchical level is effected by push-pull operation of the crown 14A, while selection of an item in a hierarchical level is performed by rotation of the crown 14A.

It will be seen that all the hierarchical levels above the level which is being displayed are left on the display screen. This facilitates the understanding of the hierarchical structure, helping the user to shift the display from one to another hierarchical level. In addition, the direction of stack of the hierarchical levels and the direction of operation for selecting a hierarchical level are the same, whereby an easily-understandable interface is implemented.

In the described embodiment, the relation between the rotation of the rotational input portion and the scrolling of the display screen is determined by a table which is prepared such that three full revolutions of the input portion causes the display screen to move several centimeters. The present invention, however, may employ a rotational angle detecting means, horizontal movement detecting means and a rotational angular velocity detecting means and so forth connected to the CPU. Such detecting means are used in combination with various tables stored in the storage unit, such as a rotation angle vs. vertical movement conversion table which defines the relationship between the angle of rotation of the rotational input portion, i.e., the crown, and the amount of vertical movement of the display screen, a crown horizontal movement vs. cursor horizontal movement conversion table which defines the relationship between the amount of horizontal movement of the crown and the amount of horizontal movement of the cursor, an angular velocity vs. zooming conversion tale defining the relationship between the angular velocity and the zoom-in/out of the display image, and so forth. In such a case, the CPU serves as rotation angle-vertical movement converting means, crown movement-cursor movement converting means and angular velocity-zooming converting means.

For instance, the icon is enlarged when the importance has become greater, or when the due time has been approached. In case of the voice memo, the size of the icon is increased when the recording time is long. Therefore, the user can remember the content simply by discriminating the size of the icon.

(Software Architecture of Portable Device)

FIG. 3 is a block diagram showing the configuration for implementing the described hierarchical structure in the portable device. Major components shown in the block diagrams have already been mentioned in the foregoing description.

Referring to this Figure, the portable device has a display control system including the input operation unit 14, a voice input unit 17, the first to fourth display setting units 210A to 210D, a display control unit 260, the display unit 13, the voice output unit 16, and a voice control unit 270. In this embodiment, the input operation unit 14 includes a crown 14A and associated interface. The arrangement is such that the cursor moves on the display screen in response to the operation of the input operation unit 14, in accordance with display control which will be described later. It is possible to select one of menus on the display screen by clicking an icon or the like pointed by the cursor.

The detail of the first to fourth display setting units 210A to 210D will be described with specific reference to FIGS. 4, 4A and 4B.

The first display setting unit 210A sets up an initial screen which is displayed when the power is turned on. In this screen, font data indicative of the time against a background which is displayed by a specific metaphor. When this initial screen is displayed, the portable device is in the sleep mode in ordinary operation of the device. A main screen then appears in response to an operation of the input operation unit 14.

The second display setting unit 210B sets up a group of menus of upper hierarchical level. In this embodiment, three modes, i.e., "schedule", "memo" and "database" are available as the items. This menu screen is set up via the step of displaying the initial screen which is performed when the power is turned on. A desired mode can be selected on the main screen by operating the input operation unit 14. The selected mode is then displayed.

More specifically, it is possible to select one of the modes by moving the cursor to point the desired mode, through an operation of the input operation unit 14. Information concerning this selection is delivered from the second display setting unit 210B to the third and fourth display setting units 210C and 210D.

The main screen described above displays icons such as those denoted by 44, 46, 60A and 70 in a n icon display region of the "schedule" mode, as well as a time axis scaled by hour. When there is a schedule on this time axis, the background is colored. To this end, the background color is displayed in a schedule background color display area region 32. The "database" mode displays regions for various items which are used when the database is retrieved. Any of these icons and regions (characters) can be selected by operating the input operation unit 14 to move the cursor on the main screen so as to point the icon of interest. Information concerning this selection is delivered from the second display setting unit 210B to the third and fourth display setting units 210C, 210D.

Based on the output from the second display setting unit 210B, the third display setting unit 210C sets up upper-level menus such as the icon and characters (region) selected in the second display setting unit 210B. If there are a plurality of lower-level menus, such lower-level menus also are set up as information to be displayed. FIGS. 10A and 10B show n example of a group of such lower-level menus. For instance, when the "To do list" icon 46A has been selected in the second display setting unit 210B, the third display setting unit 210C sets up a group of lower menus corresponding to this icon. In this case, a "To do list display screen" 47 (See FIG. 10A) is set up. These lower-level menus are displayed in, for example, a window which is opened in the main screen on the display unit 13, by the operation of the display control unit.

A subsequent operation of the input operation unit 14 causes the cursor to move on each mode screen, so that one of the lower-level menus is selected in each mode screen. Information concerning this selection is delivered from the third display setting unit 210C to the fourth display setting unit 210D.

Based on the output from the second (or third) display setting unit 210B (or 210C), the fourth display setting unit 210D sets up information to be displayed. More specifically, the fourth display setting unit 210D sets up a display screen for displaying the selected upper-level menu (only when there is no lower-level menu corresponding to this upper-level menu), or a setting screen for setting lower-level menu (if any) under the selected upper-level menu.

When a screen is set up by the fourth display setting unit 210D, the display control unit performs the display control so as to display, on the display unit 13, the lower-level menu screen instead of the mode screen.

For instance, when the "To do list display screen" 47 has been selected by the third display setting unit 210C and the DONE tab 48A in this screen has been clocked, a check mark corresponding to this tab is synthetically displayed.

Alternatively, if the database mode has been selected, and if the initial selection screen 90 (see FIG. 8B) has been selected by the third display setting portion 210C, the fourth display setting unit 210D sets up the name selection screen 100 (see FIG. 8C).

Thereafter, various pieces of information corresponding to the selected item can be input by an operation of the input operation unit. The condition information set by the operation of the input operation unit is displayed by being superposed on the setting screen which is displayed on the display unit 13, so that the user can confirm the set information.

Fifth, sixth and further display setting units may be employed as required if there are a plurality of lower-level menus.

(Display Setting Unit)

The detail of each of the display units 210A to 210D (collectively represented by numeral 210, hereinafter) will be described with reference to FIGS. 4, 4A and 4B. The display setting unit 210 has a data processing unit 230 that performs processing of data mainly based on time information derived from the time measuring unit 11 and communication information derived from the communicating unit 15. The display setting unit 210 also has a UI processing unit 240 which operates based on the data from the data processing unit 230 and operational input from the input operation unit 14, so as to generate background image and icon character data to be displayed and to set the display screen itself, thereby processing the user interface. The display setting unit 210 further includes the storage unit 12 which stores data to be processed by the data processing unit 230 and the data to be processed by the UI processing unit 240. The data processing unit 230 and the UI processing unit 240 communicate with each other for processing the input from the input operation unit 14.

The data processing unit 230 has carious processing sections corresponding to functions of various applications, including a mail processing section 230A for processing mail data, a memo processing section 230B for processing memo data, a database data processing section 230C for processing data in the database, a voice memo processing section 230D for processing voice memo data.

The information processed by the data processing section 230 includes communication information from the communication unit 25, time information from the time measuring unit 11 and input/output information produced in accordance with the operation of the input operation unit 14. The communication information includes, for example, electronic mail information transmitted and received through the communication unit 15, and receipt time information includes in a header accompanying the electronic mail information and indicating the time at which the mail was received. The combination of the receipt time information and the electronic mail information is stored in a data administrating unit 220 of the storage unit 12. When the communication information is voice information, the voice information includes voice mail information and receipt time information stored in a header accompanying the voice mail information and indicating the time at which the voice mail information was received.

The input/output information includes: schedule information indicating a schedule; designated time information indicating the time designated by the user as the time at which the schedule is to be executed, stored in a first header of a header section accompanying the schedule information; and input operation time information determined in accordance with the output from the time measuring unit 11 and indicating the time at which the user input the schedule, stored in a second header of the above-mentioned header section. The schedule information, designated time information and input operation time information are stored as a set of information in the data administration unit 220 of the storage unit 12. When the input/output information is voice information, the voice input information includes voice memo information containing input voice information, and input time information indicating the time at which the user input the voice memo and stored in a header accompanying the voice memo information.

The UI processing unit 240 includes: a content analyzing unit 242 which analyzes appendix data appended to the data to be processed by the data processing unit 230, such as the receipt time information included in the header, file size, number of files and so forth; update processing unit 244 which updates the display screen in accordance with the time information from the time measuring unit 11 and the input operation unit 14; a data control unit 250 having a background character data control section 250A for generating background screen, icon character data control section 250B for generating icon information, a font data control section 250C for generating font information, and a screen synthesizing unit 252 having a state holding section which synthesizes data derived from one of these data control sections 250A to 250C.

The content analyzing unit 242 has a header analyzing section 242A for analyzing contents of a plurality of headers 1, 2, ... of the header section, a file size analyzing section 242B for analyzing sizes of files, a file number analyzing section 242C for analyzing the number of files, and so forth. When the receipt time information is stored in the header section, the header analyzing section 242A also functions as a receipt time analyzing section, whereas, when the header section stores designated time information, the header analyzing section 242A functions also as a designated time analyzing section.

The background character data control section 250A, serving as metaphor environment generating means, operates in accordance with a control signal given by an operation input control unit 280, so as to receive the results of processing performed by the data processing unit 230 and to generate a background screen using metaphor (character data) which simulates scenery or event of actual environment that can be sensed and recognized by users in their daily life. The background screen thus generated is delivered to the display unit 13.

An icon character data control section 250B receives the results of analysis performed by the content analyzing unit 242, and instructs the screen synthesizing unit 252 to alter the state of operation of the display screen, in accordance with data which is derived from the storage unit 12 and which has been selected from a group of functions prepared beforehand in the storage unit 12. For instance, if receipt time information is stored in the header section, icon character data stored in the icon character data storage section 222B of the data storage unit 222 are displayed on the display screen of the display unit 13 in the order of the receipt time, in accordance with the results of the analysis (comparison of receipt time) performed by the header analyzing section 242A. Similarly, if designated time information is stored in the header section, icon character data stored in the icon character data storage section 222B of the data storage unit 222 are displayed on the display screen of the display unit 13 in the order of the scheduled time, in accordance with the results of the analysis (comparison of designated time) performed by the header analyzing section 242A.

Thus, the information such as the electronic information includes text data as the body of the data, and appendix data appended to the text data and stored in the header section of the information. The appendix data includes, for example, receipt time, file size and so forth. The content analyzing section 242 performs determination as to whether or not any appendix data exists and, if any, extracts such appendix data, e.g., receipt time. Therefore, the header analyzing section 242A (receipt time) and the file size analyzing section 242B (data size) identifies the file by the file name contained in the appendix data, taking into consideration a characteristic extension identifier such as TXT, GRP graphic, Exls, or the like.

Based on the extracted information, the character data control section 250B extracts character data corresponding to the information and causes the extracted data to be reflected on an object based on, for example, receipt time which indicates degree of urgency.

The state holding section in the screen synthesizing unit 252 holds the present state of operation and delivers this operation state to the display unit 13 via a display control unit 260.

The storage unit 12 has the data administration unit 220 for storing the data processed by the data processing unit 230 and the data storage unit 222 which stores data to be processed by the UI processing unit 240.

The data administration unit 220 has various levels such as a mail data storage section 220A for administrating data that processes data such as directory, a memo data storage section 220B for administrating memo data, a vice memo storage section 220C for administrating voice memo data, and so on.

The data storage unit 222 has the background character storage section 222A for storing a plurality of types of background character data, e.g., time axis, metaphor of sky, etc., the icon character data storage section 222B for storing a plurality of types of icon character data corresponding to a plurality of kinds of icon information; and the font data storage section 222C for storing a plurality of types of font data. The background character data storage section 222A stores display image of the applied metaphor, e.g., scenery or looking of the sky of a sky metaphor.

The data storage unit 222 of the storage unit 12 has, in addition to the background character data storage section 222A, icon character data storage section 222B and the font data storage section 222C, a metaphor rule accumulating section that accumulates therein rules concerning the applied metaphor. For instance, when a metaphor of sky composed of characters showing a scenery of the sky is used, range of movements of the characters, method of display of these characters and so forth are ruled by the metaphor rule.

The operation input control unit 280 has the following sections corresponding to various kinds of operations: a voice input control section 280A which controls, based on the operational input from the input operation unit 14, transmission of voice input information derived from the voice input unit 17 to the data processing unit 230; a key-input assignment control section 280B which controls correlation between the states of the operation buttons 14A, 14B, 14C, and icon information and cursor displayed on the display unit 13; a data input control section 280C which correlates input information other than the voice information, e.g., hand-written alphabetic character input information, to the fonts on the display unit 13; a hierarchy control unit 280D which performs switching between hierarchical level of the display screen, e.g., from a screen of higher level to that of lower level and vice versa, as well as alternative selection of the hierarchical levels; a mode change-over control section 280E which performs change-over of modes of display of the display screen; a zoom-in/out control section 280F for magnifying or de-magnifying part or whole of the display screen, e.g., variably changing the scale of time axis and variably changing the size of icons in accordance with the change of the scale of the time axis; a scroll control section 280G for controlling scrolling of the display screen; an icon move control section 280H for controlling movement of icon information on the display screen; and so forth.

When the data input control section 280C functions for example, the operation input control unit 280 also performs such functions as to detect the coordinate position of the operational input and to deliver the coordinate position data to the UI processing unit 240, in accordance with the state of the display screen.

The display control unit 260 receives the present state of display from the screen synthesizing unit 252 and reads necessary display images to form a display screen. The display screen thus formed is delivered to the display unit 13.

Thus, the data administration unit 220 serves as the first storage means of the display apparatus in accordance with the invention, while data storage unit 222 including various storage sections serves as the second storage means.

The data administration unit 220 is capable of storing a plurality of kinds of information having different attributes, e.g., mail data (communication information), memo data (input/output data), voice memo data, and so forth. To this end, the data administration unit 220 has a function to sort these plurality of types of information according to the attributes, and is provided with storage sections such as a main data storage section 220A, memo data storage section 220B, voice memo data storage section 220C, and so on. Each of these storage sections stores, in addition to the display data, attribute information for identifying the type of information such as an extension identifier exclusively used for files containing mail data, an extension identifier exclusively used for files containing memo data, an extension identifier exclusively used for files containing voice memo data, and so forth. The display data also contains a plurality of pieces of time information accompanying the plurality of pieces of information.

The icon character storage section 222B of the data storage unit 222 stores a plurality of types of icon information corresponding to the plurality of types of attributes. The background character storage section 222A stores time axis display data for displaying the time axis, background display data for displaying a time axis display area as a part of the background, background coloring data for coloring the background of the time axis display area, and time-axis coloring data for coloring a region of the time axis corresponding to icon information.

The time axis display data includes: a first hierarchical-level display time axis data which is scaled by hour and used for the display screen of the first hierarchical level; a second hierarchical-level display time axis data which is scaled by day and used for the display screen of the second hierarchical level; a third hierarchical-level display time axis data which is scaled by week and used for the display screen of the third hierarchical level; and a fourth hierarchical-level display time axis data which is scaled by month and used for the display screen of the fourth hierarchical level;.

Thus, the controlling means 210 selects, in accordance with the attribute information, icon information corresponding to the attribute of each type of the information, and controls the display on the display screen based on the time information related to each type of information, such that the selected pieces of icon information are arranged along the time axis in accordance with the time determined by the time information. The background character data control section 250A and the display screen synthesizing unit 252 in cooperation form a background display screen generating portion.

If the information is electronic mail information transmitted or received through the communication unit 15, the header section of the information has receipt time information relating to the time of receipt of the electronic mail. Therefore, the controlling means 210 serves to display icons of electronic mails on the display screen in the order of receipt time.

If the information is memo information which has been input through an input operation, the header section of the information has input time information relating to the time of the input operation. Therefore, the controlling means 210 serves to display icons of memo information on the display screen in the order of the time of drafting of the memo.

If the information is "To do" list information, the header section of the information has designated time information relating to the time of receipt of the electronic mail. Therefore, the controlling means 210 serves to display the icons of the schedule on the display screen in the order of the designated time at which the schedule is to be executed.

Thus, the display apparatus in accordance with the present invention has first storage means, second storage means, displaying means and controlling means.

(Display Processing for Menu Screen)

Referring to FIG. 1B showing an example of the display screen, the background is expressed as a time axis, and objects in the background are constituted by electronic mail icons 70 which give instructions to start up application programs. The content analyzing unit 242 analyzes the contents of appendix information appended as appendix data to the header section of the electronic mail information, e.g., receipt time, file size, and so forth. Then, the character data control unit 250 performs icon display processing based on the appendix information, e.g., receipt time, file size or the like, so as to array the icons in the order of receipt time to indicate degree of urgency or to vary the configuration of the icon in accordance with the file size,.

The user can operate these objects by selecting one of them by means of the input operation unit 14.

Selection of an electronic mail icon 70 starts up an application program for electronic mails, so that a display window (lower-level menu, lower-level instruction screen) of this application program is opened.

More specifically, when the user selects the electronic mail icon 70 in an operation world or condition displayed on the display unit 13 (a menu screen with layout of time axis), the input coordinates with respect to the display on the display unit 13 are detected by the operation input control unit 280, so that corresponding data is generated. In this case, since the icon displayed at the detected coordinate position is the electronic mail icon 70, a demand for starting an application program for electronic mails is generated as the above-mentioned corresponding data. The data thus generated is delivered via the character data control unit 250 to the data processing unit 230. The data processing unit 230 then executes a processing selected from the application program (program for electronic mails).

The character data control unit 250 receives the results of the processing from the data processing unit 230, and determines a state of display, with reference to the rules concerning application start-up accumulated in the metaphor rule accumulating section. More specifically, fonts are synthetically displayed against the background image by the font data control section. The screen synthesizing unit 252 operates in response to instruction given by the character data control unit 250 so as to change the state of operation, and delivers the new state of operation to the display control unit 260. In accordance with this new state of operation, the display control unit 260 reads a required display image, e.g., application start-up screen, and forms the display screen using this image. The display screen thus formed is delivered to the display unit 13. Thus, the application program start-up screen is displayed as a result of the selection of the electronic mail icon 70 by the user.

During execution of the application program, the user conducts selection of item from a list in the display screen or objects such as soft button, by means of the cursor, thereby inputting information to the application program. Then, the user gives instructions for processing by selecting objects appearing on successive display screens. When the execution of the application program is finished, the window is closed and the sky metaphor display screen that was displayed before the start up is recovered. Consequently, details of contents and states are displayed on the display screen, so that the user can visually understand the state of selection and execution of the application program.

In accordance with the received new state of operation, the input operation unit 4 generates data (input of application, etc.) based on the coordinate positions of subsequent inputs made by the user. This data is received by the data processing unit 230 as in the case of the operation following the selection of the electronic mail icon, and is processed as being input data under running of the application program. As a result, the font data control section 250C acquires corresponding font data with which the state of operation is changed by the display screen synthesizing unit 252. The new state of operation thus obtained is supplied to the display control unit 260, whereby the content of display on the display unit 3 is changed.

Instruction given by the user for terminating the running of the application program causes the display screen synthesizing unit 252 to change the state of operation, whereby the window is closed and the main display screen is recovered. The display control unit 260 receives the state of operation changed by the display screen synthesizing unit 252, and changes the state of display of characters (change in image or movement of characters). The state of display thus changed is delivered to the display unit. With this series of operations, the user can visually recognize the state of execution of the instruction.

Thus, the described embodiment provides an operation world or condition standardized by the menu screens in which the time axis is laid out as the reference. This permits easy understanding by the user of the states of execution of the application program. Namely, the user can easily understand the content of the display and operation of the system, based on common knowledge that the user can obtained in his daily life.

In order to provide a display for inputting a summary of a message in a schedule icon 44 shown in FIG. 1B, the information supplied y the input operation is saved as a text file in the storage unit 12. Then, the schedule icon 44 is generated by the background character data control section 250A, with the assist of the UI processing unit 240. Then, font data corresponding to the text data is obtained from the font data storage section 222A and is synthetically displayed on the schedule icon 44. The font data is stored, for example, in the form of BMD (Bit Map Data). The font may be formed by bringing data in the form of line information and refining the line information.

By way of example, the scrolling processing is conducted generally based on instruction given through the input operation unit 14. Namely, the scroll control section 280G operates based on the instruction given by the input operation unit 14 so as to cause an update processing unit 244 to update the data, so that the display screen on the display unit 13 is progressively rewritten. It is, however, preferred that this updating operation is conducted in such a manner that the time scale is put one hour ahead to update the time data, while keeping the background image stationary. More specifically, the entire display screen is flushed and the background screen is displayed. Then, data are generated based on a time which is one hour ahead of the present time, and various characters are synthesized in accordance with the data. Consequently, the display screen is moved in one direction, by repetition of update processing performed by the update processing unit 244. In this case, it is also preferred that data is generated only for the display region which has become vacant as a result of the movement. More specifically, it is preferred to prepare and use such an algorithm that the display content common to the display screen before the scrolling and that after the scrolling are held and displayed also after the scrolling, while the area which has become vacant as a result of the scrolling is filled with newly formed display data.

In order to conduct a display processing for changing the color of the background of a certain period of time in which an event is scheduled, it is necessary to conduct an analysis to determine the time of start and the time of end of such a period namely, it is necessary to attach the starting time and ending time as appendix data to the body of the data. Alternatively, the starting time and the scheduled time period may be appended in combination. In general, information concerning a scheduled event has a plurality of headers indicating various data such as the number of participants of a meeting, in addition to the data indicative of the degree of importance. It is therefore possible to display the title of the scheduled event and the scheduled time. This display enables the user to grasp the degree of tightness of the schedule.

For the purpose of magnifying/de-magnifying processing, a plurality of magnified or de-magnified character patterns are prepared by the operation of the zoom-in/out control section 280F and the update processing unit 244, and thee character patterns are put on display one by one to change the display screen in accordance with the instruction given from the input operation unit.

A description will now be given of various tables used for displaying menus in connection with the display processing of the initial screen which is displayed in response to turning on of the power and display processing of the main screen, with specific reference to FIGS. 17A to 18B.

FIG. 17B shows a menu data table (table 2) containing menu name data for identifying each menu data, menu form data indicating the form in which the menu is to be displayed, background character data pointers B11, B111, and so forth indicative of addresses of background character data to be used as backgrounds for menus (shown in FIG. 18A), and icon position data indicating the position where the icon is to be placed, in terms of X and Y coordinate values preferably, this table further contains lower-level menu number data indicative of menus set in the next hierarchical level and icon number data indicative of icons that are used in the menus of the lower level.

This menu data table defines menus of the main screen and modes of the hierarchical level next to these menus. Icons corresponding to the functions of the scheduler used in this embodiment are displayed in a desk menu.

FIG. 17A shows an icon data table (Table 1) which holds a plurality of pieces of icon data. This table contains function name data showing names of functions of the respective icons, character data pointers D11, D113 etc. that are pointers for pointing addresses of the character data corresponding to the icons shown in FIG. 18B, and function program pointers for pointing addresses of function programs F1 to F9 (see FIG. 15) that define the functions of the icons.

Display of the menus is performed based on the data contained in these tables, by a display processing which will now be described briefly.

A reference is made to the menu data table (Table 2 shown in FIG. 17B) to find the menu form of the menu to be displayed. If the menu form is "full screen", the background character data (see FIG. 18A) pointed by the background character data pointer such as B11 or B111 is displayed over the entire area of the display screen. In contrast, when the menu display mode is "pop-up", a window framework of a pop-up window is displayed, and the background character data pointed by the above-mentioned pointer is displayed in this pop-up window. A reference is further made to the menu table (table 2) to find the icon to be synthesized and the icon position data. Then, a reference is made to the icon table (table 1) to find character data (see FIG. 18B) pointed by the character data pointer D11, D113 or the like of the icon data corresponding to the above-mentioned icon, thereby assembling the icon to be displayed. The icon thus assembled is displayed on the display screen at the position determined by the icon position data (X1, Y1) shown in the menu table.

When an icon is selected, a reference is made to the function program pointers F1–F8 to find the function program corresponding to the selected icon and the corresponding function program (one of F1 to F9 shown in FIG. 15) is started.

(Mail Processing Section)

The mail processing section 230A of the data processing unit 230 incorporates various means which are not shown, including mail input/output means, mail sending/receiving control means, addressee list administration means, and so on. The mail input/output means has a mail forming processing portion for newly forming a mail, sending operation processing portion for sensing the mail, and a mail editorial processing portion for changing the mail addressee list. The mail sending/receiving means includes a mail sending processing portion for sending the mail in accordance with the addressee list, and a mail receiving processing portion which informs the user of receipt of a mail. The addressee list administration means includes an addressee list initializing processing portion for initializing the addressee list, an addressee list addition processing portion for newly adding addressees, and an addressee deleting processing portion for deleting addressees.

(Data Architecture)

A description will now be given of the architecture of data which is stored in the mail data storage section 220A of the storage unit 12 and which is used by the program for performing the above-described display of the window.

FIG. 15 shows the hierarchical architecture of the data stored in the mail data storage section 220A.

Referring to FIG. 15, the storage unit 12 has an administration section 22A, application programs F1 to F9, various tables inclusive of the tables 1 and 2 described above, data storage section 222 containing character data 222A, 222B and font data 220C, and the data administration unit 220.

An information recording medium in accordance with the present invention for storing at least information for generating display image can be implemented by a medium that contains at least various types of information shown in FIG. 15.

A plurality of pieces of attribute information for identifying a plurality of types of information, a plurality of pieces of time information relating to a plurality of pieces of information and so forth are stored in the header sections. A plurality of types of icon information corresponding to the plurality of pieces of attribute information are stored as icon character data 222B, while the time axis display data representing the time axis is stored as the background character data 222A. Pieces of icon information corresponding to attributes of a plurality of types o information are selected based on the attribute information. The selected pieces of icon information are arranged along the time axis at positions in accordance with the time based on the time information related to each of the plurality of types of information. A program for implementing such selection and display are stored as an administration program 22A.

The data administration unit 220 includes the mail data storage section 220A, memo data storage section 220B, database data storage section 220C and so forth.

The mail data storage section 220A includes a plurality of files 1, 2 and so on. Each file has header portions 220A-1, 220A-2, 220A-3 and so on, and an actual data portion 220A-1 which pertains to the content of the file. The header portion 220A-1 (header 1) stores receipt time information, header portion 220A-2 (header 2) contains file size information, and the header portion 220A-3 (header 3) contains a name (ID).

The mail data storage section 220A is provided for each of nodes formed in the display window. The mail data storage sections 220A thus provided are stored in the storage unit 12. More specifically, the mail data stored in the mail data storage section 220A includes various pieces of information such as the file size, time and data of receipt, name (ID), bit map data of photograph (or pictorial letter) of the sender's portrait, position of display of the photograph, size of the photograph, time and data at which the mail was read, time and date of transfer, position of display of the mail display window, size of the mail display window, position of the time display to be made at a lower part of the mail display window, size of the region of the time display, size of the fonts indicating the time, size of the fonts of the alphabetic characters showing the content of the mail, actual data related to the content of the mail (data body), list of senders, transfer destination list (directory, addressees, etc.), attributes, pointer for pointing n icon, comments, and so forth.

Preferably, additional tables are provided such as a window administration table for mail display window, addressee list administration table, or the like.

The name (ID) is the identifier that identifies the user. Usually, user's actual name or nickname is used as this identifier. The address to which the mail is to be sent is set up as the addressee. In ordinary electronic mail, the mail address is the information that appoints a position in the storage portion where the mail is to be stored. The user can grasp the state of arrival of mails directed to the user, by making access to this storage position. The time and data at which the mail was read are given by means of the real time clock available from the time measuring unit 11. The data and time at which the mail was read for the first time are set as the data of the time and date of reading. If the mail is sent (transferred or sending back) in accordance with a predetermined addresses list, the time and date of such sending are stored as the time and date of transfer. A flag indicating whether or not the receiving party as the node corresponding to the data architecture is capable of editing the addressee list, or whether or not such a receiving party is present, is set as the attribute. The coordinate positions at which a train of alphabetic characters, icon or the like shown by the node corresponding to the data architecture are to be displayed in the display window, as well as the size of the character train and the icon, are set as the display coordinates and size. The pointer pointing the region storing the icon image (image information or character data) of the icon corresponding to the data architecture displayed in the display window is set as the pointer for the icon. Any comment which the user would like to input is set as the comment. The number of these entrants may be variable.

The window administration table is a group of data sets used for displaying the windows on the display screen, and is stored in the storage unit. The window administration contains items concerning each window such as the name of the window, coordinates of the window and breadth and height of the window determined in terms of number of pixels. The data sets constituting the window administration table includes the items described above for a plurality of types of windows such s the message display window, directory display window, and so forth.

The main data storage section 220A has an addressee list administration table that holds various kinds of information concerning all the registered users. Various kinds of information thus held are displayed in a window in the form of a list or tale. The table has items such as names, addressee's addresses and so on. Thus, the table is constituted by data sets each containing the above-mentioned items of each registered user.

(Operation of the Portable Device)

FIG. 19 shows a flowchart illustrative of the operation of the portable device. When the CPU is started up by turning on of the power supply, the CPU of the portable device operates in accordance with the boot program stored in the storage unit, so as to make access to the PC via the communication unit, thereby reading necessary data stored in the storage unit including the OS for the terminal device, protocols and so forth.

Then, the display unit 13 of the portable device 1 displays an initial screen as shown in FIG. 9. Then, a main screen is displayed in which icons to which functions have been assigned in accordance with the data are displayed as characters within the display area of the main screen. The user therefore can visually and instantaneously understand the functions. It is thus possible to obtain a portable device which is easy to use. The characters displayed in this embodiment may be still pictures or, if necessary, moving pictures.

More specifically, when the power is turned on, the initial screen is displayed (Step S1, hereinafter simply represented as "S1"). In response to an operation through the input operation unit (S2), the main screen is displayed (S3). The display of the main screen is conducted in accordance with display information given by the first display setting unit 210A shown in FIG. 3. More specifically, the CPU 18 shown in FIG. 2 reads the display information concerning the main screen stored in the storage unit 12 and transfers the display information to the display unit 13, whereby the main screen is displayed.

The appearance of the main screen is as shown in FIG. 1B. The user can select any one of upper-level menus. More specifically, Step S3 which displays the main screen performs processing which is shown by flowcharts in FIGS. 21A and 21B. If any operation has been performed, a situation occurs requesting updating of the display screen. Then, whether or not the main screen is to be updated is determined (S30) and, if the main screen is to be updated, a background display processing is conducted (S32) in order to update the screen. This processing is to process the background display for the purpose of generating a main screen and, therefore, can be executed by pasting the background screen character data B11, B111 etc of FIG. 18A to the screen at specified positions.

A question is posed (S33) inquiring whether there is any mail. If the answer is "Yes", a window as shown in FIG. 12A is displayed on the display screen, thereby notifying the user of the presence of the mail information. This notification is conducted only when the mail is received by the portable device. Therefore, whether or not the display is made for the first time is determined (S34a) and the photograph of the mail sender and the topic are temporarily displayed for a predetermined period, e.g., one second or so, followed by automatic extinction processing to extinguish the display (S34b).

The content of the mail is then analyzed (S35). More specifically, the body of the data which is the content of the mail message is processed (S35a). To this end, for example, the data is stored in the mail data storage section 220A of the data administration unit 220 of the storage unit 12. As in the case of an electromagnetic signal shown in FIG. 16, the data is headed by a plurality of header sections (220A-1, 220A-2 to 220A-N). Various kinds of information, e.g., name of the sender of the mail, receipt time and so forth carried by these header sections are then read and analyzed by a header analyzing section 242A (S35b). The size of the file, which also is included in the appendix data, is analyzed (S35c).

Although not described in detail, further analysis of the header information is conducted to identify, for example, the name of the sender of the mail.

The background character data control section 250A and the icon character data control section 250B shown in FIGS. 4, 4A and 4B, then operate so that corresponding characters in the form of bit map images are selected from among a plurality of characters constituted by bit map images, whereby an electronic mail icon is synthetically displayed against a background image (S36).

Then, a check is conducted as to whether there is any other mail (S37) and, if any other mail exists, Steps S34 to S36 are repeated, whereas, if thee is no other mail, the process pauses (Steps S30 and S31 are repeated) until any update operation is conducted. Thus, the program is held in a waiting condition until any key-input is received. These Steps are repeated until all the mails are processed. Consequently, electronic mail icons are displayed against the background image.

The program may be such that Step S35 determines the degree of urgency based on the order of receipt time and assigns a first type of icon to a mail which has a high degree of urgency and a second type icon to a mail which has a low degree of urgency. To this end, the header analyzing section 242A sets a threshold time which is a predetermined length of time aback from the instant time, and sorts the mails such that the mails received after the threshold time have higher degree of urgency, while the mails received before the threshold time are of lower degree of urgency. Base on this analysis and sorting, the character data control section 250 performs a control so as to display the desired types of electronic mail icons.

The header section of each electronic mail carries time information such as the time of drafting of the electronic mail, so that the plurality of electronic mail icons can be pasted on the time axis in accordance with the time information.

FIG. 21B shows a flow for processing a memo (schedule). As in the case of the processing of electronic mail, an inquiry is made as to whether or not a demand exists for changing the main screen (S41) and, if such a demand exists, a background display processing is performed (S42).

Then, an inquiry is made as to whether or not a memo exists (S43). If the answer is "Yes", a window for displaying a memo is set up on the display screen (S44).

Step S43, inquiring whether there is any memo, may include a sub-step which poses a question "What type of memo?".

Then, analysis of the content is executed (S45) as in the case of the aforesaid Step S35 which analyzes electronic mails. Since the header section of the memo carries time information such as the time at which the memo was written, schedule icons corresponding to a plurality of memos can be pasted on the time axis at positions corresponding to the times. If the memo data includes text data as the body of the data, such a body of the data is delivered to the font data control section 250C which, in cooperation with the font data storage section 222C and the data processing section 230, extracts font data corresponding to the body of the data, and delivers the font data to the screen synthesizing unit 252. The font data storage section contains font data such as 1,2,3,4 etc. and A,B,C,D, etc. These font data are extracted one by one and pasted on the schedule icon, whereby alpha-numeric character information is produced (S46). The font data stored in the font data storage section are not limited to "Mincho" fonts and "Gothic" fonts. For instance, various fonts data simulating various hand-written letters may be stored in the font data storage section.

Subsequently, a determination is made as to whether or not any other memo exists (S47) and, if any, Steps S44 to S46 are repeated, whereas, if there is no other memo, the process waits (S40 and S41 are repeated) until any update request is received. These Steps are executed until processing of all existing memos is completed, whereby a plurality of schedule icons are displayed side by side, as shown in FIGS. 1A and 1B.

The processed described hereinbefore with regard to the processing of electronic mails and memos can be applied to the display processings of other types of information such as "To do" list and voice memos. Thus, the description is omitted for the processed of displaying "To do" list icons and voice memo icons.

The icon character data control section may be arranged such that it selects, based on the file size analysis, either one of a first type of icon and a second type of icon. For instance, when the file size exceeds a predetermined size, the first type icon is selected, otherwise the second type of icon is selected. Thus, first type of icons and second type of icons are displayed according to the sizes of the files.

In the background processing performed in each of Steps S32 and S42, the time axis is displayed on the main screen. A description will now be given of a flow for generating this time axis, with specific reference to a flowchart shown in FIG. 22A.

Step S50 poses a query as to whether or not any request for updating exists. If there is any instruction given through the input operation unit, such as scrolling, zoom-in/out, switching of display mode or the like, a display region (display scale) in a standard-size display is determined (S51) and the time axis is synthesized and displayed on the background in accordance with this scale (S52). Subsequently, the present time is confirmed (S53). Then, the time to be displayed at one end of the time axis, the time to be displayed at the other end of the time axis, and the position of an arrow indicating the present time are determined based on the display scale and the present time (S54). Thereafter, the portion of the background image which is aback from the present time, i.e., the past region, is colored (S55). The present time advances by the operation of the time measuring unit. Obviously, the display of the time axis is momentarily updated in accordance with the lapse of time measured by the time measuring unit. This gives an impression to the user as if the time axis and various kinds of information on display are moved on the display screen in accordance with the lapse of the time.

In this embodiment, the time axis is displayed in the form of a train of a plurality of consecutive squares each corresponds to a unit time. The portion of the background image corresponding to a square containing a scheduled time is colored. This operation is conducted in the background processing of Steps S32 or S42 in the flowchart of FIG. 21A or FIG. 21B. More specifically, as shown in a flowchart in FIG. 22B, characters are synthesized and displayed at positions corresponding to the scheduled times along the time axis (S60), and the corresponding squares of the time axis and the corresponding portions of the schedule display area are colored (S61).

Referring again to FIG. 19, once the main screen is set up through the process described hereinbefore, the program holds "waiting state" until any new operation is made through the input operation unit. If an operation is made to reset the display screen, the display returns to the initial screen (S4).

If an instruction is given through the input operation unit for changing the mode of the display (S6), the mode change-over section 280E shown in FIGS. 4, 4A and 4B, operates to display the background image in each display mode (S7). This mode changing instruction is input through the input operation unit, more specifically by moving up and down a slider of the input operation unit. In the flow shown in FIG. 19, the background image processing in Step S7 is materially the same as the main screen display processing (S3). More specifically, the processings for synthesizing and displaying the icons and the time axis are substantially the same as those in Step S2 (more specifically Steps S30 to S37 of FIG. 21A and Steps S40 to S47 of FIG. 21B), although Step S7 employs background characters different from those used in Step S3. The processing of Step S7 is therefore not described in detail.

If an instruction is given through the input operation unit for resetting the display, the main screen is recovered (S8), otherwise the present state is held until a further input is made through the input operation unit.

If a scrolling instruction is input through the input operation unit (S10), the scroll control section 280G shown in FIGS. 4, 4A and 4B, operates to display a new background image corresponding to the state after the scroll (S11). This scrolling instruction is input by moving the cursor on the display screen, through the operation of the input operation unit. In this case also, the background processing of Step S11 is materially the same as the main screen display processing (S3). Namely, processings for synthesizing and displaying the icons and the time axis are the same as those of Step S2 (more specifically Steps S30 to S37 of FIG. 21A and Steps S40 to S47 of FIG. 21B), although Step S11 employs background characters different from those used in Step S3. The background processing of Step S11 is therefore not described in detail.

If an instruction is given through the input operation unit for resetting the display, the display screen of the selected mode is recovered (S2), otherwise the present state is held until a further input is made through the input operation unit.

If a zoom-in/out instruction is input through the input operation unit (S14), the zoom-in/out control section 280F shown in FIGS. 4, 4A and 4B, operates to display a new background image corresponding to the state after the zooming-in or zooming-out (S15). The zoom-in/out instruction is input through the operation of the input operation unit by operating a predetermined portion of the input operation unit. In this case also, the background processing in Step S15 is almost the same as the main screen display processing (S3). More specifically, processings for synthesizing and displaying the icons and the time axis are the same as those in Step S2 (more specifically, Steps S30 to S37 of FIG. 21A and Steps S40 to S47 of FIG. 21B), although Step S15 employs the background characters and icon characters of sizes different from those of Step S3 background characters different from those used in Step S2. The processing of Step S15 is therefore not described in detail.

Thereafter, the process holds the present state until a new key-input is received. When a new key-input is detected, the process determines whether or not the key input is intended to dismiss the zooming of the display.

If an instruction is given to reset the display screen, the scrolled display screen is recovered (S16), otherwise the process holds the present state until a further input is received through the input operation unit. If a further instruction for changing the display mode is received, one of the above-described operations (S5, S4, S13, S17) is performed.

If no instruction for changing the display screen is received, a routine "A" (S18) is executed, in accordance with a flow which will now be described with reference to FIG. 10. Since various kinds of icons are on the display screen, an inquiry is made whether or not the user wishes to select one of the icons (S19).

The selection of an icon is conducted by moving the cursor on the display screen through an operation of the input operation unit, so as to place the cursor on a desired icon, followed by a clicking operation. Consequently, an answer "Yes" is given to the question of Step S19. For instance, information concerning the icon selected by the operation of the input operation unit is delivered from the second display setting unit 210B to the third and fourth display setting units 210C, 210D. Upon receipt of this information, the third display setting unit 210C determines whether there are a plurality of lower-level menus associated with the selected icon (S20). If the third display setting unit 210C has determined that there are such lower-level menus, these menus are displayed on the display screen of the mode which has been selected. More specifically, the third display setting unit 210C operates to open a window in the display screen and displays the lower-level menus side-by-side within the opened window. For instance, if Step S19 has selected the "To do list" icon from among the upper-level icons shown in FIG. 5, the third display setting unit 210C operates to display the lower-level menus corresponding to this icon, i.e., a "To do list" display screen (S21).

Selection of one of the displayed lower-level menus can be conducted by operating the input operation unit, as in the case of the selection of the icon. When one of the lower-level menus has been selected through the operation of the input operation unit, an answer "Yes" is given to the question posed in Step S23, and information concerning the selected menu is delivered from the third display setting unit to the fourth display setting unit, whereby the process proceeds to Step S24. Step S24 is executed also when the answer to the question given in Step S20 is "No". It will be seen that, when an object having no lower-level menu is selected in Step S19, the answer in Step S20 is "No". In this case, the fourth setting unit understands that a set display screen corresponding to the selected icon exists, based on the output from the second display setting unit. Steps S24 onwards are therefore executed by the functions of the fourth display setting unit. Alternatively, the process may be modified such that the third display setting unit informs the fourth display setting unit that there is no lower-level menus associated with the selected icon.

One of a plurality of items is selected as a result of the processings conducted in Steps S19 through S24. Thereafter, Steps S25 onwards are executed by the functions of the fourth display setting unit. Thus, the fourth display setting unit operates to display a setting display screen which corresponds to the selected item. The user can input various instructions or selections by moving the cursor on the display screen through the operation of the input operation unit under the control of the data input control section 280C, followed by clicking operation. When such an instruction is given through the operation of the input operation unit, an answer "Yes" is given to the question posed in Step S25, so that the information of the instruction is displayed on the setting display screen (S26). When the input operation is terminated by an operation which will be described later, an answer "Yes" is given to the question of Step S27, so that Steps S3, S7, S11 or S15 is executed to recover the main screen. The setting screen displays also other lower-level menus of the same hierarchical level. If another lower-level menu is selected on this setting screen, an answer "Yes" is given to the question posed in Step S28, so that the process returns to Step S21 which displays the setting screen corresponding to the selected lower-level menu. Steps S25 to S27 are repeated when the answer is "No" in Step S28 or S27.

In accordance with the operation of the input operation unit 14, the screen hierarchy control section 280D controls the hierarchy of the upper- and lower-level menus set by each of the first to fourth display setting units.

In order to move an icon to a desired position, the icon move control section 280H operates in accordance with an operation of the input operation unit. Based on this control, a character data control section of the UI processing unit 240, e.g., the icon character data control section 250B, operates to identify the icon and to determine the position at which the icon is to be pasted, and the information concerning the icon and the pasting position is delivered to the display unit.

Inputting of information by way of voice is conducted through a voice input unit 27, which is enabled also by an operation of the input operation unit 14. More specifically, voice information is moved by the voice input control section 280A to the data administration unit. When a designated time has come, a voice output control unit 270 produces voice information which has been stored, in accordance with an operation of the input operation unit. The voice information thus produced is delivered to a voice output unit 20 and is sent also to the display unit via the display control unit, whereby information related to the voice information is displayed.

A description will now be given of the method of using the PC 140 or the portable device 1. When the menu screen is on display, the user can operate any one of icons to which various functions have been assigned. When an item, e.g., a "schedule mode" is selected in Step S6 of the flow shown in FIG. 19 from among upper-level menus, followed by selection of an "electronic mail icon" shown in FIG. 5, the process advances to Step S21 via Step S19, whereby an "electronic mail display screen" is displayed. The user sets up and inputs data concerning the electronic mail through an operation of the input operation unit, while monitoring this setting screen. In this setting screen, display areas are displayed in parallel one above another.

The user then operates the input operation unit so as to set the cursor (condition setting bar) to a desired position in any display area. Modes or conditions of operation are variable by moving the cursor. This procedure is repeated so that various conditions are input and set in the PC 140 or the portable device 1.

After the setting of the conditions, the user selects an item "File" in a pulldown menu displayed on the PC 140 for example, so that lower-level menus related to "File" are displayed. By selecting one item of the lower menu, it is possible to store the file. Data are automatically set as the data for data setting items of the display, and are sent to the PC.

When the data thus input is transmitted, for example, from the portable device 1 to the PC 140, the PC 140 checks up the data with the database, and operates to display the display screen on the display unit of this portable device. The user therefore can input and/or inspect various items of schedule from the portable device 1.

It will be clear to one of ordinary skill in the art that the described software architectures, memory maps and so forth can be applied not only to portable devices as described but also to other types of information processing apparatus such as a PC, EWS or the like.

Second Embodiment

A second embodiment of the display apparatus in accordance with the present invention will be described with reference to FIGS. 24 to 33, while omitting the description with regard to the positions of the second embodiment that are the same or similar to those of the first embodiment. In this embodiment, the display screen is constructed as shown in FIG. 29.

FIG. 28 shows the appearance of a portable device 380. The portable device 380 used in this embodiment is small-sized and light-weight so as to be wearable by a user, e.g., around a user's wrist. More specifically, as shown in FIG. 37, the portable device 380 has a wrist winding portion 384, a display unit 381 connected to the wrist winding portion 384 and having, for example, an LCD device, and an input operation unit 382 having a plurality of operating portions arranged around the display device, including a slider 382A as a first operation button, a recording button 382B as a second operation button, and a track point 382C as a third operation button.

To explain in more detail, the slider 382A which serves as a mode selecting means is disposed on the right side of the display unit 381 and is slidable in the directions of the arrows A and B. The recording button 382B for activating a voice input unit is disposed on the left side of the display unit 381. The track point (trademark of IBM) 382C is disposed on the lower side of the display unit 381 and is movable in directions of arrows C, D, E and F so as to move a cursor up and down and to the left and right on the display screen. The user can select, by sliding the slider 382A in the directions of the arrows A, B one or more times, one of a communication display mode (notify mode plus memo mode), a schedule display mode (calendar mode) and a database display mode (directory mode).

(Display Screen on the PC)

One of the characteristic features of this embodiment is that a plurality of icons having their own functions are displayed on the display screen by being "pasted" to a time axis. The size of the display area of the portable device is smaller than that of the PC, so that the maximum length of the time axis displayed on the portable device is correspondingly smaller than that on the PC. Minimum required icons, therefore, can be displayed on the portable device.

As shown in FIG. 24, the display screen displayed on the display unit 330 is broadly divided into three portions: namely, a communication display area 330A, 340 a schedule display area 350(action) and a database display area 360. The communication display area 330A,340 is further divided is a notify area 330A which is used for notification of presence of information, e.g., arrival of an electronic mail, and for setting a notify mode which is of a lower hierarchical level, and a memo area 340 which enables advance to a lower-level memo mode that permits inspection of the content of a memo or the like. The schedule display area 350 is an area which performs a display in a schedule display mode or calendar mode in order to show the user's schedule. The database display area 360 is an area which permits opening of a lower-level directory mode which stores in a sorting manner a list of senders of electronic mails, directory or the like, and a database display mode.

In this embodiment, the communication display area 330A displays a metaphor of the sky as a background image, while the schedule display area 350 displays a metaphor of a landscape or a scenery on the ground. A metaphor of an image under the ground is displayed as the background in the database display area 360.

The communication display area 330A,340 also displays a plurality of carrier pigeon icons 331 of different colors and shapes arranged along an image of an electric wire, birdhouse icons 332, flower icons 341 and vase icons 342.

Each pigeon icon is used as a metaphor of an electronic mail. The user can inspect the content of an electronic mail by clicking operation of the input operation unit 382 after designating the corresponding pigeon icon. A lower-level menu display screen 334 as shown in FIG. 25 appears when the electronic mail is opened. The user can inspect the menu screen 334 by clicking on a "Recognize" tab 333B which is a lower-level pull-down menu of a "Synfo" tab shown in FIG. 25. Another tab "Synchronize" is intended to be used for data synchronization.

The pigeon icons 331 are arrayed in a time sequence along the electric wire which represents lapse of time, in the order of arrival (receipt) time. Functions are assigned to these pigeon icons 331 according to the shape and color. For instance, the black pigeon icons 331D indicate that the contents or information contained in the corresponding electronic mails are urgent, while white pigeon icons indicate that the contents of the electronic mails are important.

The birdhouse icon 332 has a function to sort and store the inspected electronic mails according to their contents. Thus, each birdhouse icon 332 stores a plurality of electronic mails. In this embodiment, there are two types of birdhouse icons: namely, a birdhouse icon 332A which is used for business (work) and a birdhouse icon 332B which is intended for private (personal) use. By using these birdhouse icons, the user can manage and administrate a plurality of business and personal electronic mails. It is possible to implement such a function that, when electronic mails have been received in excess of a predetermined number, i.e., when the number of the pigeon icons 331 (first icon information) exceeds a predetermined number, the electronic mails are stored in the birdhouse icon 332 (second icon information).

It is also possible to arrange such that the pigeon icons 331 (first icon information, for example) are colored according to the size of the data indicated by data size information indicative of the size of the display data to be registered. For instance, when the data size does not exceed a predetermined size, the pigeon icon 331 is colored in a certain color (third icon information), whereas, when the predetermined data size is exceeded, the pigeon icon is displayed in another color (fourth icon information). With this feature, the user can visually recognize the volume of the data.

It is also possible to arrange such that the pigeon icons 331 (first icon information, for example) are represented, based on designated time information that indicates the time of inspection of the input information designated by the user, by icons prepared in a plurality of different forms (in this case, "different forms" means different shapes) of display that provide fifth icon information. With this feature, the user can visually recognize the degree of urgency of the displayed data. In this case, a high degree of urgency means that the time designated by the user is close to the present time.

It is also possible to arrange such that the pigeon icons 331 (first icon information, for example) are represented, based on designated importance information indicative of degree of importance designated by the user, by icons prepared in a plurality of different forms (in this case, "different forms" mean different sizes) of display that provide sixth icon information. With this feature, the user can visually recognize the degree of importance of the displayed data. The degree of importance may be determined on a suitable factor such as the time, data size, or the like.

The flower icon 341 has a function to store a memo which has been input by hand writing, e.g., by a pen input. Clicking on this flower icon 341 causes a post-it tab 343 carrying the written memo to appear on the display screen. The position of the post-it tab 343 can freely be changed without being restricted in the display areas, by a dragging operation conducted through the input operation unit 382. For instance, if the content of the memo concerns an event scheduled at a certain time, the user can move the post-it tab 343 and paste it to the time axis at a position corresponding to the above-mentioned time. In contrast, if the content of the memo is information that has no relation to time, e.g., a telephone number, the post-it tab 343 may directly be pasted to, for example, the sky background of the display screen. Clicking again on the post-it tab 343 recovers the original display of the flower icon 341. The hand-writing input to the post-it tab 343 can be conducted by inputting a memo on a memo window 335 shown in FIG. 26 serving as "post-it forming menu". Preferably, "save post-it information" is selected and the post-it tab 343 is pasted at a desired position by, for example, a dragging operation.

The vase icons are sorted according to functions, corresponding to the contents of the memos. A plurality of flower icons, i.e., a plurality of pieces of memo information, are stored in each case icon 342. In this embodiment, the vase icons are classified into three types: namely, a "New" vase icon 342A which stores pieces of new information headed by "New", received recently, a "To-do-list" vase icon 342B which stores a plurality of pieces of information containing tasks to be done in the future, and an "Urgent" vase icon which stores a plurality of memos carrying urgent information.

The number of flowers in each vase icon 342 represents the number of the memos. In the illustrated display, the number of the memos is classified into three kinds: namely, one, two and three or more, and three characters are prepared corresponding to the three kinds of numbers. When the number of the memos is three or greater, e.g., 10, a "three-flower" icon (second icon information) is displayed on the display unit. This technique effectively minimizes the number of the required character patterns, thus saving the storage capacity and, hence, contributing to increase of the processing speed.

The schedule display area 350 synthetically displays a time axis extending in one direction. A schedule list 351 is shown along the time axis such that events or items are shown at positions corresponding to the times of such events or items. In addition, the post-it tab 343 is pasted so as to bridge over the boundary between the schedule display area 350 and the communication display area 330.

The database display area 360 contains input tabs for the respective databases: namely, a "clients" tab 361, a "vendors" tab 362 and a "personal" tab 363. Clicking on any of these tabs enables pull-down to menus under the tab.

As shown in FIG. 25, a display window 334 on the PC has columns or regions for displaying items such as name 334a, title 334b, company name 334c, company address 334d, company phone number 334e, company facsimile number 334f, home phone number 334g, hole e-mail address 334f and a comment 334i.

(Display Screen on Portable Device)

FIG. 29 shows an example of a display screen on the display unit 381 of the portable device 380. In this embodiment, the display unit 381 displays an initial display screen serving also as a screen saver. More specifically, as shown in FIG. 29, the initial screen has three kinds of metaphor similar to those used on the display of the PC 370, i.e., sky, landscape and an underground scenery, together with indication of time and date.

The main screen shown in FIG. 29 is obtained through an operation of the slider 382A. This main screen has three areas corresponding to the three areas on the display of the PC 370, i.e., three areas having the same attributes as the communication display area 330A, 340, schedule display area 350 and the database display area 360. These three areas of the main screen displayed on the portable device are: a communication display area 390,400, a schedule display area 410 and a database display area 420 which are shown in FIG. 29. When one of these three areas is closed up, the operation is switched to a mode corresponding to this area.

In this embodiment, metaphors of natural scenery are used in the respective areas. More specifically, the upper part of the display unit 381 provides the communication display area 390, 400 that displays information sent from the PC 370 or from other information devices via the PC 370. This upper part therefore has a background image constituted by a metaphor of sky which causes the user to image a sudden change of weather, indicating a sudden arrival of information from the exterior. The communication display area 390, 400 is divided into a notify area 390 which, upon receipt of an electronic mail or the like, advances the processing to a lower-level notify mode, and a memory area 400 which advances the process to a lower-level memo mode for enabling inspection of memos.

An intermediate portion of the display area on the display unit 381 is the schedule display area which functions to cause the device to operate in the schedule display mode or calendar mode which shows the user's schedule and so on. Regarding the ground surface as the time, movement of a person on the ground surface causes the user to image lapse of time. A metaphor of a scenery on the ground surface is therefore used as the background of the schedule display area.

The lower part of the display area on the display unit 381 constitutes the database display area 420 which enables opening of lower-level directory mode or database mode that sorts and stores list of mail senders or directory. Since underground soil gives an impression of a base or something stable, a metaphor of underground soil is used as the background image of this database display area 420.

The display is performed such that the display area which is being used and the screen which is to be activated is displayed in a greater scale. At the same time, images in the display area which is being used are shown at high contrast, while images of other display areas are shown at a low contrast.

Further, a plurality of icons are set on the display area of the display unit 381 of the portable device 380 as shown in FIGS. 30A and 30C. Similarly to the icons displayed on the display screen on the PC 370 shown in FIG. 24, these icons set on the display screen of the display unit 381 are shown in the form of various animation characters (metaphors) which suggest the functions of programs and which matches the background scenery. For instance, carrier pigeon icons 394A shown against the background sky image in FIG. 30A indicate electronic mails, while flow icons 401A, 401B and 402 indicate voice memos and hand-written memos. A butterfly icon 426 shown in FIG. 31C indicates a cursor. These icons 394A, 491A, 401B, 402, 426 and so on have attributes similar to those of icons shown in the display screen of the PC 370.

It is to be noted here that, while the display screen on the PC 370 shows various icon characters by means of high-resolution bit map data and shows also letter information, e.g., alphanumeric letters, the display screen on the portable device 370 displays the icon characters with bit map data of comparatively low resolution, i.e., in a simplified manner as compared with the characters shown on the PC. In addition, the display screen on the portable device 380 does not contain letter information. With this feature, the portable device 380 can clearly indicate the meaning of icons by way of the characters, even though the area of display on the portable device 380 is as small as that on a wrist watch. This feature therefore contributes to miniaturization of the portable device. Further, the simplified display of the characters correspondingly reduces the size of the bit map data which is used for synthesizing the character image and, hence, the capacity of the storage unit required. Alternatively, this feature increases the storage area available in the lower-level addresses other than the upper-level addresses allocated for control and actual data. Consequently, the storage unit is capable of storing further information or can operate at a higher processing speed.

When a specific function has been assigned to an icon, a character 394A of an animal or creature, e.g., a carrier pigeon, is displayed to indicate the function. With such an icon, the user can visually and instantaneously understand the function assigned to the icon. The arrangement may also be such that functions allocated to the input operation unit vary according to the screen being displayed.

(Details of Modes)

FIG. 32 schematically shows the hierarchical structure of the display. As will be seen from this Figure, the user can select, by suitably operating the slider 328A, one of the following three modes from the main screen: namely, the communication display mode, the schedule (action) display mode (calendar mode) and the database display mode (directory mode). If the communication display mode is divided into the notify mode and the memo mode, there are four modes selectable by the user.

The communication display area 390, 400 displays carrier pigeon icons 394A indicative of electronic mails or the like automatically transmitted from the PC 370 to the portable device 380. These icons 394A are arrayed in the order of receipt time.

More specifically, when the user operates the slider 382A shown in FIG. 28, the communication display area 390, 400 is displayed at a greater scale than other display areas, as will be seen from FIG. 30A. Clicking on the pigeon icon 394A opens a window 394 in which are displayed principal items of the electronic mail, such as pictorial letter or photograph 394a of the sender's portrait, arrival (receipt) time 394d, sender's name 394b, and an icon 394c which indicates that the content of the pigeon icon is an electronic mail. The content of the electronic mail 395 is displayed by a further operation. The photograph 394a of the sender's portrait can be automatically obtained by a conversion into pictorial letters (from text data to picture) as required. It is thus possible to automatically convert a plurality of types of data into desired types of media.

When a mail is received by the portable device 380, a voice notification is given by the voice output unit and, at the same time, a notification screen 394, indicating digest of the electronic mail, is displayed on the main screen in an interrupting manner.

The notification of arrival of an electronic mail may be conducted not only by means of voice but also by using any of other types of sign such as tone, vibration, smell, light, electrical shock, and so forth. When such a type of notification sign is used, the portable device has a corresponding output and controlling means such as tone changing/controlling means, vibration controlling means, smell controlling means, light quantity/light color controlling means, electricity controlling means, or the like. Obviously, the magnitude of the sign of notification may be varied in accordance with the state of the user.

The carrier pigeon icon 394 can have various shapes and colors which indicate various kinds of information pertaining to the function represented by this icon.

For instance, a black pigeon icon indicates that the electronic mail is urgent, i.e., that the content of the mail or the message requires a prompt reading by the user, while a white pigeon icon 394 indicates that the content of the electronic mail is urgent. A parrot icon 394B indicates a voice mail.

Referring to FIG. 30D, clicking on the flower icon 402 opens a window 403 which indicates information concerning the memo, e.g., the time at which the memo was written. A further operation by the user causes a window 404 to appear. This window 404 is configured simulating a post-it, and the memo is hand-written in this window, as shown in FIG. 30C. Clicking on the flower icon 402 causes the carrier pigeon icons to be moved to uppermost region of the display screen.

The number of petals of the flower icon 402 indicates the file size, i.e., the volume of the information, of the memo. Greater numbers of the petals mean greater size of the file. There are flower icons 401A, 401B having different shapes from that of the above-mentioned flower icon 402. These flower icons 401A, 401B indicate voice memos. Thus, in this embodiment, the size, color and shape of the icons are varied and, if necessary, icons are moved or made to blink, so as to indicate, for instance, the data size, degree of importance and the degree of urgency and other factor of the icon data.

The schedule display area 410 can be changed over different display modes that have time axes scaled on hour, day, week and month basis. Further, when the schedule (action) display mode is selected through the operation of the slider 382A, the schedule display area 410 is enlarged, while other areas, i.e., the communication display area 390, 400 and the data display area 420 are contracted, as will be seen from FIG. 31A.

In this schedule display mode 410, the time axis scaled by hour appears first at a lower part of the screen and schedule icons 412 for producing a schedule list is pasted at positions corresponding to the time of the scheduled event or action. Fonts indicating the summary of the event or action also are attached to the displayed schedule icon 412.

The time axis 413A has a series of rectangular or square blocks which constitute a schedule occupied/non-occupied display area 414A. The portions of the background image within the blocks are selectively colored, so that the user can recognize at a glance the time of an event or an action on the schedule. It is thus possible to administrate the contents of various display data, based on the time at which the memo was written or the time at which the mail was received, with reference to the time axis which is being displayed. This feature enables the user to easily retrieve the display data using the time as a key, without requiring any complicated hierarchical structure. Further, the display data can be moved to corresponding positions on the time axis, so as to be used as schedule data.

The arrangement also may be such that the background image is divided by a line indicative of the present time, into a future portion and a past portion. For instance, the portion 415 of the background image corresponding to the past is displayed in a suitable color, so that the user can visually and easily recognize the present time, as well as how many events or actions are scheduled in the future, and can confirm whether any specific event or action is a past one. Thus, in this embodiment, the past and future events or actions are distinguished from each other by the color (or black-and-white inversion) of display with reference to the time axis. The present time is displayed by a border line of a specific color. This enables the user to easily recognize at a glance the time in terms of past, future or present. Th time axis displayed on hour basis is accompanied by an indication of the date.

The display of the schedule in the schedule display mode can be performed in any one of the following four modes: a 5 hour view 411 (see FIG. 31B) in which schedule over 5 hours is displayed, a day view 411A (FIG. 31A) which displays the schedule on a day basis, a week view 411C (FIG. 31C) which displays the schedule on a week basis, and a month view (FIG. 31D) which displays the schedule on a month basis.

In the week view 411C which displays the schedule in a week, two types of schedule icons 412 are employed: namely, an icon 412A painted in black and an icon 412B indicated with shadow of hatching. The type of the scheduled item represented by the icon is discriminated by the type of display of the icon.

The user can scroll the display screen in the future or past direction by moving the cursor through an operation of the track point 382C. It is also possible to effect zooming of the time axis in relation to the scrolling, by suitably operating the input operation unit 382, so as to wide-spread the pitch of time scale of the time axis, as shown in FIG. 31B.

It is also possible to effect zooming-in or zooming-out of displayed contents in relation to the change in the time scale of the time axis. Thus, the range shown by the data can automatically be varied in accordance with the scale of the zoom, e.g., 5-hour scale, 12-hour scale, 1-week scale, and so forth. As a result of the magnification (zooming-in) of the time axis, minute data accompanying each schedule item may become visible (see, for example, FIG. 31B), while de-magnification (zooming out) of the time axis may cause minute data to become invisible (see, for example, FIG. 31D). Even when such minute data has become as a result of the de-magnification, the volume of the data is indicated in terms of an area of a bar-shaped image, so that the user can grasp the volume of the data. The described scale adjustment of the time axis can be made in each of the four schedule display modes of month, week, day and time. It is effective to provide means for varying or brightness of a selected time or day to enable such time or day to be distinguished. Since the time axis moves in accordance with the lapse of time, the objective items or events can easily be grasped in terms of time with respect to the present time.

In this embodiment, the schedule display mode includes the calendar mode which employs an image of a butterfly as the cursor image. The display of the cursor is performed such that the butterfly flaps when the cursor is being moved. This facilitates visual recognition of the cursor, even when the background image has a plurality of small blocks or boxes as in the case of a calendar. This display processing is preferably conducted in accordance with a flow which is shown in FIG. 33.

Referring to FIG. 33, determination is made as to whether there is any instruction for displaying the cursor (S130). If no instruction has been confirmed, the program stands still waiting for any cursor moving instruction. If such n instruction exists, the character data control unit and other units cooperate so that the character data of the butterfly, stored in the storage unit, are synthesized to form the image of the butterfly cursor and to display the same on a designated coordinate position (131).

Then, determination is conducted as to whether or not an operation for moving the cursor has been made (S132). The process terminates if no such operation has been made, otherwise Step S133 is executed. In Step S133, a control is performed such that a plurality of butterfly character data set up to indicate different positions of the butterfly's wings are displayed alternately and periodically, so that the image of the butterfly representing the cursor is displayed as if the butterfly is flapping. At the same time, a random-number generating unit (not shown) produces random coordinate instructions for the cursor, so that the cursor is moved in a manner as if the butterfly is flying.

Then, whether or not the operation for moving the cursor has been terminated is determined (S134). If the operation for moving the cursor is being continued, Step S133 is repeatedly executed, otherwise the process is terminated.

In this embodiment, a metaphor of a butterfly is used as the character of the cursor 426, as shown in FIG. 31C, so that the user can visually and vividly recognize the cursor 426. In this case, the arrangement is preferably such that the butterfly metaphor flutters when the input of operation through the input operation unit 382 continues over a certain period. To this end, a movement pattern along which the butterfly metaphor flies is calculated based on the present position of the cursor and random numbers generated by the random number generating unit which is not shown, thereby realizing an irregular movement or fly of the butterfly metaphor. At the same time, in order than the butterfly image of the cursor 426 varies during flying (movement), a display control is performed such that the form of display of the butterfly metaphor of the cursor 426 varies each time of movement, e.g., by turning the display of the butterfly metaphor on and off cyclically. Thus, in the illustrated embodiment, the state of the cursor is varied by movement or flicker, in accordance with the nature of the data. Conversely, the arrangement may be such that the butterfly flaps when there is no operational input has been made through the input operation unit 382 over a certain period, as in the case of a screen saver.

Alphabetic fonts such as A, B, C, D and so on are displayed in the database display area 420. The user can retrieve the database or directory to locate the name of a person, address, company name and so forth, based on the alphabetic expression.

For instance, assuming here that the user has selected the alphabetic character "D", as shown in FIG. 30E. Parts of a group of data beginning with the character "D" is displayed in the window 422. Opening of the window 422 causes the database display area 420 to be displayed in a greater scale, while compressing the images of the communication display area 390, 400 and the schedule display area 410 into smaller sizes.

A subsequent operation through the input operation unit 382 causes the information such as the phone number and facsimile number of an office in which a person of a name beginning with Dale to be displayed on the personal data display screen 423.

When none of the described display modes has been activated, i.e., when there is no input through the input operation unit 382 over a predetermined period, the display unit 381 may display any suitable initial screen as a screen saver. Alternatively, the display area may be closed. For instance, the communication display area may be displayed as a black background region, as if an eyelid is progressively closed.

Third Embodiment

A third embodiment of the display apparatus in accordance with the present invention will be described with reference to FIGS. 34 to 43. Features of the third embodiment common to the first embodiment are not described, in order to avoid duplication of explanation. The third embodiment employs display screens as show in FIGS. 34A and 34B.

A portable device 500 used in the third embodiment has an input operation unit 501 which has operating portions including a cursor button 501A having an oval form resembling that of a Rugby ball, serving as a rotary input portion, a tab switch 501B, an option button 501C and a recording button 501D.

The cursor button 501A is capable of performing three types of operations: namely, a rotational operation in the directions indicated by a double-headed arrow θ about an axis Y shown in FIG. 34B, a push-up operation in which the cursor button 501A is once pressed in the direction of the arrow "o" and then pushed upward in the direction of the arrow "p", and a push-down operation in which the cursor button 501A is once pressed in the direction of the arrow "o" and then pushed downward in the direction of the arrow "q".

The tab switch 501B is arranged so as to be pushed up and down in the directions perpendicular to the plane of the drawing sheet.

FIG. 34A illustrates an initial screen (default view) 510 which appears in response to turning on of the power supply. This initial screen 510 is constructed so as to be able to provide a day-of-week display area 510A which appears at an upper portion of the display on the display unit 502 and indicating what day of the week is it today, a time display area which appears at an intermediate region of the display and indicating the present time, and a date display area which appears at the lowermost end portion of the display and indicates the present date.

In operation, the display unit 502 displays the initial screen 510 as shown in FIG. 34A, in response to turning on of the power supply. Then, as the user operates the input operation unit 501B, the schedule display mode screen 520A as shown in FIG. 34B appears as the main screen.

The display screen 520A of the schedule display mode has an uppermost data display area 530, a schedule display area 540 having vertical time lines and serving as a calendar, a time axis display area 550A indicating a time axis that provides time reference to the vertical time lines displayed in the above-mentioned schedule display area 540, and the lowermost icon display area 560.

A black bar 534 having an arrow head giving a present time indication to the display on the schedule display area 540 is provided at the lower end of the date display area 530. The black bar 534 with its arrow head serves as a cursor.

Thus, one of the vertical lines 544 which is pointed by the arrow head of the black bar indicates the present time which separates the "past" time region and the "future" time region. The past time region which is on the left side as viewed in FIG. 34B is displayed as a background-colored display area 542 in which the background image is colored in for example, gray color.

The schedule display area 540 has schedule icons 546 positioned in accordance with the desired scheduled time. By operating each schedule icon 546, it is possible to inspect the schedule which is shown in a lower-level menu.

The time axis display area 550A is prepared as a non-colored schedule occupied/non-occupied displayed area 552. Portions of the time axis corresponding to the schedule icons 546 are colored to indicate the presence of schedules events or actions, i.e., to indicate that the schedule has been occupied. In the display screen shown in FIG. 34B, the schedule icons are formed over a time region from nine o'clock to 12 o'clock. It will be seen that the corresponding portion of the schedule occupied/non-occupied display area 552 constituting the time axis are also colored. The user therefore can visually recognize whether or not the schedule has been occupied at a glance of the time axis. This permits the user to visually understand the most current schedule of events and actions, without difficulty.

The icon display area 560 displays microphone icons 562 indicating that voice memos have been registered and envelope icons 564 indicating that messages have been received as electronic mails. These icons can be operated in the same way as that for the above-described schedule icons 546, so that the user can listen to the voice memos or read the electronic mails by referring to lower-level menus.

Pushing down of a tab switch 501B causes the time axis of the schedule display mode screen 520A to be switched over a 6-hour mode, 12-hour mode, 1-week mode and a 1-month mode. Zooming-in of the display image of the time axis is possible in each of these modes.

Pushing up of the tab switch 501B causes zooming out (de-magnification) of the displayed image. FIG. 34B shows the display screen in the 6-hour mode. FIGS. 37A and 37B show the display screens in the 12-hour mode and 1-week mode, respectively.

Referring now to FIG. 38A, pressing down of the cursor button 501A causes the display screen to be switched from the schedule display mode to the memo mode. More specifically, as shown in FIG. 38B, the date display area 530 skips down to the position below the icon area 560, when the cursor button 501A is pushed down. Then, the user can move the cursor to point a desired icon, by rotating the cursor button 501A. For instance, the user moves the cursor to put it on the microphone icon 562A, and pushes the tab switch 501B, so that the user can listen to the recorded voice memo via the voice output unit.

In order to register the recorded information at the schedule display area 540, the user pushes the tab switch 501B up to move the microphone icon upward into contact with the black bar 534, as shown in FIG. 38C. Then, the user pushes up the cursor button 501A upward as shown in FIG. 39A, so that the date display area 530 moves upward as shown in FIG. 39B. The user then rotates the cursor button 501A, so as to move the microphone icon 562A to the position of a desired time, e.g., 6 pm. A subsequent pressing down of the tab switch 501B causes the microphone icon 562A to move apart from the cursor, whereby the microphone icon 562A is pasted on the schedule display area 540. It is thus possible to correlate the voice memo indicated by the microphone icon to the time axis.

The user can then switch the display mode by operating the option button 501C one time, as shown in FIG. 40A.

Pressing this button one more time causes the display to be reset to the original normal mode, i.e., to the schedule display mode.

FIG. 40B shows the display screen which is displayed when the mode has been changed to the database mode 600. The database mode 600 is divided into four categories: namely, "Clients" 610, "Vendors" 611, "Personal" 612 and "Setting" 613. The "Setting" mode is used for time adjustment or other types of adjusting operations.

The user can move the black bar (cursor) 603 horizontally by operating the cursor button 501A to point desired one of these categories. The user then selects, for instance, the "Clients" list 610, by operating the tab switch 501B, as shown in FIG. 40C. As a consequence, a display screen as shown in FIG. 41A appears. The user then rotates the cursor button 501A to move the selector bar (cursor) 603 horizontally, so a to point, for example, an initial "K".

As a result, a vertically movable virtual cursor is displayed on one side of the list of the names, as shown in FIG. 41B. The user can point and select any desired name in the list by moving the virtual cursor, by pushing up or down the cursor button 501A. The display screen is automatically scrolled when the cursor has reached an end of the display area 502.

The user can inspect information given by the name shown in FIG. 41C, through an operation of the tab switch 501B. The user then moves the virtual cursor up or down by pushing the cursor button 501A up or down so as to scroll the display, in order to reach the desired information.

A notification window as shown in FIG. 36C is displayed when an electronic mail is received. This notification window can display the photograph of sender's portrait, name of the user, and the time of transmission. When the received electronic mail is not urgent, the notification of arrival of the mail is not conducted but an envelope icon 564 is automatically pasted thereto. The user therefore can look into the electronic mail by selecting the icon 564 at his convenience.

Recording of a voice memo is conducted by operating the recording button 501D. Recording is possible when the display screen as shown in FIG. 42 is being displayed.

In the schedule display mode as shown in FIG. 24B, the user can scroll the display screen in the direction of the time axis by rotating the cursor button 501A. If the arrangement of the input operation unit is the same as that of conventional wrist-type wearable instrument such as a wrist watch, it is not easy for the user to conduct various operations such as switching of the display screen, movement of the cursor and scrolling, because of the posture of the device on the wrist and because of the size of the input operation device. In this embodiment, however, this problem is overcome and the user can easily conduct these operations because the cursor button of the input operation unit is rotatable in the same direction as the scrolling.

Pointers such as a mouse or a track point, which enables a cursor to move in any desired direction, tends to inconveniently allow unstable movement of the cursor. In contrast, in the illustrated embodiment, stable and accurate movement of the cursor is ensured because the cursor is movable only uniaxially. In addition, the uniaxial movement of the cursor can be performed at a high speed, by making use of the centrifugal force and inertia of rotation of the rotational operation of the input operation unit. Therefore, accurate positioning and high-speed horizontal movement of the cursor are achieved by the rotational operation of the input operation unit. It is thus possible to provide a feasible interface which is easy to understand by virtue of the coincidence between the operation of the input operation device and the response of the display screen.

In addition, the described embodiment has a catch-net metaphor function for displaying data outside the display frame. A memo (or an object) pasted to the time axis moves in accordance with the movement of the time axis as the time elapses. However, necessary memo remains in the display area even when the time on which the memo has been pasted has come out of the display frame as a result of the movement of the time axis.

To this end, a catch-net area is provided at the left end region, i.e., at the end of the "past" time region, of the display area on the display unit 302, and the data which has come off the time axis are "caught" by the catch-net and pasted to the end of the "past" time region. Thus, the catch-net area has a function to retain on the time axis display area any icon information which otherwise would be extinguished by being moved out of the display area.

FIG. 22C is a flowchart showing the display processing with the catch-net function.

Determination as to whether an icon has come into the catch-net area is conducted each time the update processing is conducted for moving the time axis in accordance with the lapse of time (S70). If any icon has fallen into the catch-net area, a processing is conducted to stack the icon in the catch net area regardless of the movement of the time axis (S71), otherwise the icon is continued to be displayed by being moved together with the time axis. Any schedule icon stacked in the catchnet area is deleted (S72) from the catch-net area of the display screen at a moment which is "K" hours from the scheduled time, i.e., when the time difference between the input schedule time and the present time exceeds "K" hours. Thus, icons are extinguished after lapse of "K" hours.

FIG. 35 shows a hierarchical structure of the display for implementing the above-described control. This hierarchical structure permits switching between the database display mode and the schedule mode.

FIGS. 43A to 43C show display processing performed for zooming the display screen while scrolling the same. In order to conduct the scrolling processing, the cursor button 501A which is the Rugby-ball-shaped operation member is rotated (S140) as shown in FIG. 43A, and the direction of rotation of this operation member is determined by a routine "A" (S141).

More specifically, in the routine "A" conducted in Step S141, a determination is made first as to whether the operation member has been rotated clockwise or counterclockwise (S150). If the rotation direction is counterclockwise, the amount of rotation, e.g., angle of rotation or number of revolutions, of the counterclockwise rotation is detected (S151a). Then, the distance to be traveled by the cursor on the display screen corresponding to the detected amount of rotation is calculated (S152a) by using data in a rotation amount vs. scroll amount conversion table which is stored in the storage unit. Then, an updating processing for moving the display screen by an amount corresponding to the calculated amount of scroll is effected by the display control unit (S153a), whereby the display screen scroll processing (S142) is reached.

Preferably, the update processing for the scrolling of the display screen is conducted as follows. When the amount "X" of scrolling, i.e., the amount of horizontal movement, of the display screen is smaller than the horizontal size "X1" of the display screen, it is not necessary to update the portion of the old data corresponding to the region "X1–X". In such a case, the image in the region "X1–X" is held without being updated, and the new display data is added only for the region "X" which is newly brought into the display screen. This way of processing provide a greater speed of the scroll processing.

When the direction of rotation of the operation member has been determined as being clockwise in Step S150, Steps S151b to S153b, similar to Steps S151a to S153a described before, are executed. Although Step S152b uses a rotation amount vs. scrolling amount conversion table exclusive for the clockwise rotation, it is possible to arrange such that both Steps S152a and S152b use a common conversion table.

Then, display processing is conducted to effect the scrolling of the display screen (S142). Then, a determination is conducted as to whether the rotation of the cursor button 501A has been ceased (S143), followed by execution of a routine "B" (S144).

The cursor button 501A of the input operation unit used in this embodiment is capable of effecting zooming-in or zooming-out of the display area and vertical movement of the black bar (cursor) by being pushed up and down, in addition to the scrolling processing which is effected by the rotational operation of this operation member. The following routine "B", therefore is conducted in accordance with the operational input given by the cursor button 501A.

In the routine "B" executed in Step S144, if the cursor button 501A has been pushed downward or upward (S160) as shown in FIG. 43C, a determination is made as to whether the direction is upward or downward (Step S161). If no operation has been made, the routine "B" is terminated. If Step S160 has determined that the cursor button 501A has been pushed upward, a display processing is performed so as to enlarge the lower display region (S162). Conversely, if downward pushing is confirmed, a display processing is executed so as to enlarge the upper display region (S164). If no further enlargement, i.e., zooming-in operation, is necessary, the routine "B" is terminated, otherwise Steps S161 onwards are repeated (S165).

As will be seen from the foregoing description, the display apparatus of the third embodiment enables administration of formed or received data according to the time of formation or receipt by correlating the data to the time axis on the display screen. This permits an easy retrieval of data by using time information as a key, without requiring complicate hierarchical structure.

The display apparatus of this embodiment also permits various data intentionally to corresponding time points on the time axis, whereby a list or schedule table is obtained. In addition, since the time axis moves together with the display data indicating events or occurrences as the time lapses, it is possible to easily recognize the objective events or occurrences in relation to the present time.

Furthermore, since the time axis and the past and future time regions are displayed in different colors or by blackand-white inversion. The present time can be displayed in the form of a border line which is pasted in a specific color and which separates the past and future time regions from each other. It is therefore possible easily distinguish the past time, present time and the future time at a glance on the display screen.

It is possible to adjust the scale of the time axis, i.e., to zoom-in or zoom-out the image of the time axis. At the same time, zooming of the time axis is possible in each of the month, week, day and hour display modes. Further, the display content may be zoomed-in or zoomed-out in relation to the scaling of the time axis. Further, the range of display of the data can automatically be varied in accordance with the scale of zooming, e.g., 5 hours, 12 hours and one week.

Minute display image of data accompanying each event of the schedule may become legible or illegible when the scale of the time axis is enlarged or contracted. Even when such minute image has become illegible due to reduction of the time scale, presence of such image data is expressed in terms of solid area which indicates the volume of the data. The user therefore can recognize.

In the illustrated embodiment, the table correlating the amount of rotation of the rotational input member to the amount of scrolling is set such that three full revolutions of the rotational input member causes the display screen to move several centimeters. This, however, is not exclusive, and other arrangements may be used for implementing the scrolling function. For instance, a rotation angle detector is connected to the CPU, and a rotation angle vs. horizontal movement conversion table, defining the relationship between the angle of rotation of the rotational input member and the amount of horizontal movement of the display screen, is stored in the storage unit. The CPU in such a case serves also as a rotation angle-horizontal movement conversion control means which produces the amount of horizontal movement of the display screen based on the detected rotation angle of the rotational input member, by making reference to the rotation angle vs. horizontal movement conversion table.

Fourth Embodiment

A fourth embodiment of the display apparatus in accordance with the present invention will be described with reference to FIGS. 4 to 41. Portions of the fourth embodiment which are the same as those of the first to third embodiments are denoted by the same reference numerals and detailed description thereof is omitted. This embodiment has a display screen as shown in FIG. 44.

The portable device 700 used in this embodiment is a pen-input card-type device which permits input of information by hand writing. Therefore, the hardware architecture of the portable device has, a pen-input unit in addition to the components shown in the block diagram of FIG. 2, unlike the first to third embodiments described before. In addition, the CPU incorporated in this portable device has recognition means that recognizes letters (characters) and patterns input by means of a pen, and performs various kinds of processings based on the result of the recognition. The storage unit includes, in addition to the aforesaid RAM and ROM, various other medium such as a non-volatile memory card adapted to be inserted into the portable device, a PCMCIA card, and an ID card that is used exclusively for the user of the portable device. Text data can be input through the input operation unit.

The display unit includes an active-matrix liquid crystal display panel having both a displaying function and an electrostatic induction tablet function. The display unit further has a coordinate detection circuit that detects the coordinates of the tip end of a pen-input unit on the display panel, upon receipt of a signal from the pen-input unit, and a control circuit that controls the image displaying operation and the coordinate detecting operation.

The pen-input unit is provided at its end with a region detecting electrode coupled by a stray capacitance to line and column electrodes on the display panel and having high input impedance. In operation, voltage is induced in the detection electrode in response to a scanning pulse applied to the line electrodes or a scanning pulse applied to the column electrode. The coordinate detection circuit operates in accordance with a coordinate detection timing signal coming from the control circuit so as to detect the timing of induction of the voltage at the detection electrode of the pen-input unit, thereby detecting the coordinates of the tip end of the pen-input unit.

The display unit is switchable between a function or mode in which the content of a menu pointed by the pen-input unit among various menus displayed is determined by an instruction determining means and various processings are performed in accordance with the result of the determination and a function or mode in which various processings are conducted in accordance with the result of recognition performed by the recognition means capable of recognizing pen-input characters and patterns.

The pen-input unit may be connected to the portable device by means of a cable. When such a connection by a cable is not employed, it is preferred that the pen-input unit has various functional sections such as an information collecting section, a code information generating section, a temporary storage section, a position detecting section and a signal generating code transmitting section which transmits code information and a position pointing signal, so that the pen-input unit can input information both by hand writing and bar codes. In such a case, the display unit has a sense matrix section, a position detecting section (pointed coordinates sensing section), code information extracting section and a position detection processing section.

Thus, the portable device 700 used in this embodiment has an input operation unit 702 which includes the pen-input unit 703 and various buttons 0 to 9.

FIG. 44 shows the layout of the main screen. As will be seen from this Figure, the main screen has a data display area 710 which is formed at an upper portion of the display surface of the display unit 706 and which indicates the present time and data, an electronic mail display area 720, a schedule display area 730 and a database display area 740.

The date display area displays the data and time such as "AM 10:05 59 Thursday Oct. 12" 701. The electronic mail display area 720 is positioned at a "distant" location as viewed along a time axis metaphorically expressed y an image of a street, enabling the user to image an electronic mail which is sent from a sender who is "far-off" the user of the portable device. The electronic mail display area 720 displays various kinds of information such as a sender mail box icons 721 and the number of such icons, send-waiting mail box icons 723 and the number of such icons, and opened-mail box icons 724 and the number of such icons.

The schedule display area 730 displays a perspective landscape metaphor including a time axis display area 733 symbolizing a street. Schedules events are shown by building icons 736, 737 at the right side of the time axis display are 733, while a "To do" list is displayed in the form of a billboard 738 at the left side of the same.

The time axis shown in the time axis display area 733, shown by the perspective street metaphor, indicates time such that the proximal end of the street, i.e., the lower end of the time axis, shows time close to the present time, while the distal end of the street, i.e., the upper end of the time axis show future time. The GUI is set up as object images which are arranged along the street. Thus, in this embodiment, the street metaphor is used as the time axis, while building metaphors are used to indicate scheduled events. Billboard metaphor indicates "To do" information and a manhole metaphor indicates a memo. A non-colored schedule occupied/non-occupied display area 734 is set up along the time axis display area 733. Portions of the schedule occupied/non-occupied display area 734 corresponding to the times of scheduled events are colored. At the same time, a colored background image display area 732 is formed to indicate the "past" time region backward from the present time.

The street metaphor of the time axis provides a feel of perspective. An object which is scheduled to occur in the future is shown in a smaller scale at a far position along the street. As the present time approaches the time of the schedule, the object progressively move downward, i.e., towards the proximal end, and is displayed at a progressively enlarging scale, so that summary of the content of this object becomes recognizable.

In the display screen shown in FIG. 44, the scheduled events are shown by building metaphors at the right side, while the "To do" list is shown in the form of billboards at the left side of the street. Turning icons 744, 745 serves to enable the user to change the viewing direction. Namely, by using these icons, the user on the street can turn to the right or left, thus entering each function mode.

The building icons 736, 737 are constituted by different types of three-dimensional animation icons having different shapes and attributes. Each icon indicates a certain type of scheduled event. Namely, different building icons have different meanings of schedule. In this embodiment, official events are assigned to the building icon 736, while private events are assigned to the ordinary house icon 737.

There are two types of billboard icons 738. A first type of billboard icon 738A, which has support legs, is fixed to a certain point of the street, i.e., at a certain time along the time axis, thus indicating that the data contained therein is related to time. A second type of billboard icon 738B is devoid of supporting leg and, hence, floats in the air. This type of billboard icon 738B is used for information which has no relation to time. In the "past" time region of the time axis display area 733, there is shown a manhole icon 739 that is used for writing a memo. The "pas" time region of the time axis is darkened to facilitate recognition of the present time.

A scrolling function is available to vary the time scale of the time axis (one day or one week basis) so as to give a feel of perspective, with future objects being compressed into smaller sizes and shown at distant position along the street metaphor of the time axis. For instance, when the time scale is progressively increased to reduce the size of the displayed object, the viewing point of the three-dimensional display from which the street metaphor of the time axis is looked down upon is progressively elevated, whereby a bird view display mode 850 as shown in FIG. 46A is obtained which shows the displayed objects as if they are looked down upon by a bird. In this case, the time axis display area 852 is scaled by day, and icons in the schedule display area 854 are shown in small sizes. The length of such small-sized icon as measured in the direction perpendicular to the time axis indicates the degree of tightness of the schedule on the day designated by the time position of this icon.

In order to generate the display screen as illustrated, types of buildings are changed in accordance with the type of information, by using character data for each type of building and changing the bit map of the character data in relation to time. When minute control is not necessary, the street metaphor of the time axis is updated by shifting the numerals indicating the day or time.

Preferably, the display of the bird view is conducted by determining the position of each icon based on information concerning the start time of the scheduled event and information concerning the duration of the scheduled event, and selecting character data according to the duration thereby determining the shape of the icon, and pasting the icon along the time axis.

Processing is undesirably complicated and becomes troublesome when there are too many characters each having a duration of 10 minutes or so. It is therefore preferred that the types of the characters are limited. In case of a three-dimensional character of a building icon, it is preferred that only the right and left ends of the three-dimensional object are stored as picture data, and the three-dimensional image is formed by interconnecting these picture data by straight lines based on the time of start and time of ending of the event, with the shadow portion shown by dot data.

The database display area 740 preserved at a lower portion of the display unit 706 which is used for the database of the user's own. Thus, the database display area 740 may contain a telephone directory icon 741, a future scrolling icon 743 for scrolling the display screen toward a future time along the time axis, a past scrolling icon 742 for scrolling the display screen toward a past time along the time axis, a viewing direction turning icon 744 which enables the viewing direction of the user to view the front face of the building by changing the three-dimensional image of the building into a two-dimensional image showing the front side of the building, and another viewing direction turning icon 745 which turns the viewing direction of the user to view the front face of the billboard icon 738 by changing the three-dimensional image of the billboard into a two-dimensional image which shows the front face of the billboard.

The display mode is changeable over a month display mode, a week display mode and a day display mode, by operating a scale change-over buttons 704A, 704B and 704C, respectively. Thee buttons are arranged on one side of the card. The day display mode provides a display screen of a scenery of a street which is looked down from a level close to the ground level. The week display mode provides a display screen in which the scenery is shown in a bird view perspective. The month display mode sets up a display screen corresponding to a view from a satellite. Thus, the day mode display screen zooms up the week mode display screen which in turn zooms up the month display screen.

FIG. 51D shows the display screen in the month display mode. Unlike the display in the day display mode or the week display mode, upper portion of the display are corresponds to current time, while lower potion of the display area corresponds to future time. Each bar of the bar graph shows the total volume of the events scheduled to be held on the day designated by this bar.

The user an scroll the time axis by keeping the pen-input unit in contact with the scroll icon as shown in FIG. 51E. Scrolling is ceased when the pen-input device is moved apart from the scroll icon.

Referring to FIG. 51F, a double touch on the area 844 at the date of November 14 causes the display screen to be changed to a mode which displays one-day time axis for November the 14th. Referring to FIG. 50A, a double touch at the building icon 736 causes the content of the schedule to be displayed as shown in FIG. 50B. In order to change the day of the display, the user simply touches the building icon on the time axis by the pen-input device and drags the same to a desired time position along the time axis.

As shown in FIG. 51A, a double touching at a received mail in the list opens the mail. Namely, a window is opened to show the name of the sender, theme and so on in the form of a list as shown in FIG. 51A, and a double touch at a desired mail icon opens a lower-level menu as shown in FIG. 51B.

A touching by the pen-input device at the uppermost time display area as shown in FIG. 51C causes the display to be reset to the ordinary time axis displaying mode showing the present time.

A double-touching at a close box which is shown at a left upper portion of the display screen causes the window to close.

Touching at a desired key of the keyboard with the pen-input unit 703 as shown in FIG. 50D causes a memo input screen of a memo mode to open as shown in FIG. 50E. It is assumed here that the user selects, by means of the input-pen unit 703, a scheduling input format selection icon 786 among various icons displayed at uppermost portion (in the title bar of the memo screen) of the window of the memo input screen shown in FIG. 50E.

A double-touch at this icon 786 opens a schedule display screen 790 which is shown in FIG. 50F. The schedule time can be set by tracing the scale in the display screen by the pen-input display unit 703. When a name is input, if the input name has a relation to the database, an icon indicative of the database is displayed following the displayed name.

The user then sets as desired an alarming mode, by means of an alarm setting icon 796. At the same time, the user selects one of a plurality of types of the building, by touching one of the building icons 794A to 794D.

The user then closes the schedule input screen, so that the selected building icon 736 indicative of the scheduled event is automatically pasted on the time axis.

In order to form an electronic mail, the user opens the memo input display screen 780 of the memo mode, as shown in FIG. 49B. The user then selects, by means of the input-pen unit 703, a mail input format selection icon 782 from among various icons shown at the uppermost portion (title bar) of the window of the memo input screen 780 shown in FIG. 49B.

A double-touching at this selected icon 782 causes an electronic mail display screen 800 to open as shown in FIG. 49C. Input of information to this electronic mail display screen 800 is conducted by using the keyboard. When the user inputs a name, address of the mail is automatically extracted from the database and is displayed in the electronic mail display screen. The user then drafts the electronic ail by means of the keyboard. The electronic mail display screen 800 is then closed as the user touches, by means of the pen-input unit 703, at the close box icon 802 which is at the left end of the title bar shown in the uppermost part of the electronic mail display screen 800.

The electronic mail display screen 800 is thus closed after the drafting of the electronic mail. The electronic mail thus prepared is stored in a waiting mail box icon 722, and is automatically transmitted when the card of this portable device is connected to a telephone line.

In order to input an event or task to be executed in the future, i.e., to form a "To do" list, the user touches the keyboard with the pen-input unit 703, as shown in FIG. 49D. This causes the memo input display screen 780 of the memo mode to open as shown in FIG. 49E. The user then selects, from among various icons shown in the uppermost portion (title bar) of the memo input screen 780 of FIG. 49D, a "To do" list input format selection icon 784 by means of the pen-input unit 703, and double-touches this icon with the same. As a result, the display is switched to a return mail drafting screen.

As a result, a "To do" list display screen 810 as shown in FIG. 49F is displayed. The user then hand-writes letters (characters) as ink data in a hand-write area 812 of the "To do" list display screen 810, by means of the pen-input unit 730.

In the example shown in FIG. 49F, a task "BUY WINE" is hand-written in the hand-write area 812. In this case, the letters are displayed in the form of handwritten characters using hand-write font data, rather than Mincho or Gothick fonts. The message or task can also be input as text data, by using the keyboard. In such a case, font data such as of Mincho or Gothick appears in the hand-write area, although not shown in the drawings.

Characters are thus input and written in the hand-write area 810. When the input of these characters is finished, the hand-write area 810 as it is pasted to the time axis.

There are two types of "To do" lists: namely, a first type of "To do" list that is related to the time axis and a second type of "To do" list that is independent from the time axis. When time is designated, the information is regarded as being an item to be contained in a "To do" list that is related to time, and a billboard icon with supporting legs is used to paste the information to the time axis. In contrast, information having no designated time is displayed at an arbitrary position along the time axis in a floating manner, in the form of a billboard icon having no supporting leg.

The billboard icons usually disappears from the display screen as the time elapses. In case of the "To do" list which has been pasted to the time axis, however, the billboard icon remains at the lower end of the display screen regardless of the lapse of time, unless an operation is conducted to delete this billboard icon. When a plurality of billboard icons are stagnant at the lower end of the display screen, these icons are displayed in an alternately stacked from.

The billboard icon 738B representing the "To do" list is automatically erased, when it is checked by the pen-input unit 703, as shown in FIG. 48A.

For the purpose of retrieving the database, the user double-touches the database box icon 741 with the pen-input unit 703, so that the display is switched to a database retrieval mode.

As shown in FIG. 48C, a retrieval mode display screen 750 has a retrieval word input tab 752. The user then inputs initial characters, e.g., "ya" of the name to be searched out, by means of the keyboard and, at the same time, touches a binocular icon 754 by the pen-input unit 703, whereby the retrieving operation is commenced. The target data that is hit through the retrieval is displayed after the completion of the retrieval.

As a consequence, the hit data searched out through the retrieval is displayed in the form of a list in a hit data list display screen 760 as shown in FIG. 48D. The user then double-touches a selection tab 762 of a desired item from among the items shown in the hit data list display screen 760, so that detailed data are displayed in a data display screen 770 as shown in FIG. 48E.

The operation for forming a memo will now be described. The user touches the keyboard with the pen-input unit 703 as shown in FIG. 48F. Consequently, a memo input screen 780 of the memo mode is opened as shown in FIG. 47A. Characters (letters) are hand-written as ink data in the memo input display screen 780 shown in FIG. 47A by means of the pen-input unit 703.

In the example shown in FIG. 47A, a memo reading "TAXI 120 yen" is handwritten. In this case, the letters are displayed in the form of hand-written characters using hand-write font data, rather than Mincho or Gothick fonts.

The message or task can also be input as text data, by using the keyboard. In such a case, font data such as of Mincho or Gothick appears in the memo input screen 780, although not shown in the drawings.

The memo input screen 780 is closed when the user touches the close box icon by means of the pen-input unit 703. The memo in the from of a manhole icon 739 is then pasted to the time axis according to the time of writing of the memo. A display screen showing the content of the memo is opened when the user double-touches the manhole icon 739.

Fifth Embodiment

A fifth embodiment of the display apparatus of the present invention will now be described with reference to FIGS. 52 to 55. In the following description of the fifth embodiment, portions which are the same or equivalent to those of the first to fourth embodiments are denoted by the same reference numerals as those used in the foregoing description, and detailed description of such portions is omitted. The fifth embodiment employs a display screen structure as shown in FIG. 55C.

Referring first to FIG. 52A, a display screen 1002 which is now being displayed on the portable device is displayed as a window in a display screen 1000 of the PC. The display screen on the PC can make access to another server on the internet to display literatures, photographs and descriptions and to load them down into the storage unit of the portable device. In this embodiment, a camera tool is selected for example, by means of a tool such as the software (PIM software) concerning the display available on the PC. The camera tool appoints the area of the image of interest, i.e., the portion of the displayed image which is to be downloaded. Then, the image within the appointed area is taken into a memo which is used in the memo mode operation of the display apparatus.

It is also possible to take this image into a "To do" list memo which is used in the "To do" list mode of the display apparatus, as shown in FIG. 52B.

The PC and the portable device in this embodiment are so arranged as to perform data synchronization only for preselected kinds of information. In this case, the portable device can be synchronized with the PIM software itself, memos on the PIM and downloaded electronic mails. Thus, portable device can be data-synchronized with the images which is being displayed on the display screen of the PC. It is therefore possible for the user carrying the portable device with him to handle the PIM software itself, memos on PIM and downloaded electronic mail, in the same way as that of the handling of these information on the PC.

FIG. 52C shows the detail of the display screen on the portable device. Unlike the display screen used in the fourth embodiment, the display screen shown in FIG. 52C shows the date time axis 1112 in terms of a metaphor of signboard disposed along a street. This display screen is distinguished from that of the fourth embodiment also by the fact that the total size of the scheduled events is expressed in terms of the height of a building icon.

Referring now to FIG. 54A showing a direction turning mode, the image taken into the "To do" list as described above is displayed as a billboard 1118. It is thus possible to use the taken up image as the character data of a "To do" list icon.

Referring to FIG. 54C, in the case where the information notification function has been set beforehand, the voice output unit of the portable device produces a voice or sound information such as a melody when the designated time has come and, at the same time, a pop-up menu 1142 indicating the outline of the schedule appears at a position adjacent to the building icon 1140. Thus, notification to the user is given both by way of audio information and visual information.

FIG. 54B shows a display screen that is used when the schedule is written in the "To do" list. The user opens the mode of the "To do" list 1110 and then opens the window of character input interface 1130 which is displayed by the image of the keyboard. Then, various keyboard tabs on the character input interface 1130 are selected by the pen-input unit or by means of a finger, whereby character data are written in the "To do" list 1110.

FIG. 55A shows a note display mode. This node display mode also permits rearrangement of the items and addition of new items. The rearrangement of the items can be effected by a touch with a finger or the pen-input operation unit. Addition of new items can be conducted by operating the aforesaid character input interface 1130 in the form of a keyboard image, by a finger or by means of the pen-input unit.

FIG. 55B shows a balloon icon 1116 which, when touched, opens an electronic mail so as to display a lower-level display screen which shows the content of the electronic mail. This lower-level display screen is shown in FIG. 55C. This electronic mail display screen 1120 also enables the user to write and edit a responding electronic mail, through operation of the character input interface 1130.

It is also possible to send the mail thus prepared to a desired destination. To this end, the user attaches the card of this portable device to a docking station which incorporates a MODEM and an extension battery, thereby connecting the card to a telephone line. Then, the user can send the mail simply by moving the balloon icon 1116 indicative of the electronic mail to the position of a mail post icon 1114 displayed on the screen, as shown in FIG. 53A. As a result, the electronic mail is automatically connected to the telephone line so as to be transmitted. The portable device is automatically disconnected from the telephone line when the sending of the message is ceased.

FIG. 53B shows a display screen in which balloon icons 1116 representing the received mails re drifting over the road surface.

FIG. 53C shows an electronic mail display screen 1120 showing the content of the electronic mail has been displayed as a result of clocking on any of the balloon icon 1116. In the illustrated case, when the electronic mail has a schedule attached thereto, an icon 1122 for confirming the schedule is displayed on the electronic mail display screen 1120. Selection of this icon 1122 opens a further lower-level menu screen which shows the schedule of the data and time of the schedule attached to the electronic mail.

FIG. 53D shows a case where an electronic mail is sent together with a schedule attached thereto. Clicking on a "schedule OK" button causes the items of the schedule to be automatically registered and, at the same time, the display screen of the responding electronic mail is opened. Then, the user clicks on the mail post icon 1114, whereby the electronic mail is sent.

Although the apparatus of the present invention has been described through illustration of various embodiments, it will be clear to those skilled in the art that various changes and modifications may be imparted thereto without departing from the spirit and scope of the present invention. For instance, the portable device having the display apparatus of the present invention may be incorporated in a network as shown in conceptual drawings FIGS. 56A to 56C. Thus, a network system can be implemented such that communication is performed between the PC 1 and each of a plurality of portable devices 2-1, 2-2, and so forth.

Further, although the portable device has been described as being of the type which is worn by the user by being wound around a wrist, this is only illustrative and the portable device having the displaying apparatus of the invention can be implemented in various other forms according to the use. The number and arrangement of the keys on the portable device are also illustrative, and the portable device can have any other suitable number of keys arranged at positions different from those in the described embodiments.

The use of an LCD device also is not exclusive and the display apparatus of the present invention can be implemented by using various types of display devices such as a miniaturized TV unit using a thin cathode ray tube or a liquid crystal shutter or a plasma display unit. Furthermore, it is not essential that the images displayed on the display apparatus are three-dimensional.

The arrangement also may be such that the icon character is changeable from, for example, a pigeon to an animal on the display unit of the PC, and the same change of character is effected automatically in the image displayed on the portable device, thus achieving synchronization of data between the portable device and the PC. This can be achieved by arranging such that the view icon information can also be downloaded from the PC to the portable device; together with ordinary information.

The arrangement also may be such that the PC 1 is connected to another server on the internet via the internet, LAN, WAN, intra-net circuit and so forth, so that the portable device 2 can make access to a different server on the internet via the PC 1. It is also possible to arrange such that information is exchanged between a portable device 2 and another portable device 2 via the PC 1.

In the embodiments described hereinbefore, the second information processing apparatus is constituted by a PC, while a portable device is used as the first information processing apparatus which incorporates the display apparatus of the present invention. This, however, is not exclusive and a PDA, MCC, server or the like may be used as the first information processing apparatus. Further, a work station, main frame, wordprocessor or the like may be used as the second information processing apparatus.

The fifth and fourth embodiments also may be modified such that the device having the display screen of these embodiments are wearable on, for example, a user's wrist.

What is claimed is:

1. A display apparatus, comprising:
   communicating means which performs at least receiving of a plurality of pieces of display data;
   first storage means for storing received plurality of pieces of display data;
   second storage means for storing at least one piece of first icon information corresponding to at least one of said pieces of display data and at least one piece of second icon information of a display form different from that of said first icon information;
   displaying means for displaying, on a menu screen, at least one of said first icon information and said second icon information;
   controlling means for selecting said first icon information or said second icon information based on the number of pieces of display data newly registered in said first storage means and for controlling said displaying means so that the selected icon information is displayed on said menu screen;
   wherein, when the number of pieces of said first icon information is such that the sum of display areas of said pieces of first icon information falls within a predetermined region of said menu screen, said pieces of first icon information are displayed in accordance with the number of the pieces of display data;
   whereas, when the number of pieces of said first icon information is such that the sum of said display areas does not fall within said predetermined region of said menu screen, said second icon information is displayed commonly for said plurality of pieces of display data; and
   wherein said controlling means performs selection between said first icon information and said second icon information based on the number of the pieces of said first icon information to be displayed.

2. A display apparatus according to claim 1, wherein said first icon information is formed in a configuration different from that of said second icon information.

3. A display apparatus according to claim 1, wherein said first icon information is formed in a color different from that of said second icon information.

4. A portable information processing apparatus, comprising a display apparatus as set forth in claim 1.

5. The display apparatus of claim 1,
   wherein the display of said first icon information is performed such that a piece of first icon information is displayed for one piece of registered display data,
   wherein the display of said second icon information is performed such that pieces of first icon information of a number corresponding to the number of pieces of registered display data are displayed on said menu screen in a partly overlapping manner; and
   wherein said controlling means performs, based on the number of pieces of the display data, a control such that a plurality of pieces of said second icon information are displayed on said menu screen in the partly overlapping manner.

6. The display apparatus of claim 5, further comprising time measuring means for measuring time to recognize the time of registration of said display data thereby producing time information;
   wherein said controlling means performs display control such that the display of said plurality of pieces of second icon information in the partly overlapping manner is executed in a time sequence based on the time information produced by said time measuring means.

7. The display apparatus of claim 1,
   wherein said display data includes data size information concerning the size of said display data;
   wherein said first icon information includes third icon information which is generated and displayed when said data size does not exceed a predetermined size and a fourth icon information which is generated and displayed in a form different from that of the display of said third icon information when said data size exceeds said predetermined size; and
   wherein said controlling means performs selection between said third icon information and said fourth icon information based on said data size information.

8. The display apparatus of claim 1, further comprising operation means which permits an operation to input said display data to said first storage means;
- wherein said display data includes designated time information which indicates time for inspection of input information designated by a user;
- wherein said first icon information includes a plurality of pieces of fifth icon information prepared in different modes of display corresponding to time designated by said designated time information; and
- wherein said controlling means selects one of the pieces of fifth icon information based on said designated time information, thereby changing and controlling the mode of display of said fifth icon information in accordance with the degree of urgency of said display data.

9. The display apparatus of claim 8,
- wherein said second storage means includes inspection checking character data which is synthetically displayed on a window for displaying said display data when the user points a point in said window; and
- wherein said controlling means performs control based on an operational input through said operation means, so as to synthetically display the character data in the window.

10. The display apparatus of claim 1,
- wherein said display data includes designated importance information which indicates degree of importance designated by a user;
- wherein said first icon information includes a plurality of pieces of sixth icon information formed in different modes of display corresponding to the degrees of importance designated by the designated importance information; and
- wherein said controlling means selects one of the pieces of sixth icon information based on said designated importance information, thereby changing and controlling the mode of display of said sixth icon information in accordance with the degree of importance of said display data.

11. The display apparatus of claim 1, wherein said first icon information is formed in a size different from that of said second icon information.

12. The display apparatus of claim 1,
- wherein said display data includes designated time information which indicates time for inspection of the display data designated by a user and representing the degree of urgency of said display data; and
- wherein said controlling means includes a brightness control unit for controlling the brightness of display of at least one of said first icon information and said second icon information based on said designated time information.

13. The display apparatus of claim 1, wherein said display data includes designated time information which indicates time for inspection of the display data designated by a user and representing the degree of urgency of said display data; and
- wherein said controlling means includes a blinking frequency control unit for controlling the blinking frequency of display of at least one of said first icon information and said second icon information based on said designated time information.

14. The display apparatus of claim 1,
- wherein said display data is composed of a plurality of types of information; and
- wherein said controlling means includes a notification control unit which notifies the user of the presence of information by giving signs which act on the five senses of the user's body, based on the contents of plurality of types of information and the state of the user.

15. The display apparatus of claim 14, further comprising time measuring means for measuring the input time of the display data thereby producing time information,
- wherein said notification control unit has a vibration generating unit that generates vibration in a stepped manner so as to stimulate the user, based on the time information produced by said time measuring means.

16. The display apparatus of claim 14, further comprising time measuring means for measuring the input time of the display data thereby producing time information,
- wherein said notification control unit has a voice generating unit that generates voice adjustable in a stepped manner, based on the time information produced by said time measuring means.

17. The display apparatus of claim 14, further comprising time measuring means for measuring the input time of the display data thereby producing time information,
- wherein said notification control unit has a tone changing unit that changes adjustable alarming tone in a stepped manner, based on the time information produced by said time measuring means.

18. The display apparatus of claim 14, further comprising:
- time measuring means for measuring time; and
- operation means for enabling the user to input designated time;
- wherein said notification control unit operates based on the designated time so as to cause one of said first icon information, said second icon information and said display data to be displayed on said displaying means.

19. A display apparatus, comprising:
first storage means for storing at least one piece of display data:
- second storage means for storing at least one piece of icon information corresponding to said at least one piece of display data;
- displaying means having a menu screen on which said at least one piece of icon data is displayed;
- controlling means which performs control such that said icon information stored in said second storage means is displayed on said menu screen, based on the number of pieces of display data newly registered in said first storage means;
- communicating means that performs at least receiving of said display data;
- wherein said controlling means performs control of display of said icon information based on the number of pieces of said display data newly registered in said first storage means via said communicating means;
- wherein said display data includes electronic mail information supplied from a source of the information via said communicating means, and sender information concerning the sender of the electronic mail;
- wherein a plurality of said second storage means are prepared corresponding to different senders, and a plurality of pieces of character data representing face appearances of said senders are contained in the plural second storage means; and
- wherein said controlling means selects one from said plurality of pieces of character based on said sender information and causes the selected character data to be displayed simultaneously with the arrival of said electronic mail information.

20. A display apparatus according to claim 19, wherein said controlling means performs control such that pieces of icon information displayed on the menu screen are erased from said menu display screen based on the number of pieces of the display data erased from said first storage means.

21. A display apparatus according to claim 20, further comprising communicating means which performs at least transmission of said display data,
wherein said controlling means performs control based on the number of pieces of display data erased from said first storage means and transmitted by said communicating means, such that pieces of icon information of the number corresponding to the number of the pieces of the erased display data are erased from said menu screen.

22. A display apparatus according to claim 20, further comprising operation means for erasing said display data from said first storage means,
wherein said controlling means performs control based on the number of pieces of display data erased from said first storage means by an operation input through said operation means, such that pieces of icon information of the number corresponding to the number of the pieces of the erased display data are erased from said menu screen.

23. A display apparatus according to claim 19, further comprising operation means which permits said display data to be newly registered in said first storage means;
wherein said controlling means performs control of display of said icon information based on the number of pieces of said display data newly registered in said first storage means by an operation of said operation means.

24. A display apparatus according to claim 23,
wherein said display data includes input information which is input by an operation conducted by the user, and input time information concerning the time at which said input information is input by the operation; and
wherein said controlling means performs display control based on the input time information such that the so as to cause said icon information to be displayed on said menu screen.

25. A display apparatus according to claim 19, wherein said first storage means has a plurality of pieces of attribute information for identifying attributes of said plurality of pieces of display data,
wherein said controlling means selects, based on at least one piece of attribute information, at least one piece of icon information corresponding to the attribute of at least one piece of display data, and causes the selected icon information to be displayed on said menu display.

26. A display apparatus according to claim 25,
wherein said display data includes electronic mail information received through said communicating means and arriving time information concerning the time of arrival of said electronic mail information; and
wherein said controlling means performs, based on the arrival time information, control of display of the pieces of icon information on a menu screen in a time sequence corresponding to the order of the arrival time.

27. A portable information processing apparatus, comprising a display apparatus as set forth in claim 19.

28. The display apparatus of claim 19, further comprising operation means which enables the user to appoint a position of a display cursor movable on the display screen of said display means and to select one piece of icon information through the appointment of the cursor position,
wherein said second storage means includes first character data indicating one mode of display of said cursor and a plurality of pieces of second character data indicating other modes of display of said cursor; and
wherein said controlling means performs control such that, when no operation input has been made through said operation means, said first character data is displayed on said display means, whereas, when operation input has been made through said operation means, said plurality of pieces of second character data are displayed on said display means while being selectively switched from one to another.

* * * * *